(12) United States Patent
Verghese et al.

(10) Patent No.: US 12,399,262 B2
(45) Date of Patent: *Aug. 26, 2025

(54) METHODS AND SYSTEMS FOR PROTECTING A LIGHT DETECTION AND RANGING (LIDAR) DEVICE

(71) Applicant: Waymo LLC, Mountain View, CA (US)

(72) Inventors: Simon Verghese, Mountain View, CA (US); Pierre-Yves Droz, Los Altos, CA (US); Mark Shand, Palo Alto, CA (US)

(73) Assignee: Waymo LLC, Mountain View, CA (US)

( * ) Notice: Subject to any disclaimer, the term of this patent is extended or adjusted under 35 U.S.C. 154(b) by 234 days.

This patent is subject to a terminal disclaimer.

(21) Appl. No.: 18/163,330

(22) Filed: Feb. 2, 2023

(65) Prior Publication Data
US 2023/0184908 A1    Jun. 15, 2023

Related U.S. Application Data

(60) Continuation of application No. 17/091,337, filed on Nov. 6, 2020, now Pat. No. 11,614,523, which is a
(Continued)

(51) Int. Cl.
*G01S 7/486*    (2020.01)
*G01S 7/484*    (2006.01)
(Continued)

(52) U.S. Cl.
CPC ............ *G01S 7/4868* (2013.01); *G01S 7/484* (2013.01); *G01S 7/4865* (2013.01); *G01S 7/487* (2013.01);
(Continued)

(58) Field of Classification Search
CPC ...... G01S 7/4868; G01S 7/484; G01S 7/4865; G01S 7/487; G01S 7/4876; G01S 7/495; G01S 17/10; G01S 17/42; G01S 17/931
See application file for complete search history.

(56) References Cited

U.S. PATENT DOCUMENTS 4,155,054 A     5/1979   Goldie et al.
5,159,412 A    10/1992   Willenborg et al.
(Continued)

FOREIGN PATENT DOCUMENTS

CN    101641588 A    2/2010
CN    101776760 A    7/2010
(Continued)

OTHER PUBLICATIONS

Translation of JP-2006308482-A , 7 pages (Year: 2006).*
(Continued)

*Primary Examiner* — Dale W Hilgendorf
(74) *Attorney, Agent, or Firm* — MCDONNELL BOEHNEN HULBERT & BERGHOFF LLP

(57) ABSTRACT

Described herein are methods and systems for protecting a light detection and ranging (LIDAR) device against external light that is originated at a light source other than a light source of the LIDAR device and that is being emitted towards the LIDAR device. In particular, the LIDAR device may be equipped with a mitigation system that includes an interference filter, an absorptive filter, an adaptive filter, and/or a spatial filter. Additionally or alternatively, the LIDAR device may be operated to carry out reactive and/or proactive mitigation operations. For example, the LIDAR device may be operated to vary over time characteristics with which light is being emitted and to only detect light having characteristics that match the characteristics with which light is being emitted. In another example, the LIDAR
(Continued)

device may be operated to activate a shutter to block the external light from being detected by the LIDAR device.

20 Claims, 26 Drawing Sheets

Related U.S. Application Data division of application No. 15/352,717, filed on Nov. 16, 2016, now Pat. No. 10,845,470.

(51) Int. Cl.
  *G01S 7/4865* (2020.01)
  *G01S 7/487* (2006.01)
  *G01S 7/495* (2006.01)
  *G01S 17/10* (2020.01)
  *G01S 17/42* (2006.01)
  *G01S 17/931* (2020.01)

(52) U.S. Cl.
  CPC ............ *G01S 7/4876* (2013.01); *G01S 7/495* (2013.01); *G01S 17/10* (2013.01); *G01S 17/42* (2013.01); *G01S 17/931* (2020.01)

(56) References Cited

U.S. PATENT DOCUMENTS

| | | | |
|---|---|---|---|
| 5,373,160 A | 12/1994 | Taylor | |
| 5,715,045 A * | 2/1998 | Dunne | G01S 7/495 |
| | | | 356/28 |
| 6,580,497 B1 | 6/2003 | Asaka et al. | |
| 7,064,817 B1 * | 6/2006 | Schmitt | G01S 7/4972 |
| | | | 356/3.01 |
| 7,548,829 B2 | 6/2009 | Gogolla et al. | |
| 7,741,618 B2 | 6/2010 | Lee et al. | |
| 8,729,502 B1 | 5/2014 | Klotzkin | |
| 8,825,260 B1 | 9/2014 | Silver et al. | |
| 8,836,922 B1 | 9/2014 | Pennecot et al. | |
| 9,118,782 B1 * | 8/2015 | Coley | H04N 23/745 |
| 9,213,085 B2 * | 12/2015 | Kanter | G01S 7/4808 |
| 9,261,881 B1 | 2/2016 | Ferguson et al. | |
| 9,285,477 B1 * | 3/2016 | Smith | G01S 7/4817 |
| 9,354,318 B1 | 5/2016 | Beard et al. | |
| 9,705,283 B1 | 7/2017 | Deppe et al. | |
| 9,840,256 B1 * | 12/2017 | Valois | G01S 7/40 |
| 10,845,470 B2 * | 11/2020 | Verghese | G01S 17/42 |
| 11,614,523 B2 * | 3/2023 | Verghese | G01S 7/4876 |
| | | | 701/23 |
| 2003/0058264 A1 | 3/2003 | Takako et al. | |
| 2003/0132405 A1 | 7/2003 | Some | |
| 2004/0208340 A1 | 10/2004 | Kirschner | |
| 2005/0046823 A1 | 3/2005 | Ando et al. | |
| 2006/0231771 A1 | 10/2006 | Lee et al. | |
| 2006/0265147 A1 | 11/2006 | Yamaguchi et al. | |
| 2007/0008182 A1 | 1/2007 | Miyahara et al. | |
| 2007/0024840 A1 | 2/2007 | Fetzer et al. | |
| 2007/0076201 A1 | 4/2007 | Babin et al. | |
| 2007/0228262 A1 * | 10/2007 | Cantin | G01S 7/481 |
| | | | 250/221 |
| 2008/0230695 A1 | 9/2008 | Snel et al. | |
| 2009/0273770 A1 | 11/2009 | Bauhahn et al. | |
| 2010/0030380 A1 | 2/2010 | Shah et al. | |
| 2010/0045965 A1 | 2/2010 | Meneely | |
| 2010/0067007 A1 | 3/2010 | Videen et al. | |
| 2010/0108800 A1 | 5/2010 | Mayer et al. | |
| 2010/0111119 A1 | 5/2010 | Sato et al. | |
| 2010/0157280 A1 * | 6/2010 | Kusevic | G01S 7/4972 |
| | | | 356/4.01 |
| 2010/0208244 A1 | 8/2010 | Earhart et al. | |
| 2010/0235129 A1 * | 9/2010 | Sharma | G01S 17/86 |
| | | | 702/97 |
| 2012/0044476 A1 | 2/2012 | Earhart et al. | |
| 2012/0075423 A1 * | 3/2012 | Kirmani | G01S 7/4865 |
| | | | 348/46 |
| 2012/0130588 A1 | 5/2012 | Hukkeri | |
| 2012/0287417 A1 | 11/2012 | Mimeault | |
| 2013/0050676 A1 | 2/2013 | d'Aligny | |
| 2013/0087684 A1 | 4/2013 | Guetta et al. | |
| 2014/0109302 A1 | 4/2014 | Casbi et al. | |
| 2014/0111812 A1 | 4/2014 | Baeg et al. | |
| 2015/0055117 A1 | 2/2015 | Pennecot et al. | |
| 2015/0138529 A1 | 5/2015 | Singer | |
| 2015/0226853 A1 | 8/2015 | Seo et al. | |
| 2016/0003946 A1 | 1/2016 | Gilliland et al. | |
| 2016/0069998 A1 | 3/2016 | Takasuka et al. | |
| 2016/0195412 A1 | 7/2016 | Barfoot et al. | |
| 2016/0282453 A1 * | 9/2016 | Pennecot | G02B 27/62 |
| 2016/0282468 A1 * | 9/2016 | Gruver | G01S 17/93 |
| 2016/0306029 A1 * | 10/2016 | Lundquist | G01S 7/4817 |
| 2016/0356594 A1 * | 12/2016 | Sorenson | G08G 1/161 |
| 2017/0003121 A1 * | 1/2017 | Brandli | G01B 11/25 |
| 2017/0082733 A1 * | 3/2017 | Schwarz | G01S 7/4811 |
| 2017/0155225 A1 * | 6/2017 | Villeneuve | H01S 3/06754 |
| 2018/0164107 A1 | 6/2018 | Yalla | |
| 2018/0231659 A1 * | 8/2018 | Campbell | G01S 17/88 |
| 2018/0284247 A1 * | 10/2018 | Campbell | G01S 17/10 |
| 2018/0284279 A1 * | 10/2018 | Campbell | G01S 17/26 |
| 2018/0364356 A1 | 12/2018 | Eichenholz et al. | |
| 2019/0129009 A1 * | 5/2019 | Eichenholz | H03K 17/74 |
| 2020/0025923 A1 * | 1/2020 | Eichenholz | G01S 17/931 |
| 2021/0333365 A1 | 10/2021 | Bogatscher et al. | |

FOREIGN PATENT DOCUMENTS

| | | | |
|---|---|---|---|
| CN | 103502841 A | 1/2014 | |
| CN | 103608696 A | 2/2014 | |
| CN | 104243783 A | 12/2014 | |
| CN | 105659108 A | 6/2016 | |
| CN | 105745571 A | 7/2016 | |
| EP | 1647839 A2 | 4/2006 | |
| EP | 3067713 A1 | 9/2016 | |
| JP | H0552957 A | 3/1993 | |
| JP | H0727859 A | 1/1995 | |
| JP | H07229967 A | 8/1995 | |
| JP | H07325153 A | 12/1995 | |
| JP | 2001-255371 A | 9/2001 | |
| JP | 2005114435 A | 4/2005 | |
| JP | 2005535869 A | 11/2005 | |
| JP | 2006308482 A * | 11/2006 | ........... G01S 17/931 |
| JP | 2006322849 A | 11/2006 | |
| JP | 2012154642 A | 8/2012 | |
| JP | 2015215318 A | 12/2015 | |
| JP | 2016014665 A | 1/2016 | |
| JP | 2016053552 A | 4/2016 | |
| JP | 2016534346 A | 11/2016 | |
| KR | 10-2001-0028346 A | 4/2001 | |
| WO | 2013127973 A1 | 9/2013 | |
| WO | 2015/042395 A1 | 3/2015 | |

OTHER PUBLICATIONS

Soileau et al., "Optical Power Limiter with Picosecond Response Time", IEEE Journal of Quantum Electronics, QE-19 (4): 731-735, (1983).

Shin et al., "Illusion and Dazzle: Adversarial Optical Channel Exploits against Lidars for Automotive Applications", https://sites.google.com/view/ches17illusionanddazzle.

International Search Report and Written Opinion for Corresponding PCT application No. PCT/US2017/060438 dated Feb. 5, 2018.

J. E. Harry, ed., "Industrial Lasers and Their Applications," Beijing Institute of Optoelectronic Technology, Mechanical Industry Press, 1980, pp. 83-84.

Huaicheng Huang, "Laser Communication," Defence Industrial Press, 1976, pp. 55-57.

Daijin Liu et al., "Serial-Parallel CSF Far Field Auto Alignment Based on Combination of Feed forward and Feedback Control for SG-II-Up Device," Chinese Journal of Lasers, vol. 43, No. 1, Jan. 2016.

(56) References Cited

OTHER PUBLICATIONS

Hong Li et al., "Design of High Power Laser Beam Automatic Alignment System," Chinese Journal of Lasers, vol. 40, No. 10, Oct. 2016.

* cited by examiner

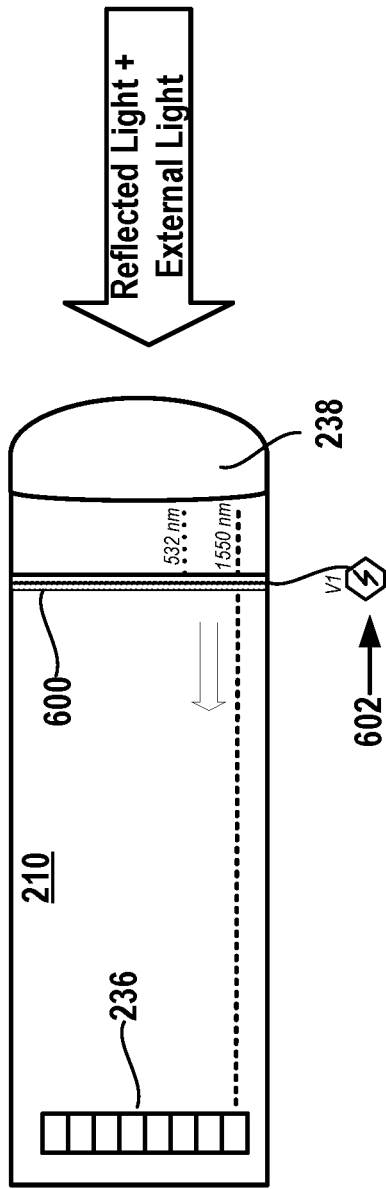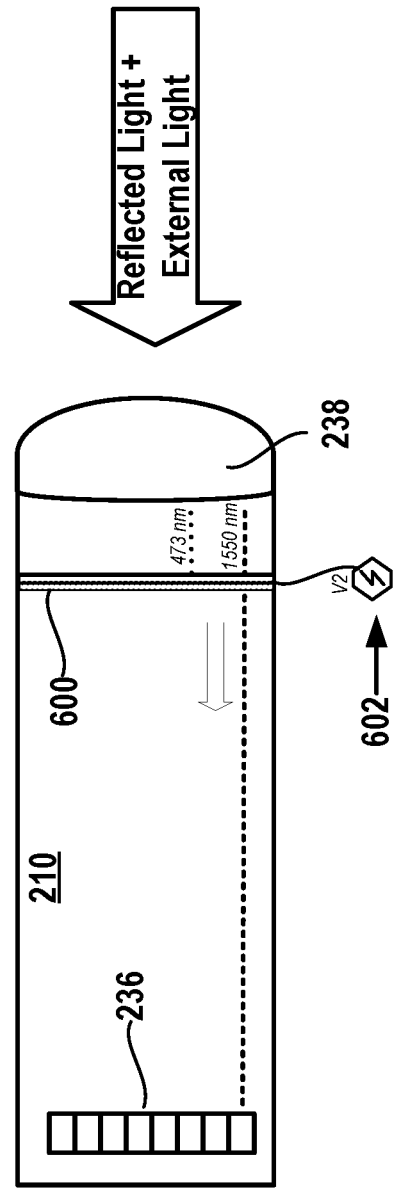

METHODS AND SYSTEMS FOR PROTECTING A LIGHT DETECTION AND RANGING (LIDAR) DEVICE

CROSS-REFERENCE TO RELATED APPLICATIONS

This application is a continuation of U.S. patent application Ser. No. 17/091,337, filed Nov. 6, 2020, now U.S. Pat. No. 10,845,470, which is a division of U.S. patent application Ser. No. 15/352,717, filed Nov. 16, 2016, now U.S. Pat. No. 11,614,523. The foregoing applications are incorporated herein by reference.

BACKGROUND

A vehicle can be configured to operate in an autonomous mode in which the vehicle navigates through an environment with little or no input from a driver. Such an autonomous vehicle can include one or more sensors that are configured to detect information about the environment in which the vehicle operates. One such sensor is a light detection and ranging (LIDAR) device.

A LIDAR device can estimate distance to environmental features while scanning through a scene to assemble a "point cloud" indicative of reflective surfaces in the environment. Individual points in the point cloud can be determined by transmitting a laser pulse and detecting a returning pulse, if any, reflected from an object in the environment, and determining the distance to the object according to the time delay between the transmitted pulse and the reception of the reflected pulse.

With this arrangement, a LIDAR device may thus include a laser, or set of lasers, that can be rapidly and repeatedly scanned across a scene to provide continuous real-time information on distances to reflective objects in the scene. Combining the measured distances and the orientation of the laser(s) while measuring each distance allows for associating a three-dimensional position with each returning pulse. In this way, a three-dimensional map of points indicative of locations of reflective features in the environment can be generated for the entire scanning zone.

SUMMARY

Example implementations may relate to methods and systems for protecting a LIDAR device against external light, which may originate at a light source other than a light source of the LIDAR device. When such external light is emitted towards the LIDAR device, the external light could cause damage to the LIDAR device and/or may cause the LIDAR device to falsely detect objects in the environment, among other possibilities. To help resolve these problems, the LIDAR device may be equipped with a mitigation system and/or may be operated (e.g., by a control system) to carry out mitigation operation(s).

In particular, the mitigation system may include one or more filters arranged to filter out certain wavelengths of light that are not being detected by the LIDAR device and/or to narrow down the space through which light enter the LIDAR device, among others. For example, the LIDAR device may include an interference filter, an adaptive filter, and/or a spatial filter. In practice, such filters may be positioned in the LIDAR device's optical path along which the LIDAR device is configured to focus light to one or more detectors. In another example, the LIDAR device may include an absorptive filter, which could be incorporated into the LIDAR device's housing and/or the LIDAR device's aperture.

Additionally or alternatively, a control system may operate the LIDAR device to carry out mitigation operations. For example, the control system may operate the LIDAR device to vary over time characteristics with which light is being emitted and to only detect light having characteristics that match the characteristics with which light is being emitted. In this example, the control system may do so proactively and/or may do so in response to detection of external light. In another example, the control system may operate the LIDAR device to activate a shutter to block the external light from being detected by the LIDAR device. In this example, the control system may do so in response to detection of external light. Other examples are also possible.

In one aspect, disclosed is a control system. The control system may include one or more processors, a non-transitory computer readable medium, and program instructions stored on the non-transitory computer readable medium and executable by the one or more processors to engage in a proactive mitigation procedure that protects operation of a LIDAR device against external light that is originated at a light source other than a light source of the LIDAR device and that is being emitted towards the LIDAR device. In particular, the proactive mitigation procedure may involve operating the LIDAR device to emit light with an initial set of optical characteristics and to only detect light having the initial set of optical characteristics. Additionally, the proactive mitigation procedure may involve determining an adjustment to one or more optical characteristics of the initial set of optical characteristics, thereby resulting in an adjusted set of optical characteristics. Further, the proactive mitigation procedure may involve, after determining the adjustment, operating the LIDAR device to emit light with the adjusted set of optical characteristics and to only detect light having the adjusted set of optical characteristics.

In another aspect, another control system is provided. The control system may include one or more processors, a non-transitory computer readable medium, and program instructions stored on the non-transitory computer readable medium and executable by the one or more processors. In particular, the program instructions may be executable to receive, from one or more sensors, sensor data indicative of external light being emitted towards a LIDAR device, wherein the external light is originated at a light source other than a light source of the LIDAR device. Additionally, the program instructions may be executable to, in response to receiving the sensor data indicative of external light being emitted towards the LIDAR device, engage in a reactive mitigation procedure to protect operation of the LIDAR device against the external light. More specifically, the reactive mitigation procedure may involve operating the LIDAR device to activate a shutter to block the external light from being detected by the LIDAR device. Additionally or alternatively, the reactive mitigation procedure may involve operating the LIDAR device to vary over time characteristics with which light is being emitted and to only detect light having characteristics that match the characteristics with which light is being emitted.

In yet another aspect, disclosed is a LIDAR device. The LIDAR device may include a transmitter that is configured to emit light into an environment, the emitted light having wavelengths in a wavelength range. Also, the transmitter may include a light source that is configured to generate the light emitted into the environment. The LIDAR device may also include a receiver having one or more detectors configured to detect light having wavelengths in the wavelength range while scanning the environment. Also, the receiver may be configured to focus light along an optical path to the one or more detectors. And the detectable light may enter the optical path through an aperture of the LIDAR device. The LIDAR device may additionally include a housing, where the transmitter and the receiver are disposed within the housing. The LIDAR device may further include a mitigation system arranged to protect operation of the LIDAR device against external light that is originated at a light source other than the light source included in the transmitter and that is being emitted towards the LIDAR device. This mitigation system may includes at least one of the following: (i) an interference filter positioned in the optical path, (ii) an absorptive filter incorporated into one or more of the housing and the aperture, (iii) an adaptive filter positioned in the optical path, or (iv) a spatial filter positioned in the optical path.

In yet another aspect, another system is disclosed. The system may include means for engaging in a proactive mitigation procedure that protects operation of a LIDAR device against external light that is originated at a light source other than a light source of the LIDAR device and that is being emitted towards the LIDAR device, where the proactive mitigation procedure involve (i) operating the LIDAR device to emit light with an initial set of optical characteristics and to only detect light having the initial set of optical characteristics, (ii) determining an adjustment to one or more optical characteristics of the initial set of optical characteristics, thereby resulting in an adjusted set of optical characteristics, and (iii) after determining the adjustment, operating the LIDAR device to emit light with the adjusted set of optical characteristics and to only detect light having the adjusted set of optical characteristics.

In yet another aspect, yet another system is disclosed. The system may include means for receiving sensor data indicative of external light being emitted towards a LIDAR device, where the external light is originated at a light source other than a light source of the LIDAR device. The system may also include means for, in response to receiving the sensor data indicative of external light being emitted towards the LIDAR device, engage in a reactive mitigation procedure to protect operation of the LIDAR device against the external light, where the reactive mitigation procedure involves at least one of the following: (i) operating the LIDAR device to activate a shutter to block the external light from being detected by the LIDAR device, or (ii) operating the LIDAR device to vary over time characteristics with which light is being emitted and to only detect light having characteristics that match the characteristics with which light is being emitted.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

FIG. 6A illustrates an approach for using an adaptive filter on a LIDAR device to filter out a first wavelength, according to an example embodiment.

FIG. 6B illustrates an approach for using an adaptive filter on a LIDAR device to filter out a second wavelength, according to an example embodiment.

DETAILED DESCRIPTION

Figure 1:
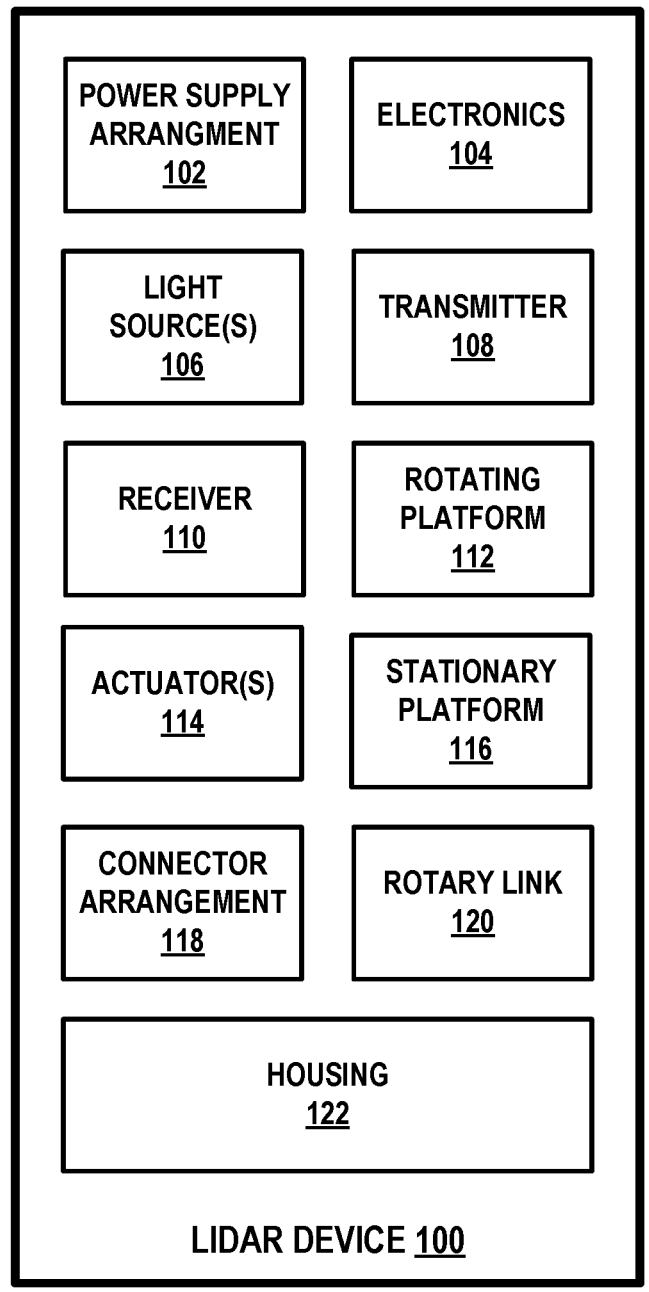
FIG. 1 is a simplified block diagram of a LIDAR device, according to an example embodiment.

Exemplary methods and systems are described herein. It should be understood that the word "exemplary" is used herein to mean "serving as an example, instance, or illustration." Any implementation or feature described herein as "exemplary" or "illustrative" is not necessarily to be construed as preferred or advantageous over other implementations or features. In the figures, similar symbols typically identify similar components, unless context dictates otherwise. The example implementations described herein are not meant to be limiting. It will be readily understood that the aspects of the present disclosure, as generally described herein, and illustrated in the figures, can be arranged, substituted, combined, separated, and designed in a wide variety of different configurations, all of which are contemplated herein.

I. OVERVIEW

There are continued efforts to improve vehicle safety and/or autonomous operation, including the development of vehicles equipped with accident-avoidance systems and remote sensing capabilities. Various sensors, such as a LIDAR device, may be included in a vehicle to detect obstacles or objects in an environment of the vehicle and thereby facilitate accident avoidance and/or autonomous operation, among other options.

In some situations, external light (e.g., originated at a light source other than that of the LIDAR device) may be intentionally or unintentionally emitted towards the LIDAR device, which could lead to various issues. For example, the external light may be of a sufficiently high intensity to damage the LIDAR device if it enters the LIDAR device's optical path. In another example, if the external light enters the optical path, the external light may cause the LIDAR device to generate false data points. In this example, a control system (e.g., a vehicle's control system) evaluating data from the LIDAR device may thus erroneously determine that the false data points are indicative of presence of an object in the environment that is in fact not present in the environment.

To help resolve such issues, disclosed herein are methods and systems to help protect the LIDAR device against external light that is originated at a light source other than the light source of the LIDAR device and that is being emitted towards the LIDAR device. In particular, disclosed are a mitigation system, proactive mitigation procedures, and reactive mitigation procedures. In practice, the LIDAR device and/or the control system operating the LIDAR device could be equipped with any feasible combination of these mitigation procedures and/or systems.

More specifically, a proactive mitigation procedure may involve a control system operating a LIDAR device (e.g., continuously or from time-to-time) to protect against external light and doing so whether or not such external light is actually being emitted towards the LIDAR device. In this way, the control system may take steps in advance so as to ensure that measures are in place to protect operation of the LIDAR device against external light.

In accordance with the present disclosure, the proactive mitigation procedure may involve operating the LIDAR device to vary over time characteristics with which light is being emitted and to only detect light having characteristics that match the characteristics with which light is being emitted. These characteristics may include timing of emissions and detections, wavelengths of light being emitted and detected, spatial intensity patterns of emitted and detected light, and/or modulation of emitted and detected light, among others.

Further, a reactive mitigation procedure may involve a control system carrying out one or more operations to protect the LIDAR device against external light and doing so specifically in response to detecting that external light is being emitted towards the LIDAR device. In practice, the control system may detect that external light is being emitted toward the LIDAR device based on sensor data indicating so. And the control system may receive such sensor data from one or more sensors, such as from the LIDAR device itself and/or from one or more other sensors (e.g., other sensors coupled to the vehicle), among other possibilities. In accordance with the present disclosure, operations carried during the reactive mitigation procedure may take various forms.

In one case, the control system may respond to detection of external light by engaging in the above-described variation of optical characteristics. As described, such variation may specifically involve operating the LIDAR device to vary over time characteristics with which light is being emitted and to only detect light having characteristics that are the same as the characteristics with which light is being emitted.

In another case, the control system may respond to external light by operating the LIDAR device to activate a shutter to block the external light from being detected by the LIDAR device. This shutter may be a mechanical shutter and/or may be an optical shutter, among other possibilities. In either arrangement, the control system may cause temporary activation of the shutter only at times when the LIDAR device's receiver is aligned (e.g., during rotation of the LIDAR device) along a particular portion of the LIDAR device's field of view (FOV) from which external light is arriving at the LIDAR device. In this way, the control system may help block detection of the external light by the LIDAR device while ensuring that the LIDAR device still scans other portions of the environment.

Yet further, a mitigation system may include one or more filters arranged to protect operation of the LIDAR device against external light by blocking one or more wavelengths of the external light and/or by narrowing down the space through which light enters the LIDAR device. As noted, these filters may include an interference filter, an absorptive filter, an adaptive filter, and/or a spatial filter. Given this mitigation system, the LIDAR device may thus have one or more hardware components that are always in place to provide mitigation features against external light.

II. EXAMPLE ARRANGEMENT OF A LIDAR DEVICE

Referring now to the Figures, FIG. 1 is a simplified block diagram of a LIDAR device 100, according to an example embodiment. As shown, the LIDAR device 100 includes a power supply arrangement 102, electronics 104, light source(s) 106, at least one transmitter 108, at least one receiver 110, a rotating platform 112, actuator(s) 114, a stationary platform 116, a connector arrangement 118, a rotary link 120, and a housing 122. In other embodiments, the LIDAR device 100 may include more, fewer, or different components. Additionally, the components shown may be combined or divided in any number of ways.

Power supply arrangement 102 may be configured to supply power to various components of the LIDAR device 100. In particular, the power supply arrangement 102 may include or otherwise take the form of at least one power source disposed within the LIDAR device 100 and connected to various components of the LIDAR device 100 in any feasible manner, so as to supply power to those components. Additionally or alternatively, the power supply arrangement 102 may include or otherwise take the form of a power adapter or the like that is configured to receive power from one or more external power sources (e.g., from a power source arranged in a vehicle to which the LIDAR device 100 is coupled) and to supply that received power to various components of the LIDAR device 100 in any feasible manner. In either case, any type of power source may be used such as, for example, a battery.

Electronics 104 may include one or more electronic components and/or systems each arranged to help facilitate certain respective operations of the LIDAR device 100. In practice, these electronics 104 may be disposed within the LIDAR device 100 in any feasible manner. For instance, at least some of the electronics 104 may be disposed within a central cavity region of the rotary link 120. Nonetheless, the electronics 104 may include various types of electronic components and/or systems.

For example, the electronics 104 may include various wirings used for transfer of control signals from a control system to various components of the LIDAR device 100 and/or for transfer of data from various components of the LIDAR device 100 to the control system. Generally, the data that the control system receives may include sensor data based on detections of light by the receiver 110, among other possibilities. Moreover, the control signals sent by the control system may operate various components of the LIDAR device 100, such as by controlling emission of light by the transmitter 108, controlling detection of light by the receiver 110, and/or controlling the actuator(s) 114 to rotate the rotating platform 112, among other possibilities.

In some arrangements, the electronics 104 may also include the control system at issue. This control system may have one or more processors, data storage, and program instructions stored on the data storage and executable by the one or more processor to facilitate various operations. With this arrangement, the control system may thus be configured to carry operations described herein, such as those of methods described below. Additionally or alternatively, the control system may communicate with an external control system or the like (e.g., a computing system arranged in a vehicle to which the LIDAR device 100 is coupled) so as to help facilitate transfer of control signals and/or data between the external control system and the various components of the LIDAR device 100.

In other arrangements, however, the electronics 104 may not include the control system at issue. Rather, at least some of the above-mentioned wirings may be used for connectivity to an external control system. With this arrangement, the wirings may help facilitate transfer of control signals and/or data between the external control system and the various components of the LIDAR device 100. Other arrangements are possible as well.

Further, one or more light sources 106 can be configured to emit, respectively, a plurality of light beams and/or pulses having wavelengths within a wavelength range. The wavelength range could, for example, be in the ultraviolet, visible, and/or infrared portions of the electromagnetic spectrum. In some examples, the wavelength range can be a narrow wavelength range, such as provided by lasers. In one example, the wavelength range includes wavelengths that are approximately between 1525 nm and 1565 nm. It is noted that this range is described for exemplary purposes only and is not meant to be limiting.

In practice, one of the light sources 106 may be a fiber laser that includes an optical amplifier. In particular, the fiber laser may be a laser in which an active gain medium (i.e., a source of optical gain within the laser) is in an optical fiber. Moreover, the fiber laser could be arranged in various ways within the LIDAR device 100. For instance, the fiber laser could be disposed between the rotating platform 112 and the receiver 110.

As such, the present disclosure will be generally described herein in the context of a fiber laser being used as the primary light source 106. In some arrangements, however, the one or more light sources 106 may additionally or alternatively include laser diodes, light emitting diodes (LED), vertical cavity surface emitting lasers (VCSEL), organic light emitting diodes (OLED), polymer light emitting diodes (PLED), light emitting polymers (LEP), liquid crystal displays (LCD), microelectromechanical systems (MEMS), and/or any other device configured to selectively transmit, reflect, and/or emit light to provide the plurality of emitted light beams and/or pulses.

Furthermore, transmitter 108 may be configured to emit light into an environment. In particular, the transmitter 108 may include an optical arrangement that is arranged to direct light from a light source 106 toward the environment. This optical arrangement may include any feasible combination of mirror(s) used to guide propagation of the light throughout physical space and/or lens(es) used to adjust certain characteristics of the light, among other optical components. For instance, the optical arrangement may include a transmit lens arranged to collimate the light, thereby resulting in light having rays that are substantially parallel to one another. Moreover, the lens may be shaped to spread or otherwise scatter light in a particular manner, such as by causing the vertical light spread of +7° away from a horizontal axis to −18° away from the horizontal axis (e.g., the horizontal axis ideally being parallel to a ground surface in the environment) for example.

As noted, the LIDAR device 100 may include at least one receiver 110. The receiver 110 may be respectively configured to at least detect light having wavelengths in the same wavelength range as the one of the light emitted from the transmitter 108 (e.g., 1525 nm to 1565 nm). In doing so, the receiver 110 may detect light with a particular resolution. For example, the receiver 110 may be configured to detect light with a 0.036° (horizontal)×0.067° (vertical) angular resolution. Moreover, the receiver 110 may be configured to scan the environment with a particular FOV. For example, the receiver 110 may be arranged to focus incoming light within a range of +7° away from the above-mentioned horizontal axis to −18° away from the horizontal axis. In this way, the receiver 110 allows for detection of light along a range of +7° to −18°, which matches the above-mentioned exemplary vertical spread of emitted light that the transmitter 108 provides. It is noted that this resolution and FOV are described for exemplary purposes only and are not meant to be limiting.

In an example implementation, the receiver 110 may have an optical arrangement that allows the receiver 110 to provide the resolution and FOV as described above. Generally, such an optical arrangement may be arranged to provide an optical path between at least one optical lens and a photodetector array.

More specifically, the receiver 110 may include an optical lens arranged to focus light reflected from one or more objects in the environment of the LIDAR device 100 onto detectors of the receiver 110. To do so, the optical lens may have certain dimensions (e.g., approximately 10 cm×5 cm) as well as a certain focal length (e.g., approximately 35 cm). Moreover, the optical lens may be shaped so as to focus incoming light along a particular vertical FOV as described above (e.g., +7° to −18°). Such shaping of the first receiver's optical lens may take on one of various forms (e.g., spherical shaping) without departing from the scope of the present disclosure.

Furthermore, as noted, the receiver 110 may have a photodetector array, which may include two or more detectors each configured to convert detected light (e.g., in the above-mentioned wavelength range) into an electrical signal indicative of the detected light. In practice, such a photodetector array could be arranged in one of various ways. For example, the detectors can be disposed on one or more substrates (e.g., printed circuit boards (PCBs), flexible PCBs, etc.) and arranged to detect incoming light that is traveling along the optical path from the optical lens. Also, such a photodetector array could include any feasible number of detectors aligned in any feasible manner. For example, the photodetector array may include a 13×16 array of detectors. It is noted that this photodetector array is described for exemplary purposes only and is not meant to be limiting.

Generally, the detectors of the array may take various forms. For example, the detectors may take the form of photodiodes, avalanche photodiodes (e.g., geiger mode and/or linear mode avalanche photodiodes), phototransistors, cameras, active pixel sensors (APS), charge coupled devices (CCD), cryogenic detectors, and/or any other sensor of light configured to receive focused light having wavelengths in the wavelength range of the emitted light. Other examples are possible as well.

Further, as noted, the LIDAR device 100 may include a rotating platform 112 that is configured to rotate about an axis. In order to rotate in this manner, one or more actuators 114 may actuate the rotating platform 112. In practice, these actuators 114 may include motors, pneumatic actuators, hydraulic pistons, and/or piezoelectric actuators, among other possibilities.

In an example implementation, the transmitter 108 and the receiver 110 may be arranged on the rotating platform 112 such that each of these components moves relative to the environment based on rotation of the rotating platform 112. In particular, each of these components could be rotated relative to an axis so that the LIDAR device 100 may obtain information from various directions. In this manner, the LIDAR device 100 may have a horizontal viewing direction that can be adjusted by actuating the rotating platform 112 to different directions.

With this arrangement, a control system could direct an actuator 114 to rotate the rotating platform 112 in various ways so as to obtain information about the environment in various ways. In particular, the rotating platform 112 could rotate at various extents and in either direction. For example, the rotating platform 112 may carry out full revolutions such that the LIDAR device 100 provides a 360° horizontal FOV of the environment. Thus, given that the receiver 110 may rotate based on rotation of the rotating platform 112, the receiver 110 may have a horizontal FOV (e.g., 360°) and also a vertical FOV as described above.

Moreover, the rotating platform 112 could rotate at various rates so as to cause LIDAR device 100 to scan the environment at various refresh rates. For example, the LIDAR device 100 may be configured to have a refresh rate of 15 Hz (e.g., fifteen complete rotations of the LIDAR device 100 per second). In this example, assuming that the LIDAR device 100 is coupled to a vehicle as further described below, the scanning thus involves scanning a 360° FOV around the vehicle fifteen times every second. Other examples are also possible.

Yet further, as noted, the LIDAR device 100 may include a stationary platform 116. In practice, the stationary platform 116 may take on any shape or form and may be configured for coupling to various structures, such as to a top of a vehicle for example. Also, the coupling of the stationary platform 116 may be carried out via any feasible connector arrangement 118 (e.g., bolts, screws, and/or adhesives). In this way, the LIDAR device 100 could be coupled to a structure so as to be used for various purposes, such as those described herein.

Furthermore, the LIDAR device 100 may also include a rotary link 120 that directly or indirectly couples the stationary platform 116 to the rotating platform 112. Specifically, the rotary link 120 may take on any shape, form and material that provides for rotation of the rotating platform 112 about an axis relative to the stationary platform 116. For instance, the rotary link 120 may take the form of a shaft or the like that rotates based on actuation from an actuator 114, thereby transferring mechanical forces from the actuator 114 to the rotating platform 112. Moreover, as noted, the rotary link 120 may have a central cavity in which electronics 104 and/or one or more other components of the LIDAR device 100 may be disposed. Other arrangements are possible as well.

Yet further, as noted, the LIDAR device 100 may include a housing 122. In practice, the housing 122 may take on any shape and form. For example, the housing 122 can be a dome-shaped housing, among other possibilities. Moreover, the housing 122 may be arranged in various ways relative to other components of the LIDAR device 100. It is noted that this housing is described for exemplary purposes only and is not meant to be limiting.

In an example implementation, the housing 122 may be coupled to the rotating platform 112 such that the housing 122 is configured to rotate about the above-mentioned axis based on rotation of the rotating platform 112. With this implementation, the transmitter 108, the receiver 110, and possibly other components of the LIDAR device 100 may each be disposed within the housing 122. In this manner, the transmitter 108 and the receiver 110 may rotate along with this housing 122 while being disposed within the housing 122.

Moreover, the housing 122 may have an aperture formed thereon, which could take on any feasible shape and size. In this regard, the transmitter 108 could be arranged within the housing 122 so as to emit light into the environment through the aperture. In this way, the transmitter 108 may rotate along with the aperture due to corresponding rotation of the housing 122, thereby allowing for emission of light into various directions. Also, the receiver 110 could be arranged within the housing 122 so as to detect light that enters the housing 122 from the environment through the aperture. In this way, the receiver 110 may rotate along with the aperture due to corresponding rotating of the housing 122, thereby allowing for detection of the light incoming from various directions along the horizontal FOV.

Yet further, the housing 122 may be composed of a material that is at least partially non-transparent, except for the aperture, which could be composed of a transparent material. In this way, light could propagate through the aperture, thereby allowing for scanning of the environment. But due to the housing 122 being at least partially non-transparent, the housing 122 may block at least some light from entering the interior space of the housing 122 and thus may help mitigate thermal effects. For instance, the housing 122 may block sun rays from entering the interior space of the housing 122, which may help avoid overheating of various components of the LIDAR device 100 due to those sun rays. Moreover, due to various components of the LIDAR device 100 being disposed within the housing 122 and due to the housing 122 rotating along with those components, the housing 122 may help protect those components from various environmental hazards, such as rain and/or snow, among others.

In other implementations, however, the housing 122 may be an exterior stationary housing that does not rotate with the LIDAR device 100. For example, the exterior stationary housing could be coupled to a vehicle and the LIDAR device could also be coupled to the vehicle while being configured to rotate within the exterior stationary housing. In this situation, the exterior stationary housing would likely be transparent so as to allow for propagation of light through the exterior stationary housing and thus for scanning of the environment by the LIDAR device 100. Moreover, the LIDAR device 100 may also include an aperture through which light may propagate and such an aperture may be on an interior housing of the LIDAR device 100, which may rotate within the exterior stationary housing along with other components of the LIDAR device 100. Other implementations are possible as well.

III. ILLUSTRATIVE IMPLEMENTATION OF THE LIDAR DEVICE

Figure 2A:
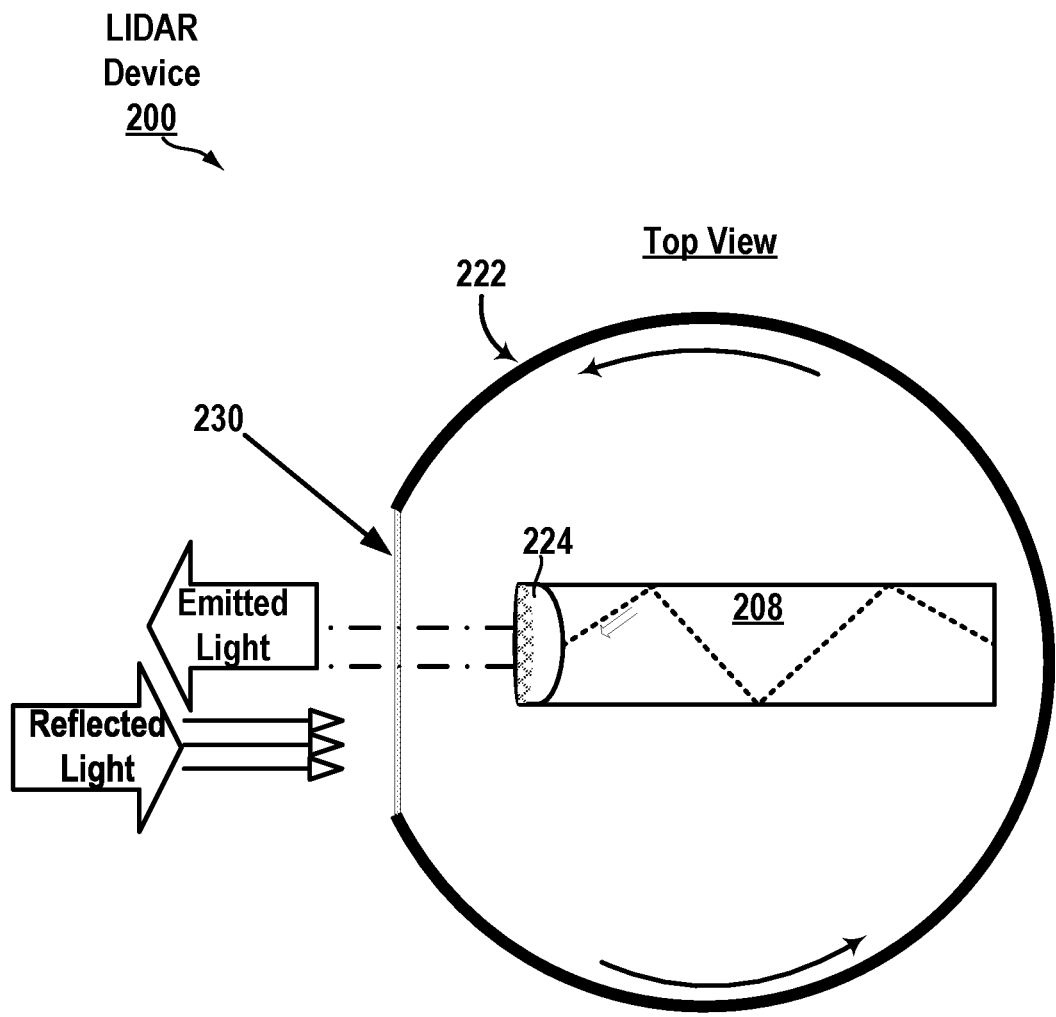
FIG. 2A shows a cross-sectional illustration of a top view of a LIDAR device, according to an example embodiment.
Figure 2B:
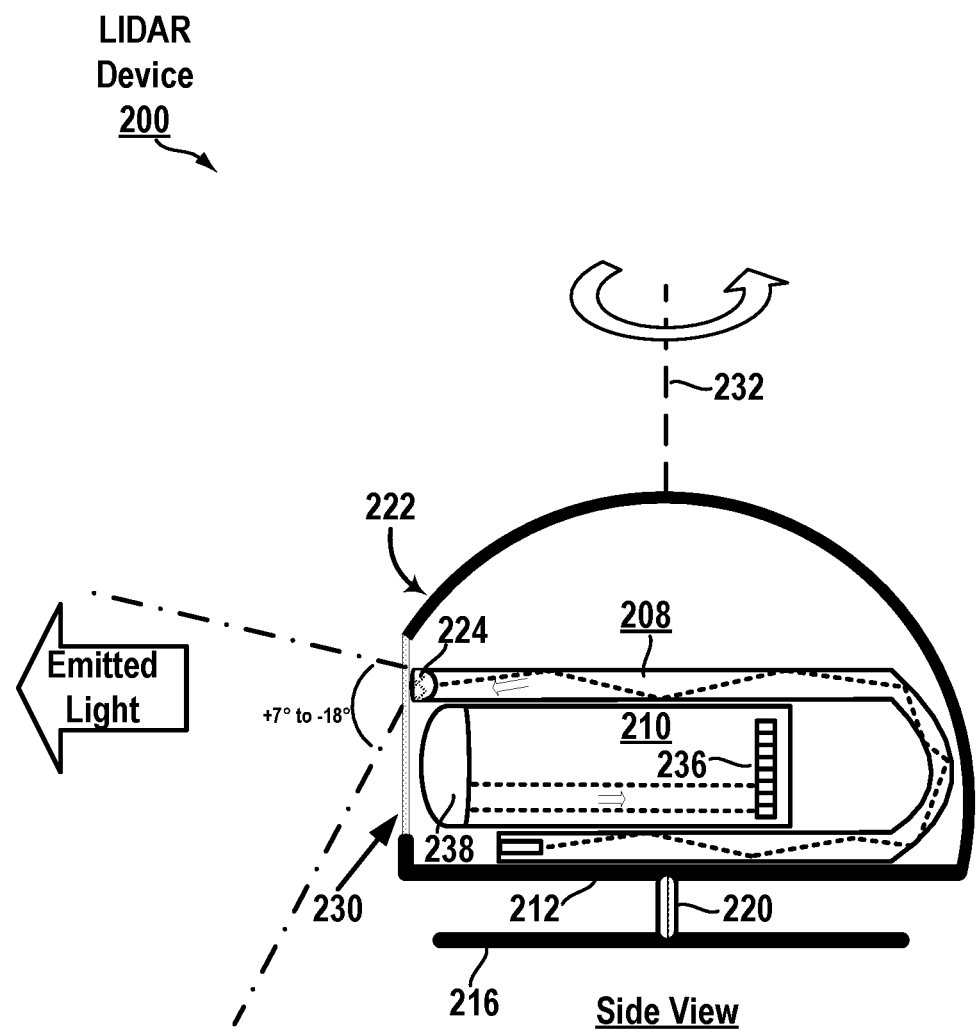
FIG. 2B shows a cross-sectional illustration of a side view of a LIDAR device, according to an example embodiment.
Figure 2C:
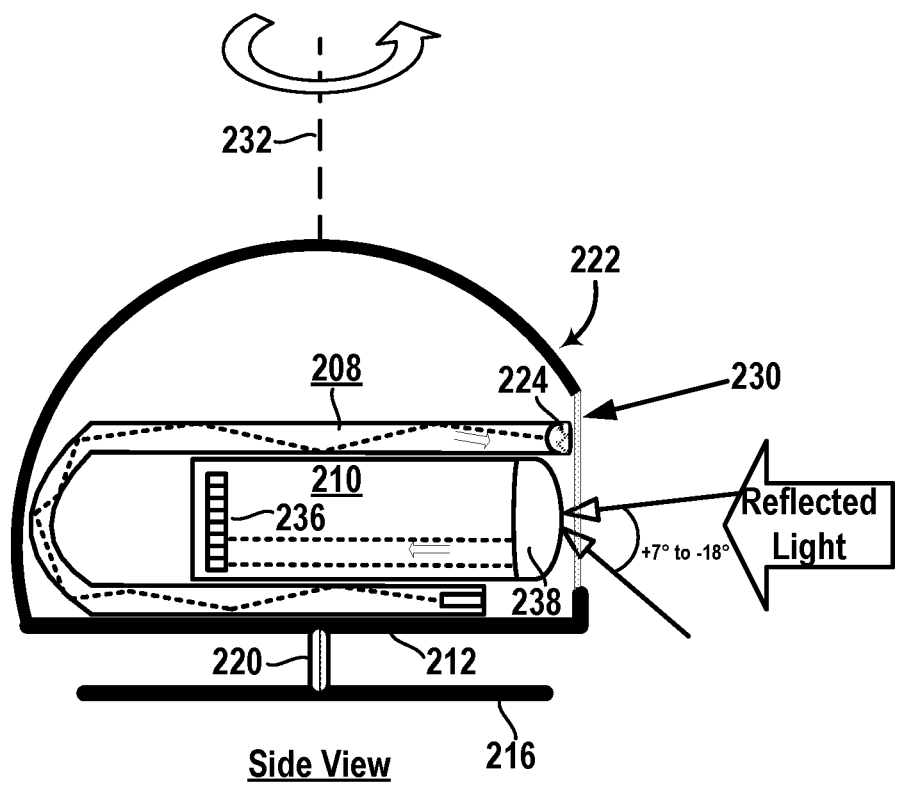
FIG. 2C shows a cross-sectional illustration of a different side view of a LIDAR device, according to an example embodiment.

FIGS. 2A to 2C next show an example set of simplified illustrations of a LIDAR device having the features described above. In particular, FIG. 2A shows a top cross-sectional view of a LIDAR device 200, FIG. 2B shows a side cross-sectional view of the LIDAR device 200, and FIG. 2C shows a side cross-sectional view of the LIDAR device 200 that is opposite to the side view shown in FIG. 2B (e.g., such as a side view shown after half a revolution of the LIDAR device 200 about axis 232). It is noted that these illustrations are shown for exemplary purposes only and are not meant to be limiting.

More specifically, FIGS. 2A to 2C collectively illustrate that the LIDAR device 200 includes a housing 222 that is coupled to a rotating platform 212, in accordance with the discussion above. The rotating platform 212 is then shown as being coupled to a stationary platform 216 via a rotary link 220, also in accordance with the discussion above. With this arrangement, the rotating platform 212 may rotate about axis 232, thereby also causing rotation of the housing 222, a transmitter 208, and a receiver 210 of the LIDAR device 200 about the axis 232.

In practice, the housing 222 could take the form of housing 122 described above. Also, the housing 222 is shown to include an aperture 230 through which light may be emitted into the environment and through which reflected light may enter from the environment. Further, FIGS. 2A to 2C collectively illustrate that the transmitter 208 and the receiver 210 are each disposed within the housing 222, with the transmitter 208 being positioned above the receiver 210.

More specifically, the transmitter 208 may take the form of transmitter 108 described above. As shown in FIGS. 2A-2C, the transmitter 208 includes an optical lens 224 fused with a fiber laser that acts as an optical amplifier, the fiber laser being at least partially positioned between the rotating platform 212 and the receiver 210. And in accordance with the discussion above, the optical lens 224 may be arranged to vertically spread the emitted light along a particular vertical spread of +7° to −18°.

Additionally, the receiver 210 may take the form of receiver 110 described above. As shown in FIGS. 2A-2C, the receiver 210 includes an optical arrangement that provides an optical path between an optical lens 238 and a photodetector array 236. Specifically, the optical lens 238 may be arranged to focus incoming light within a vertical FOV range of +7° to −18°. And in accordance with the discussion above, the photodetector array 236 may be configured to detect light at a 0.036° (horizontal)×0.067° (vertical) angular resolution. Other illustrations are possible as well.

FIGS. 3A to 3D next collectively illustrate implementation of the disclosed LIDAR device in a vehicle 300, specifically illustrating an implementation of the example LIDAR device 200 in the vehicle 300. Although vehicle 300 is illustrated as a car, other embodiments are possible. Furthermore, although the example vehicle 300 is shown as a vehicle that may be configured to operate in autonomous mode, the embodiments described herein are also applicable to vehicles that are not configured to operate autonomously. Thus, the example vehicle 300 is not meant to be limiting.

Figure 3A:
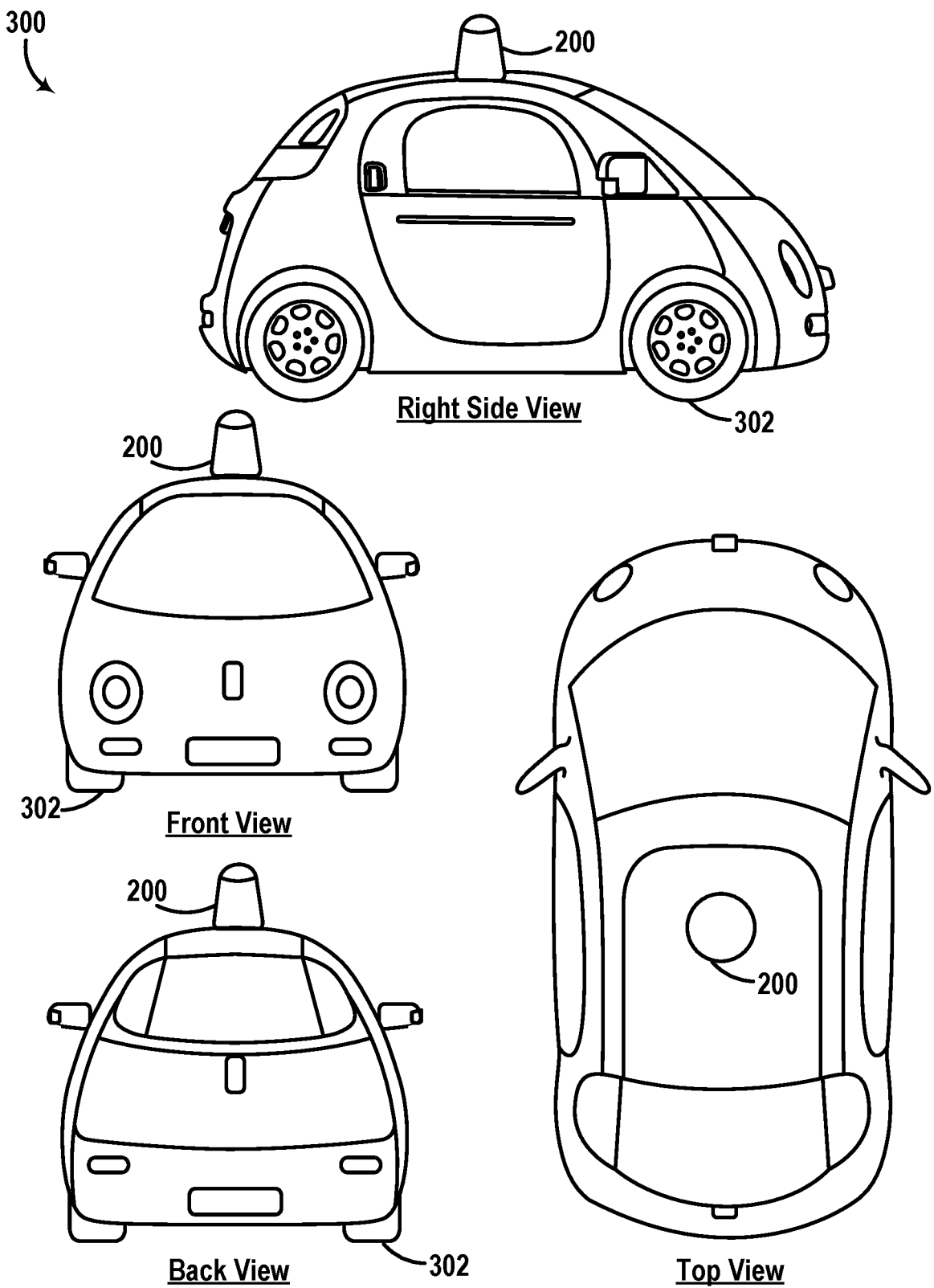
FIG. 3A shows several views of a LIDAR device being positioned on top of a vehicle, according to an example embodiment.

In particular, FIG. 3A shows a Right Side View, Front View, Back View, and Top View of the vehicle 300. As shown, the vehicle 300 includes the LIDAR device 200 being positioned on a top side of the vehicle 300 opposite a bottom side on which wheels 302 of the vehicle 300 are located. Although the LIDAR device 200 is shown and described as being positioned on the top side of the vehicle 300, the LIDAR device 200 could be positioned on any part feasible portion of the vehicle without departing from the scope of the present disclosure.

Figure 3B:
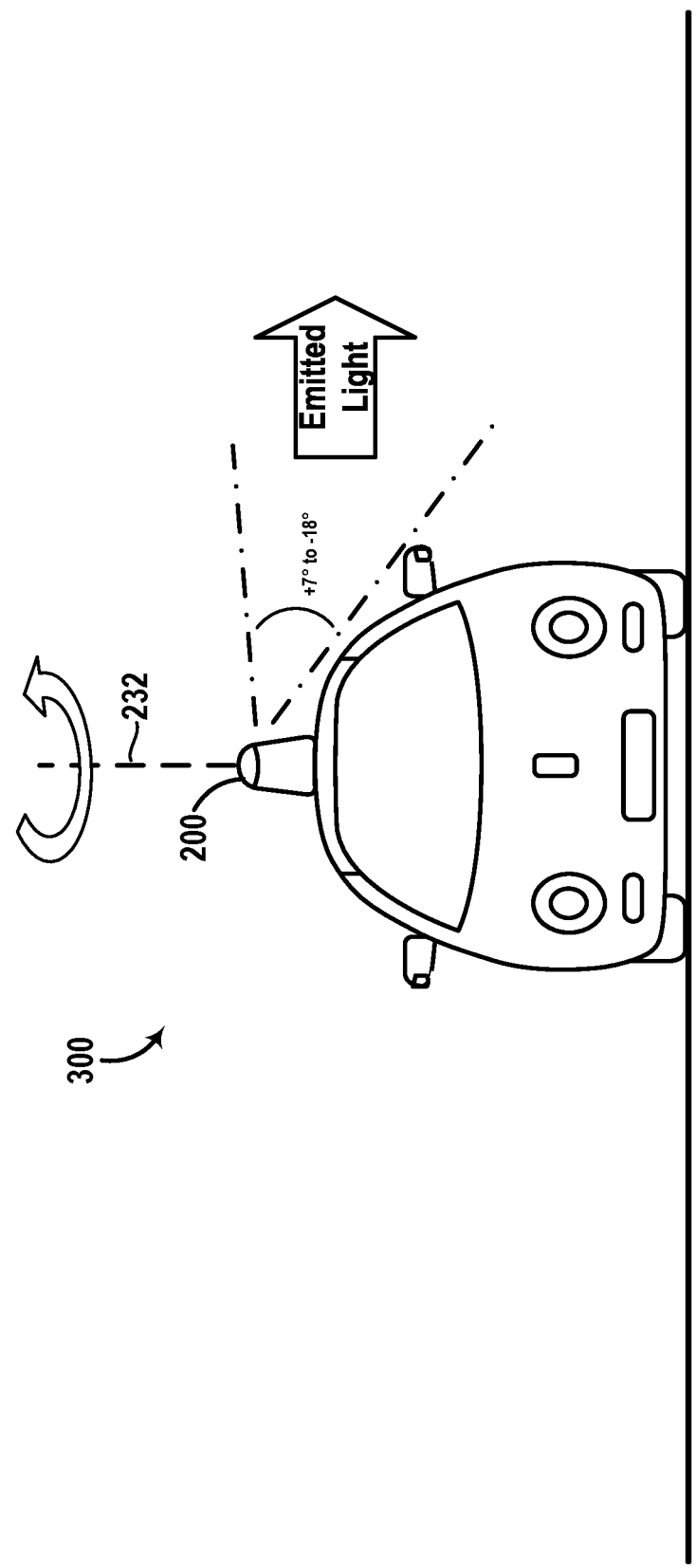
FIG. 3B shows emission of light by a LIDAR device positioned on top of the vehicle, according to an example embodiment.
Figure 3C:
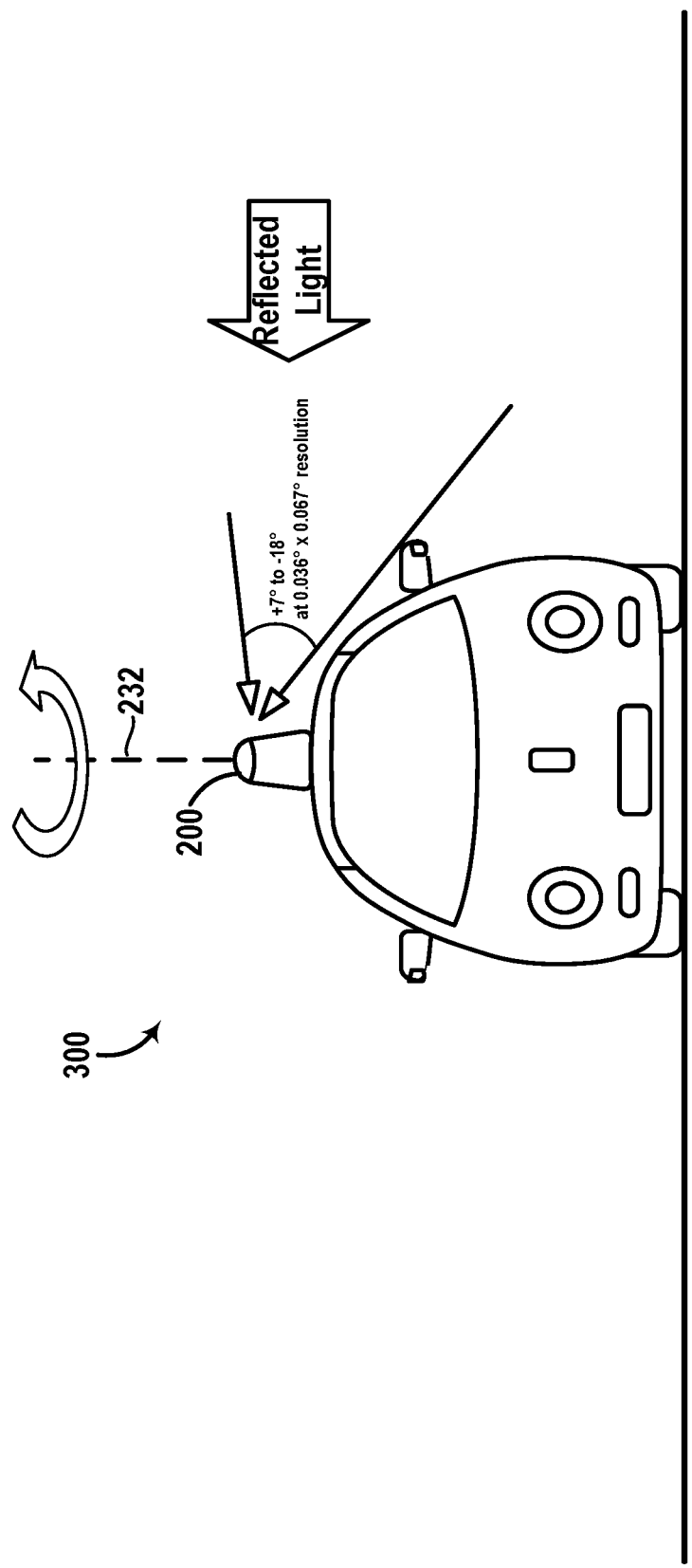
FIG. 3C shows detection of reflected light by a LIDAR device positioned on top of the vehicle, according to an example embodiment.

Moreover, FIGS. 3B to 3C next show that the LIDAR device 200 may be configured to scan an environment around the vehicle 300 (e.g., at a refresh rate of 15 Hz) by rotating about the vertical axis 232 while emitting one or more light pulses and detecting reflected light pulses off objects in the environment of the vehicle 300, for example.

More specifically, FIG. 3B shows that the LIDAR device 200 emits light with the above-mentioned vertical spread of +7° to −18°. In this way, the light emissions can be emitted toward regions of the environment that are relatively close to the vehicle 300 (e.g., a lane marker) and/or towards regions of the environment that are further away from the vehicle 300 (e.g., a road sign ahead of the vehicle).

Further, FIG. 3C shows that the LIDAR device 200 uses the receiver 210 to detect reflected light with the above-mentioned vertical FOV of +7° to −18° and do so at a resolution of 0.036°×0.067°. In this way, the receiver 210 may detect light reflected off regions of the environment that are relatively close to the vehicle 300 and/or light reflected off regions of the environment that are further away from the vehicle 300.

Figure 3D:
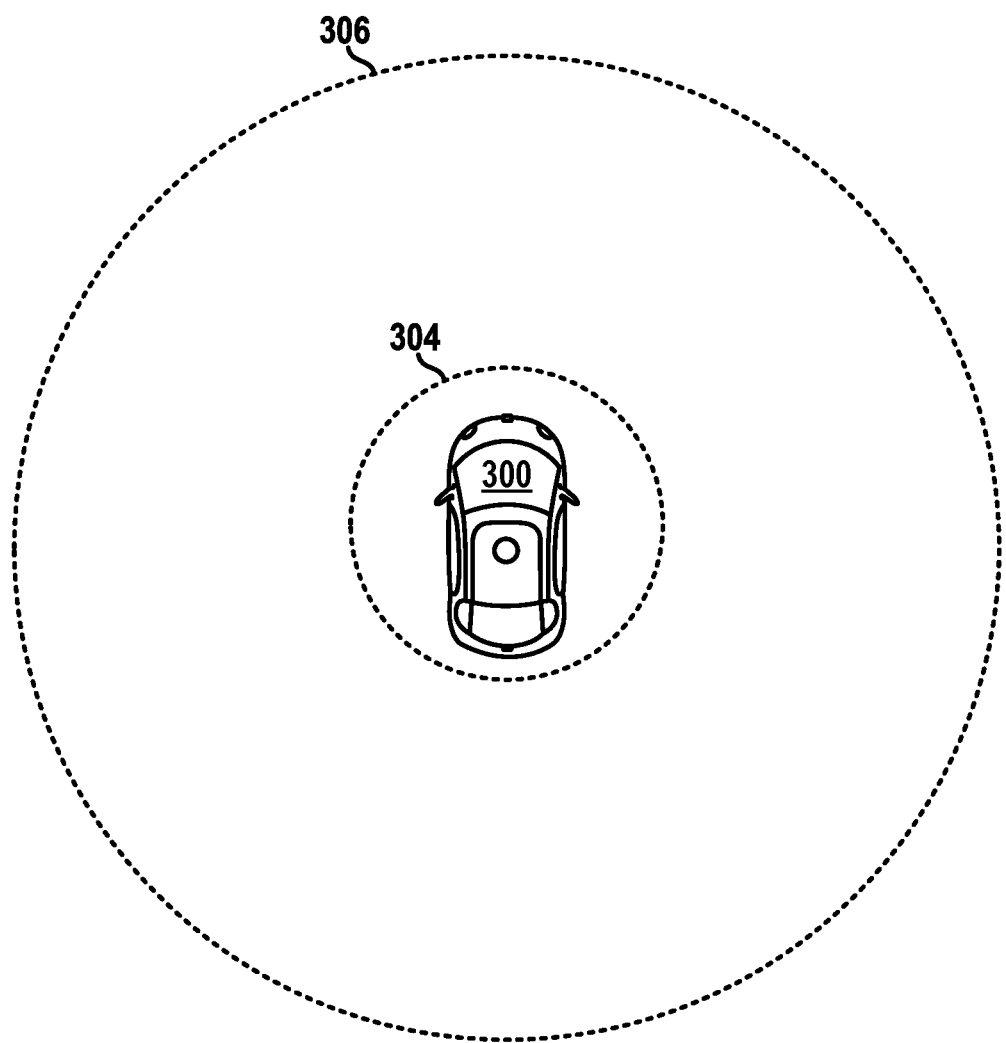
FIG. 3D shows a scanning range of a LIDAR device positioned on top of the vehicle, according to an example embodiment.

Generally, these detection distances are illustrated by way of example in FIG. 3D. In particular, FIG. 3D illustrates a top view of the vehicle 300 in the above-described scenario where the vehicle 300 uses the LIDAR device 200 for scanning a surrounding environment. Accordingly, the horizontal FOV of the receiver 210 may span 360° in all directions around the vehicle 300.

As shown in FIG. 3D, the LIDAR device 200 may be suitable for detection and/or identification of objects within a range of distances to the vehicle 300. More specifically, objects outside of contour 304 and within a range of distances defined by the contour 306 may be properly detected/identified using the data from the receiver 210 of the LIDAR device 200. It is noted that these contours are not to scale but are illustrated as shown for convenience of description.

IV. A MITIGATION SYSTEM TO PROTECT A LIDAR DEVICE

In accordance with the present disclosure, a LIDAR device may be equipped with a mitigation system that helps protect operation of the LIDAR device against external light. As noted, the mitigation system may include one or more filters such as an interference filter, an absorptive filter, an adaptive filter, and/or a spatial filter. Given this mitigation system, the LIDAR device may thus have one or more hardware components that are always in place to provide measures against external light.

i. Interference Filter

An interference filter is a filter that is arranged to use the physical phenomenon of wave interference to filter out one or more wavelengths of light and to pass through one or more other wavelengths of light. In practice, an interference filter may be configured in various shapes (e.g., rectangular) and may be composed of one or more materials that are arranged to help facilitate such filtering of certain wavelengths of light.

For example, an interference filter may be composed of alternating layers of high and low refractive index materials, which are deposited on a transparent substrate such as glass or the like. With this arrangement, light traveling from a lower index material may reflect off a higher index material in such a way that only light of certain angles and wavelengths will constructively interfere and pass through the material while all other light will destructively interfere and reflect off the material. Generally, the thickness and refractive index values for the various layers may control interference of light waves reflected at each layer interface. Thus, each thickness and refractive index could be selected by design so as to select the target wavelengths to be filtered out.

Given these principles of operation of an interference filter, an interference filter may be designed as a longpass filter that only permits longer wavelengths to pass through, a shortpass filter that only permits shorter wavelengths to pass through, or a bandpass filter that only permits a certain wavelength band to pass through, among various other options. As such, a LIDAR device may include one or more such interference filters so as to filter out certain combinations of wavelengths.

In particular, a LIDAR device may include an interference filter that is arranged to filter out light having one or more wavelengths outside of the LIDAR device's detectable wavelength range and to at least pass through light having wavelengths in the LIDAR device's detectable wavelength range. In practice, the target wavelengths that are filtered out may be those of external light originating at commonly used external light sources and/or those known to damage functionality of the LIDAR device's detectors, among other possibilities. For instance, these commonly used external light sources may be laser pointers, which are known to emit light of certain wavelengths, such as wavelengths of 473 nm and/or 532 nm for example. Thus, the LIDAR device may include one or more interference filters arranged to filter out any external light having wavelengths of 473 nm and/or 532 nm, thereby helping protect the LIDAR device.

Furthermore, an interference filter may be positioned anywhere in the LIDAR device's optical path so that light is filtered out before it reaches the LIDAR device's detectors. In one example, an interference filter may be positioned in front of the receiver's lens, so that light is filtered out before passing through the lens. In another example, an interference filter may be positioned after the receiver's lens, so that light passes through the lens and is then filtered out before reaching the detectors. In yet another example, interference filter may be deposited on or otherwise incorporated into the receiver's lens in various ways, so that light is filtered out while passing through the lens. Other examples are possible as well.

Figure 4:
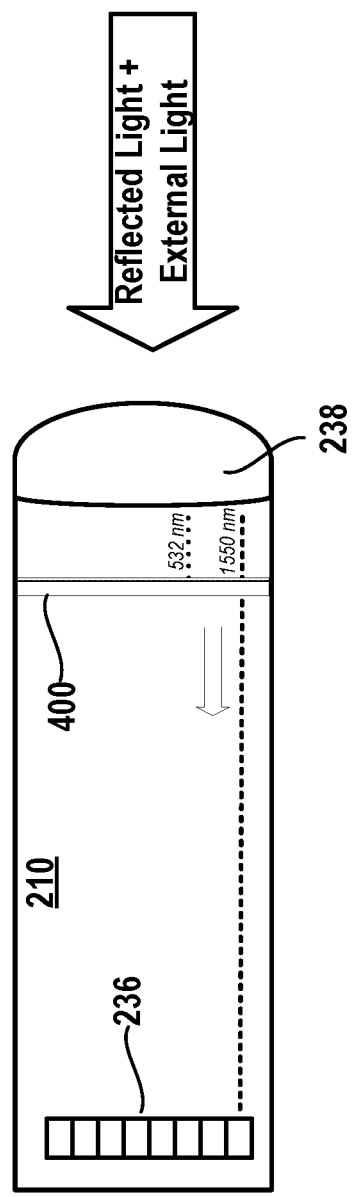
FIG. 4 illustrates an approach for incorporating an interference filter into a LIDAR device, according to an example embodiment.

FIG. 4 illustrates an approach for incorporating a representative interference filter 400 into the LIDAR device 200. In particular, FIG. 4 is a close up illustration of the receiver 210 having the interference filter 400. As shown, the interference filter 400 is positioned after the lens 238, so that light passes through the lens 238 and is then filtered out by the interference filter 400 before reaching the detectors 236. Furthermore, as shown, the interference filter 400 is configured to at least filter out light having a wavelength of 532 nm, which is a wavelength emitted by a commonly used laser pointer, and to at least pass through light having a wavelength of 1550 nm, which is a wavelength within the LIDAR device 200's detectable wavelength range. Other illustrations are possible as well.

ii. Absorptive Filter

An absorptive filter is arranged to absorb one or more wavelengths of light and to pass through one or more other wavelengths of light. In an absorptive filter, light is blocked based on the absorption properties of the substrate used. Consequently, light that is blocked does not reflect off the filter; rather, it is absorbed and contained within the filter.

Generally, an absorptive filter may include organic and/or inorganic compounds or the like that absorb certain wavelengths and that are mixed or otherwise incorporated into one or more materials, such as glass and/or plastic for example. In this way, an absorptive filter could be designed as a substrate that can take on various shapes and forms. Moreover, the absorptive filter could be selectively designed to absorb certain wavelengths while allowing other wavelengths of light to pass through.

In accordance with the present disclosure, a LIDAR device may include an absorptive filter that is arranged to filter out light having one or more wavelengths outside of the LIDAR device's detectable wavelength range and to at least pass through light having wavelengths in the LIDAR device's detectable wavelength range. In practice, the target wavelengths that are filtered out may be those of external light originating at commonly used external light sources and/or those known to damage functionality of the LIDAR device's detectors, among other possibilities.

Furthermore, an absorptive filter may be incorporated in a LIDAR device in various ways. In one example, an absorptive filter may be incorporated into the LIDAR device's housing, so that the absorptive filter filters out light before the light reaches the LIDAR device's detectors. In another example, an absorptive filter may be incorporated into the LIDAR device's aperture, so that the absorptive filter filters out light before the light reaches the LIDAR device's detectors. In yet another example, an absorptive filter may be incorporated into a receiver's lens, so that the absorptive filter filters out light before the light reaches the LIDAR device's detectors. Other examples are also possible.

Figure 5:
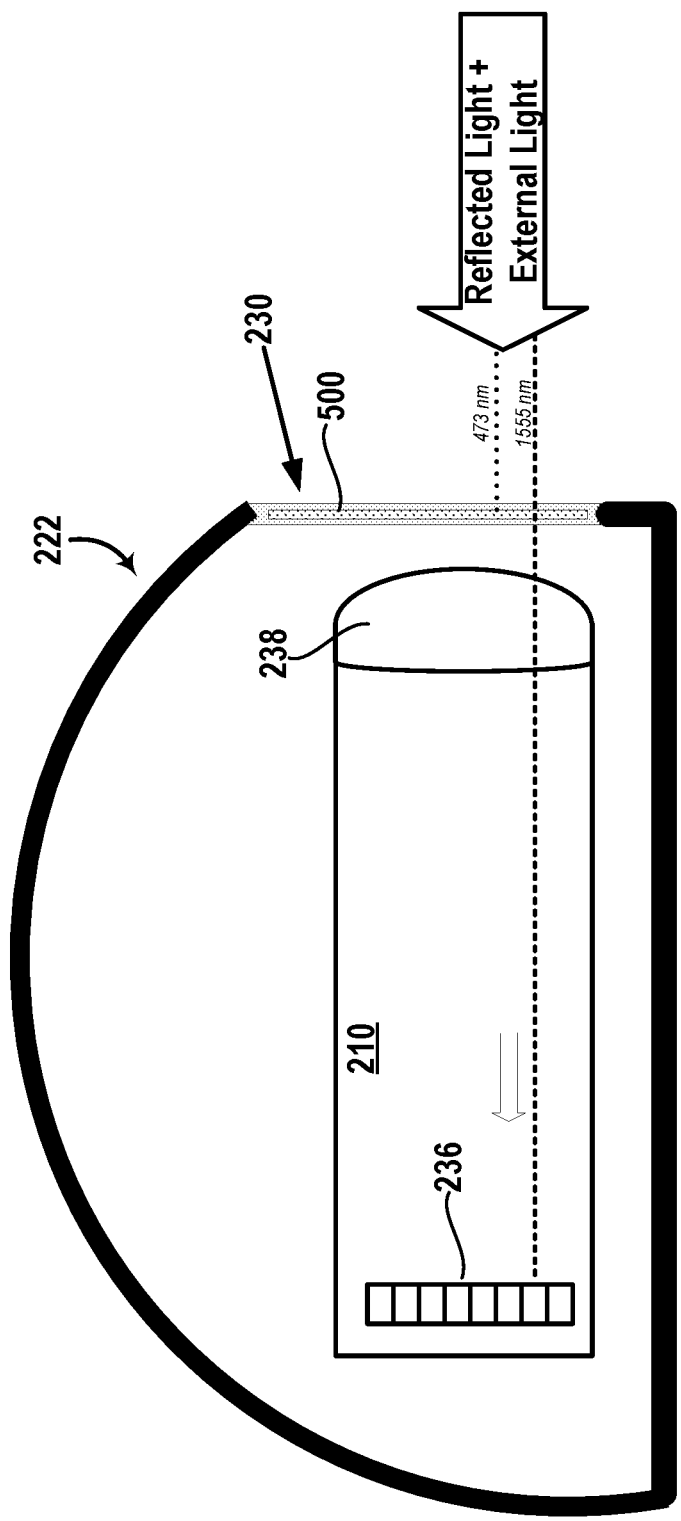
FIG. 5 illustrates an approach for incorporating an absorptive filter into a LIDAR device, according to an example embodiment.

FIG. 5 next illustrates an approach for incorporating a representative absorptive filter 500 into the LIDAR device 200. In particular, FIG. 5 is a close up illustration of the housing 222 and the aperture 230. As shown, the absorptive filter 500 is incorporated into the aperture 230, so that light filtered out before reaching the lens 238 and thus before reaching the detectors 236. Furthermore, as shown, the absorptive filter 500 is configured to at least filter out light having a wavelength of 473 nm, which is a wavelength emitted by a commonly used laser pointer, and to at least pass through light having a wavelength of 1555 nm, which is a wavelength within the LIDAR devices 200's detectable wavelength range. Other illustrations are possible as well.

iii. Adaptive Filter

An adaptive filter is a filter that is tunable and thus the wavelengths being filtered out by this filter are adjustable or otherwise selectable in various ways. In practice, an adaptive filter may carry out such filtering by absorbing certain wavelengths of light and/or by reflecting certain wavelength of light. Thus, the light absorption and reflection principles discussed above in the context of the absorptive and interference filter may apply in the context of the adaptive filter.

Further, an adaptive filter may be activated based on application of an electrical signal or the like to the filter. Also, the wavelengths being filtered out can be manually and/or automatically selected based on adjustment of characteristics (e.g., current and/or voltage) of the applied electrical signal. Thus, a voltage/current source could be coupled to the adaptive filter and a control system and/or an operator may adjust the voltage/current being outputted by the source, so as to selectively adjust the wavelengths being filtered out by the adaptive filter.

Generally, such selective adjustments of the wavelengths being filtered out can occur due to one or more electro-optic effects. For example, electro-optic effects known as the Kerr effect and the Pockels effect may allow for a change of a refractive index of a material in response to application of an electric field to that material. For this reason, an adaptive filter may be composed of a material (e.g., a liquid crystal) having light transmittance characteristics that can be controlled by an externally applied voltage or current.

In accordance with the present disclosure, a LIDAR device may include such an adaptive filter. In one case, the wavelengths being filtered out by the adaptive filter may be constant. For example, the adaptive filter may be preconfigured to filter out at all times wavelengths of external light originating at commonly used external light sources and/or wavelengths that may damage functionality of the LIDAR device's detectors, among other possibilities. In another case, however, the wavelengths being filtered out by the adaptive filter may be adjusted over time based on various factors. As further described in detail below, for instance, a control system may use sensor data to determine a particular wavelength of the external light and may responsively cause the adaptive filter to filter out light having that particular wavelength. Other cases are also possible.

Furthermore, an adaptive filter may be may be positioned anywhere in the LIDAR device's optical path so that light is filtered out before reaching the LIDAR device's detectors. In one example, an adaptive filter may be positioned in front of the receiver's lens, so that light is filtered out before passing through the lens. In another example, an adaptive filter may be positioned after the receiver's lens, so that light passes through the lens and is then filtered out before reaching the detectors. In yet another example, an adaptive filter may be deposited on or otherwise incorporated into the receiver's lens in various ways, so that light is filtered out while passing through the lens. Other examples are possible as well.

FIGS. 6A-6B illustrate an approach for incorporating a representative adaptive filter 600 into the LIDAR device 200. In particular, FIGS. 6A-6B each show a close up illustration of the receiver 210 having the adaptive filter 600. As shown, the adaptive filter 600 is positioned after the lens 238, so that light passes through the lens 238 and is then filtered out by the adaptive filter 600 before reaching the detectors 236. Furthermore, shown is a voltage source 602 that is coupled to the adaptive filter 600 and is configured to apply a voltage to the adaptive filter 600.

In particular, FIG. 6A illustrates that the voltage source 602 may apply a voltage V1 to the adaptive filter 600 and the adaptive filter 600 may then responsively be configured to filter out light having a wavelength of 532 nm, which is a wavelength of external light emitted by a first laser pointer. In contrast, FIG. 6B illustrates that the voltage source 602 may apply a voltage V2 to the adaptive filter 600 and the adaptive filter 600 may then responsively be configured to filter out light having a wavelength of 473 nm, which is a wavelength of external light emitted by a second laser pointer. In both FIGS. 6A-6B, the adaptive filter 600 is shown as allowing light having the wavelength of 1550 nm to pass through. Other illustrations are possible as well.

In a further aspect, an adaptive filter may be a filter that becomes opaque when under threshold high intensity illumination, thereby filtering light when under such threshold high intensity illumination. In particular, such a filter may be an optical power limiter that achieves the opaque state based on self-focusing principals, among others. With regards to self-focusing, for instance, the filter may include a medium having a nonlinear refractive index that increases with increasing light field intensity (e.g., due to the Kerr effect). In practice, the refractive index may become larger in areas where the intensity is higher, such as a center of a light beam, which may create a focusing density profile (e.g., a Townes profile) that may collapse the beam, thereby resulting in the opaque state. In this way, the optical power limiter may filter out light when under high intensity illumination and may do so with a relatively fast response time. Specifically, the optical power limiter may do so without there necessarily being application of an electrical signal to the filter (e.g., in response to detection of light) to cause the filter to filter out light.

In this aspect, an adaptive filter could also be arranged to filter out a particular wavelength only when under threshold high intensity illumination at that particular wavelength, while remaining transparent when under illumination at wavelengths other than the particular wavelength. In particular, such a filter may be an optical power limiter that achieves the wavelength-dependent opaque state based on stimulated Brillouin scattering (SBS) principals, among others. With regards to SBS, for instance, threshold high intensity beams of light traveling in a medium may induce acoustic vibrations in the medium (e.g., due to electrostriction) and those vibrations may ultimately cause the beam to display scattering in a direction substantially opposite the incoming beam. Moreover, material(s) could be selectively used to help set wavelength(s) of light at which SBS occurs, thereby resulting in the wavelength-dependent opaque state. In this way, select wavelength(s) of light could be filtered out without there necessarily being application of an electrical signal to a filter. Other aspects are possible as well.

iv. Spatial Filter

A spatial filter is a filter that limits the physical space through which light can travel from one side of the filter to the other of the filter. In practice, a spatial filter may include a surface having one or more holes through which light may travel. This surface can take on one of various shapes and may be composed of one or more of various materials. Also, the holes formed on the surface could each respectively take on one of various shapes and could be formed at various locations on the surface.

By way of example, a spatial filter may include a surface having a plurality of holes formed thereon in accordance with a spatial pattern. In practice, various such spatial patterns are possible. For instance, the spatial pattern may be a grid of equally spaced holes formed throughout the surface. If the surface is a flat surface, then equal spacing between various adjacent holes may involve equal linear spacing between the holes. But if the surface is a curved surface, then equal spacing between various adjacent holes may also involve equal angular spacing between the holes. Other examples are also possible.

In accordance with the present disclosure, a LIDAR device may include a spatial filter that is arranged to spatially filter out light entering the optical path. Specifically, light entering the LIDAR device's optical path would encounter the spatial filter before reaching the LIDAR device's detectors. With this arrangement, only light passing through holes of the filter would likely reach the detector, but all other light would be blocked by the spatial filter's surface. In this way, the spatial filter may narrow down the physical space through which light has to travel in order to reach the detectors, thereby reducing the likelihood of external light being able to reach the detectors.

Although the spatial filter may narrow down the physical space through which light has to travel in order to reach the detectors, the LIDAR device may still receive a sufficient extent of reflected light so as to generate a sufficient number of data points about the environment. In particular, the spatial pattern of holes on the spatial filter's surface may be arranged such that a sufficient extent of light reflected from each of various portions of the environment is able to reach the detectors. For example, the spatial pattern may be the above-mentioned grid of equally spaced holes formed throughout the surface. By having such equal spacing, light reflected from each of various portions of the environment is equally likely to arrive at the detectors. Moreover, if a relatively large number of holes are formed throughout the surface, then the LIDAR device may still have the ability to generate a relatively large number of data points that could be used for detection and/or identification of objects in the environment or the like.

Furthermore, a spatial filter may be may be positioned anywhere in the LIDAR device's optical path so that light is spatially filtered before reaching the LIDAR device's detectors. In one example, a spatial filter may be positioned in front of the receiver's lens, so that light is spatially filtered before passing through the lens. In another example, a spatial filter may be positioned after the receiver's lens, so that light passes through the lens and is then spatially filtered before reaching the detectors. In this example, the spatial filter could be positioned substantially proximate to the detector array (e.g., at or near an image plane), such as by being positioned adjacent to (e.g., contiguous with) the detector array, among other possibilities. In yet another example, a spatial filter may be deposited on or otherwise incorporated into the receiver's lens in various ways, so that light is spatially filtered while passing through the lens. Other examples are possible as well.

Figure 7A:
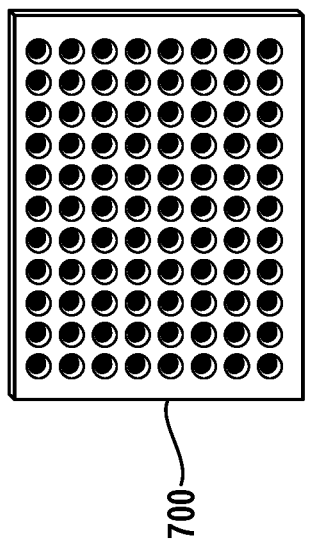
FIG. 7A illustrates a spatial filter, according to an example embodiment.

FIG. 7A next illustrates a representative spatial filter 700 in accordance with the present disclosure. As shown, the spatial filter 700 includes a surface having a plurality of circular holes formed thereon. The holes are arranged in a grid pattern in which the holes are equally spaced. Moreover, all of the holes in the representative spatial filter 700 are of the same size.

Figure 7B:
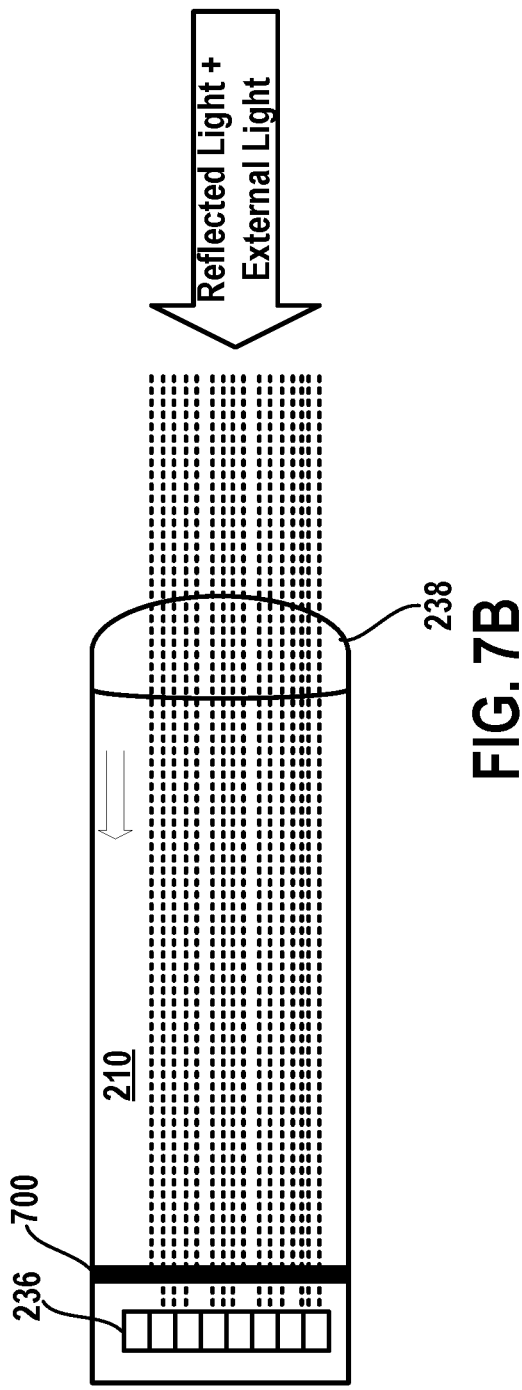
FIG. 7B illustrates an approach for incorporating a spatial filter into a LIDAR device, according to an example embodiment.

FIG. 7B then illustrates an approach for incorporating the representative spatial filter 700 into the above-described LIDAR device 200. In particular, FIG. 7B shows a close up illustration of the receiver 210 including the spatial filter 700. Specifically, the spatial filter 700 is positioned in front of the detector array 236, so that light is spatially filtered right before reaching the detectors 236. As shown, a portion of the light beams from the environment pass through the holes of the spatial filter 700, but the other light beams are blocked by the surface of spatial filter 700.

In this manner, the spatial filter 700 may reduce the likelihood of external light being able to reach the detectors 236. For example, if a user of a laser point aims laser light towards a LIDAR device not having the spatial filter 700, there may be a certain likelihood of that laser light reaching the detectors 236. But if the spatial filter 700 is added to that LIDAR device, then the likelihood of laser light from the laser pointer reaching the detector 236 may decrease. As a result, the user of the laser pointer may encounter an increased difficulty of aiming the laser light in such a way that the laser light is able to reach the detectors 236. Thus, the spatial filter 700 may help mitigate damage to the LIDAR device and/or false detections by the LIDAR device, among other outcomes. Other illustrations are also possible.

In an alternative implementation, a detector array having a relatively low fill factor may be considered to be the spatial filter. In particular, the fill factor may define the extent (e.g., size and/or number) of gaps between detectors of the array, with those gaps being unresponsive to light. In one case, a detector array may have a relatively high fill factor and thus may include relatively small gaps between detectors of the array. But in another case, a detector array may have a relatively low fill factor and thus may include relatively large gaps between detectors of the array. So if a LIDAR device includes a detector array that has a relatively low fill factor, that detector array may help narrow down the physical space through which light has to travel in order to reach the detectors, thereby reducing the likelihood of external light being able to reach the detectors. In this way, the detector array could spatially filter light without there necessarily being a separate physical filter that is configured to spatially filter out light.

Moreover, although a detector array having a relatively low fill factor may narrow down the physical space through which light has to travel in order to reach the detectors, the LIDAR device may still receive a sufficient extent of reflected light so as to generate a sufficient number of data points about the environment. In particular, a spatial pattern of detectors on the detector array may be arranged such that a sufficient extent of light reflected from each of various portions of the environment is able to reach the detectors. For example, the array's spatial pattern may be a grid of equally spaced detectors, with the spacing between the detectors in the gaps that are unresponsive to light. By having such equal spacing, light reflected from each of various portions of the environment is equally likely to arrive at the detectors. Moreover, if a relatively large number of detectors are included in the array, then the LIDAR device may still have the ability to generate a relatively large number of data points that could be used for detection and/or identification of objects in the environment or the like. Other implementations are also possible.

V. A PROACTIVE MITIGATION PROCEDURE TO PROTECT A LIDAR DEVICE

In accordance with the present disclosure, a control system may be configured to engage in a proactive mitigation procedure. In particular, the proactive mitigation procedure may protect operation of a LIDAR device again external light and do so whether or not such external light is actually being emitted towards the LIDAR device. In this way, the control system may take steps in advance so as to ensure that measures are in place to protect operation of the LIDAR device against external light.

Figure 8:
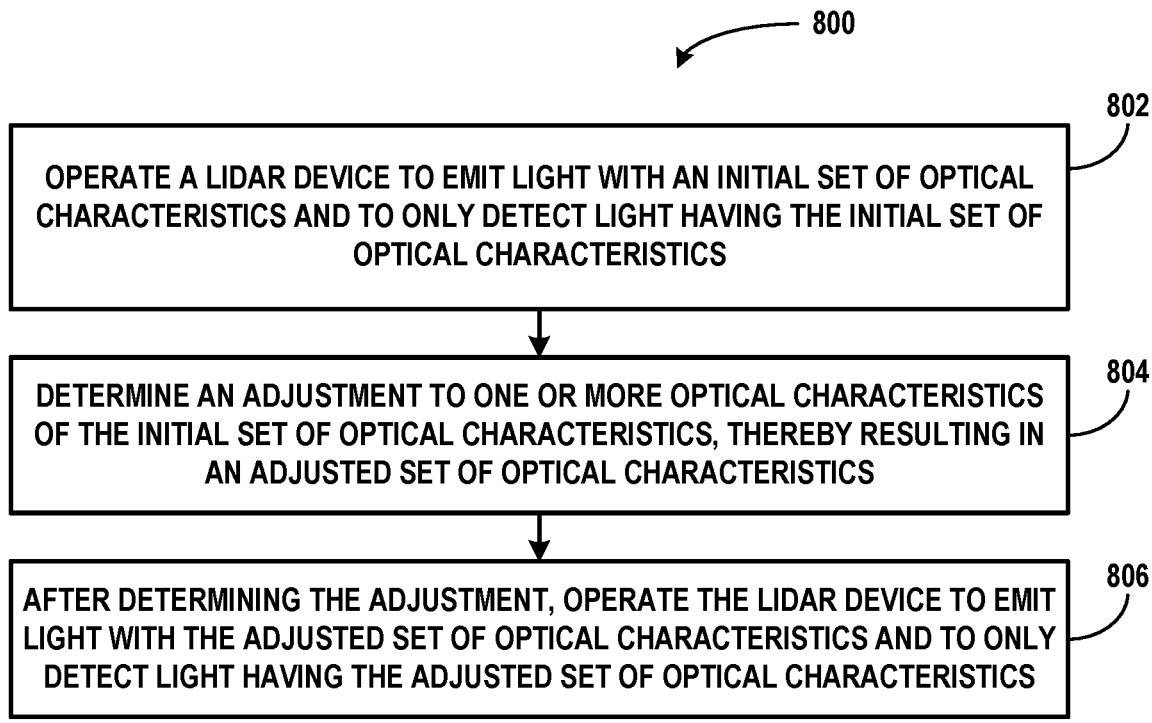
FIG. 8 is a flowchart illustrating a method for operating a LIDAR device to carry out a proactive mitigation procedure, according to an example embodiment.

FIG. 8 is a flowchart illustrating a method 800, according to an example implementation. In particular, method 800 may be implemented to carry out a proactive mitigation procedure. As discussed in further detail below, the proactive mitigation procedure may involve operating the LIDAR device to vary over time characteristics with which light is being emitted and to only detect light having characteristics that match the characteristics with which light is being emitted.

Method 800 shown in FIG. 8 (and other processes and methods disclosed herein) presents a method that can be implemented within an arrangement involving, for example, the LIDAR device 100 of FIG. 1, by vehicle 300 shown in FIGS. 3A-3D, and/or by vehicle 1700 shown in FIG. 17 and further described below (or more particularly by one or more components or subsystems thereof, such as by a processor and a non-transitory computer-readable medium having instructions that are executable to cause the device to perform functions described herein). Additionally or alternatively, method 800 may be implemented within any other arrangements and systems.

Method 800 and other processes and methods disclosed herein may include one or more operations, functions, or actions as illustrated by one or more of blocks 802-806. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 800 and other processes and methods disclosed herein, the flowchart shows functionality and operation of one possible implementation of present implementations. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 800 and other processes and methods disclosed herein, each block in FIG. 8 may represent circuitry that is wired to perform the specific logical functions in the process.

At block 802, method 800 involves operating a LIDAR device to emit light with an initial set of optical characteristics and to only detect light having the initial set of optical characteristics.

Generally, a control system may be configured to operate a LIDAR device to emit light having a certain set of optical characteristics. These characteristics may include timing with which light is emitted, wavelengths being emitted, intensity at which light is emitted, and/or modulation according to which light is emitted. Although the present disclosure is described herein in the context of these optical characteristics, the present disclosure may be carried out in the context of other optical characteristics as well, such as a phase at which light is emitted and/or polarization at which light is emitted and/or received, among others As an initial matter, the control system may operate the LIDAR device to emit light with an initial set of optical characteristics. In one case, the initial set may be a predetermined set. For instance, the control system may have stored thereon or may otherwise have information indicating the set of optical characteristics with which the LIDAR device should initially emit light, and the control system may thus operate the LIDAR device based on that information. In another case, the initial set may be based on application of a pseudo-random code. For instance, a pseudorandom number generator (PRNG) may generate a parameter or the like with respect to a particular optical characteristic (possibly within a certain range or set of parameters), and the control system may use that parameter as the parameter of the particular optical characteristic with which light is emitted. In a specific example, the PRNG may generate the number "1550" with respect to wavelength, and the control system may operate the LIDAR device to emit light having a wavelength of 1550 nm.

With this arrangement, the control system may effectively use evaluation of optical characteristics as basis for distinguishing reflected light that originated at the LIDAR device from external light that did not originate at the LIDAR device. In particular, while the LIDAR device emits light with the initial set of optical characteristics and/or after the LIDAR device emits such light, the control system may operate the LIDAR device to only detect light having that initial set of optical characteristics. To do so, the control system may carry out one or more of various approaches, with each approach being specific to the optical characteristic being distinguished. These approaches are discussed in further detail below.

At block 804, method 800 involves determining an adjustment to one or more optical characteristics of the initial set of optical characteristics, thereby resulting in an adjusted set of optical characteristics. Additionally, at block 806, method 800 involves, after determining the adjustment, operating the LIDAR device to emit light with the adjusted set of optical characteristics and to only detect light having the adjusted set of optical characteristics.

Although the control system may operate the LIDAR device to distinguish reflected light that is originated at the LIDAR device from external light, the external light could nonetheless end up having optical characteristics that match the optical characteristics with which light is emitted and detected. For example, the control system may operate the LIDAR device to emit light with an initial set of optical characteristics and the external light may not initially have such characteristics. But characteristics of the external light may change over time for various reasons. For instance, characteristics of the external light could be manually or automatically altered to match the initial set of optical characteristics.

Given that the external light could end up having optical characteristics that match the optical characteristics with which light is emitted and detected, the LIDAR device may still end up detecting the external light unless further action is taken. So to deal with this issue, the control system may determine an adjustment to the set of optical characteristics and may then operate the LIDAR device to emit and detect light in accordance with that adjustment. By doing so, the control system may help overcome a situation where characteristics of the external light match characteristics of the light being emitted and detected. Moreover, the control system may be configured to carry out one or more such adjustments over time (e.g., continuously or from time-to-time), so as to reduce the likelihood of the external light having at any given time optical characteristics that match the optical characteristics of light being emitted and detected at that given time. Nonetheless, the adjustment(s) could be based on one or more of various factors.

In one case, an adjustment may be a predetermined adjustment. In particular, the control system may have stored thereon or may otherwise have access to information indicating a particular adjustment, and the control system could thus adjust the initial set based on this particular adjustment, thereby resulting in an adjusted set of optical characteristics.

For example, the information may include a sequence of parameters with respect to a particular optical characteristic, and the control system may include the next parameter of the sequence in the set of optical characteristics, such as by adding that parameter to the set or by replacing the initial parameter being used with that next parameter. In a specific example, the initial parameter in the sequence may be a wavelength of 1550 nm, and the control system may thus operate the LIDAR device to emit and detect light having a wavelength of 1550 nm. Then, the control system may determine that the next parameter in the sequence is a wavelength of 1552 nm, and the control system may thus operate the LIDAR device to emit and detect light having a wavelength of 1552 nm, and so on.

In another example, the information may include a particular modification with respect to a particular optical characteristic, and thus the control system may apply that modification to a currently used parameter, so as to result in a modified parameter being included in the set of optical characteristics. In a specific example, the control system may operate the LIDAR device to emit and detect light having an initial wavelength of 1550 nm. Then, the control system may determine that the particular modification indicates a 2 nm increase to wavelength being used, and thus the control system may increase the initial wavelength by 2 nm, so as to result in an adjusted wavelength of 1552 nm. Once adjusted, the control system may then operate the LIDAR device to emit and detect light having the adjusted wavelength of 1552 nm, and so on.

In another case, an adjustment may be based on application of a pseudo-random code. As noted, a PRNG could generate a parameter or the like with respect to a particular optical characteristic. With this arrangement, the control system may adjust the set of optical characteristics to include a newly generated parameter, such as by adding that newly generated parameter to the set or by replacing the initial parameter being used with that newly generated parameter. For example, the PRNG may initially generate the number "1550" with respect to wavelength, and the control system may operate the LIDAR device to emit light having an initial wavelength of 1550 nm. Then, the PRNG may generate the number "1542" with respect to wavelength, and the control system may operate the LIDAR device to emit light having an adjusted wavelength of 1542 nm. Other cases and examples are possible as well.

Once an adjustment is determined and applied as discussed above, the control system may then again effectively use evaluation of optical characteristics as basis for distinguishing reflected light that originated at the LIDAR device from external light that did not originate at the LIDAR device. In particular, while the LIDAR device emits light with the adjusted set of optical characteristics and/or after the LIDAR device emits such light, the control system may operate the LIDAR device to only detect light having that adjusted set of optical characteristics. Here again, the control system may do so by carrying out one or more of various approaches, with each approach being specific to the optical characteristic being distinguished. As noted, these approaches will now be described with respect to the various optical characteristics.

i. Variation of Timing

In accordance with the present disclosure, the control system may operate the LIDAR device to vary over time a timing arrangement according to which light is being emitted and to only detect light received in accordance with a timing arrangement that matches the timing arrangement according to which light is being emitted. In practice, the timing arrangement at issue may be a timing interval or a timing pattern, among other options.

In one implementation, the control system may operate the LIDAR device to emit light pulses with a certain timing interval. In doing so, the control system may ensure that a time difference between emission of a first pulse and subsequent emission of a second pulse is substantially the same as a time difference between emission of the second pulse and subsequent emission of a third pulse, etc. By way of example, the control system may operate the LIDAR device to emit a first light pulse. And when the control system determines that three microseconds (3 µs) have passed after emission of the first light pulse, the control system may operate the LIDAR device to emit a second light pulse. Then, when the control system determines that 3 µs have passed after emission of the second light pulse, the control system may operate the LIDAR device to emit a third light pulse, and so on.

In another implementation, the control system may operate the LIDAR device to emit light pulses with a certain timing pattern. In this case, the time difference between the various emitted pulses may vary and may not necessarily be consistent over time. By way of example, the control system may operate the LIDAR device to emit a first light pulse. And when the control system determines that 2 µs have passed after emission of the first light pulse, the control system may operate the LIDAR device to emit a second light pulse. Then, when the control system determines that 1 µs has passed after emission of the second light pulse, the control system may operate the LIDAR device to emit a third light pulse. Then, when the control system determines that 4 µs have passed after emission of the third light pulse, the control system may operate the LIDAR device to emit a fourth light pulse. In this way, the control system may emit light pulses over time according to a timing pattern.

Although the various aspects described herein may be carried out in the context of various such timing arrangements, the present disclosure is described herein in the context of a timing interval. It is noted, however, that the described approaches could also be carried out in the context of a timing pattern, among others.

More specifically, in accordance with the present disclosure, the control system may operate the LIDAR device to emit light pulses according to an initial timing interval and to only detect return light pulses that are received according to a timing interval that matches the initial timing interval. In this way, the control system may effectively use evaluation of the timing interval as basis for distinguishing reflected light that originated at the LIDAR device from external light that did not originate at the LIDAR device. And the control system may do so in various ways.

In one example, the LIDAR device may generate data packets respectively based on detection of several light pulses. For each such data packet, the control system may timestamp the data packet so as to have information related to a time at which a light pulse associated with that packet was received. With this arrangement, the control system may use such time stamps as basis for determining a time difference between consecutively generated data packets. If the time difference substantially matches the timing interval at issue, the control system may determine that these data packets should be used for detection/identification of object or the like, and thus the control system may use those data packets in this manner. But if the time difference does not substantially match the timing interval at issue, the control system may determine that these data packets should not be used for detection/identification of object or the like, and thus the control system may discard or otherwise disregard those data packets.

In another example, the control system may operate the LIDAR device to emit several light pulses towards a particular region of the environment in accordance with a timing interval and the LIDAR device may then detect several pulses that arrive from that particular region. In this example, the control system may determine time delays respectively between emitted pulses and the detected pulses in accordance with the order in which such detected pulses are received. Then, the control system may determine which of the detected pulses are correlated in time with the emitted pulses, and may determine based on such correlation which of these detected pulses originated at an external light source and which originated at the LIDAR device.

For instance, the control system may determine a particular time delay between a first emitted pulse and a first detected pulse, and may also determine the same particular time delay between a subsequent second emitted pulse and a subsequent second detected pulse. Based on this determination, the control system may determine that the first and second detected pulses are correlated in time with the respective emitted pulses and thus may determine that data packets generated based on these detected pulses should be used for detection/identification of object or the like.

In contrast, the control system may determine a different time delay between a subsequent third emitted pulse and a subsequent third detected pulse. Based on this determination, the control system may determine that the third detected pulse is not correlated in time and thus may determine that a data packet generated based on this third light pulse should not be used for detection/identification of object or the like. In this situation, however, the control system may determine that the same particular time delay at issue between the third emitted pulse and a subsequent fourth detected pulse. As such, the control system may determine that the fourth detected pulse is correlated in time and thus may determine that a data packet generated based on this fourth detected light pulse should be used for detection/identification of object or the like, and so on. Other instances and examples are possible as well.

Furthermore, in accordance with the discussion above, the control system may determine an adjustment to the timing interval and may then operate the LIDAR device to emit and detect light in accordance with that adjustment. In particular, the control system may operate the LIDAR device to emit light pulses according to the adjust timing interval and to only detect return light pulses that are received according to a timing interval that substantially matches the adjusted timing interval with which light pulses are emitted. In this way, the control system may help overcome a situation where a timing interval according to which external light is emitted matches the initial timing interval according to which light pulses are being emitted and detected by the LIDAR device.

FIGS. 9A-9F illustrate variation of a timing interval to help protect a LIDAR device against external light.

Figure 9A:
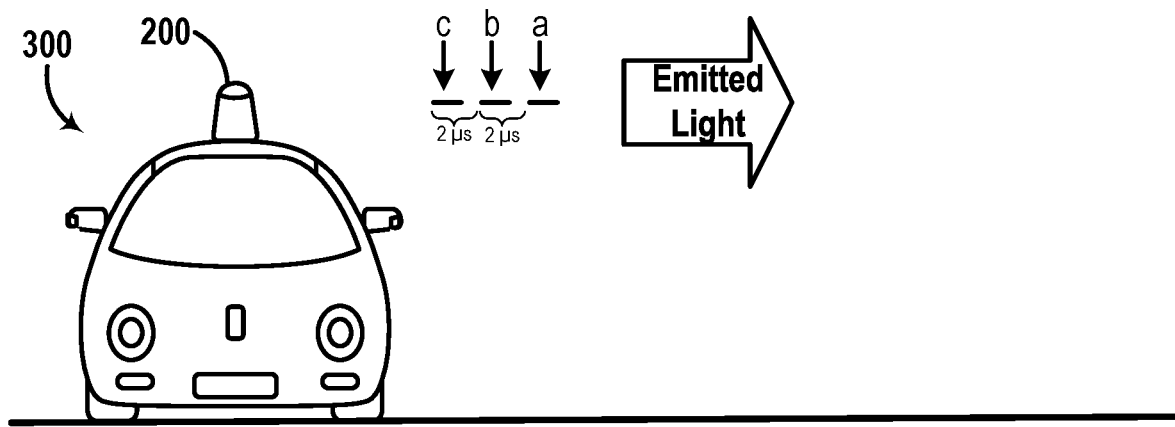
FIG. 9A illustrates a step in protection of a LIDAR device using variation of timing, according to an example embodiment.
Figure 9B:
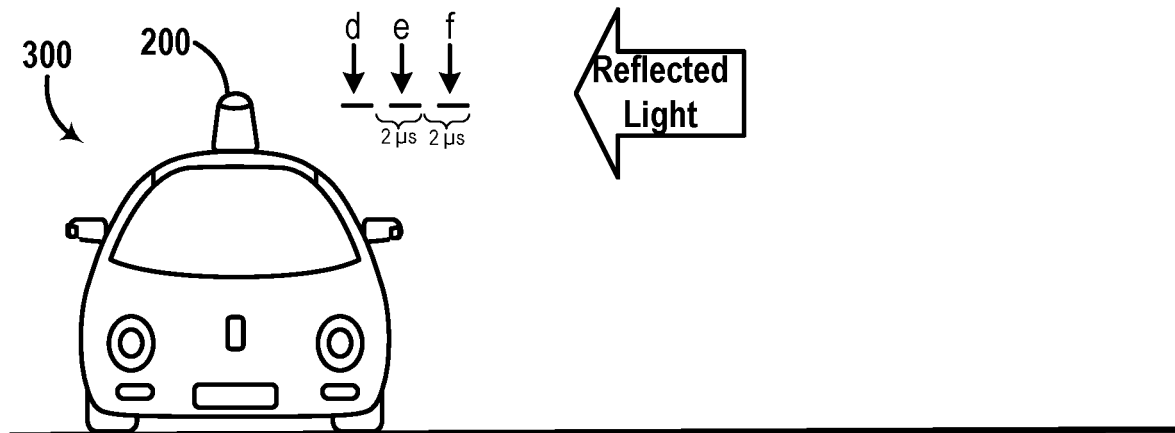
FIG. 9B illustrates another step in protection of a LIDAR device using variation of timing, according to an example embodiment.
Figure 9C:
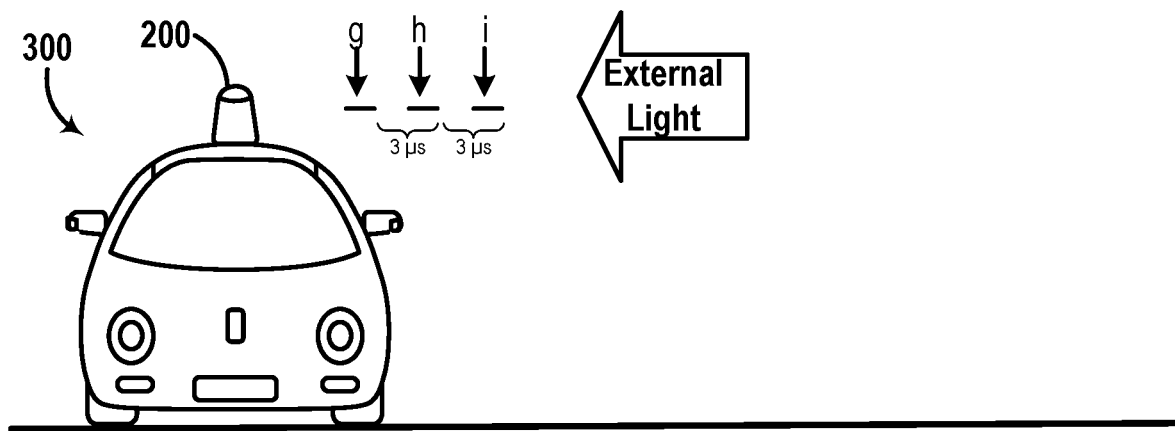
FIG. 9C illustrates yet another step in protection of a LIDAR device using variation of timing, according to an example embodiment.

In particular, as shown by FIG. 9A, the vehicle 300's LIDAR device 200 emits representative light pulses a, b, and c with a timing interval of 2 µs. Given the arrangements described herein, the LIDAR device 200 may thus operate to only detect light pulses that are received according to the 2 µs timing interval. For this reason, the LIDAR device 200 may detect representative light pulses d, e, and f, which are shown in FIG. 9B as having a matching timing interval of 2 µs and being of reflected light. But for the same reason, the LIDAR device 200 may not detect representative light pulses g, h, and I, which are shown in FIG. 9C as having a time interval of 3 µs and being of external light.

Figure 9D:
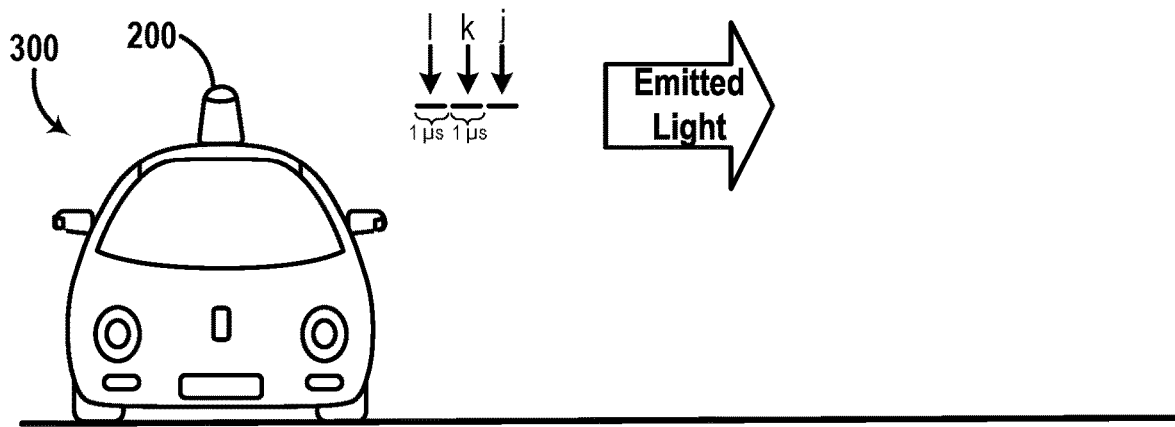
FIG. 9D illustrates yet another step in protection of a LIDAR device using variation of timing, according to an example embodiment.
Figure 9E:
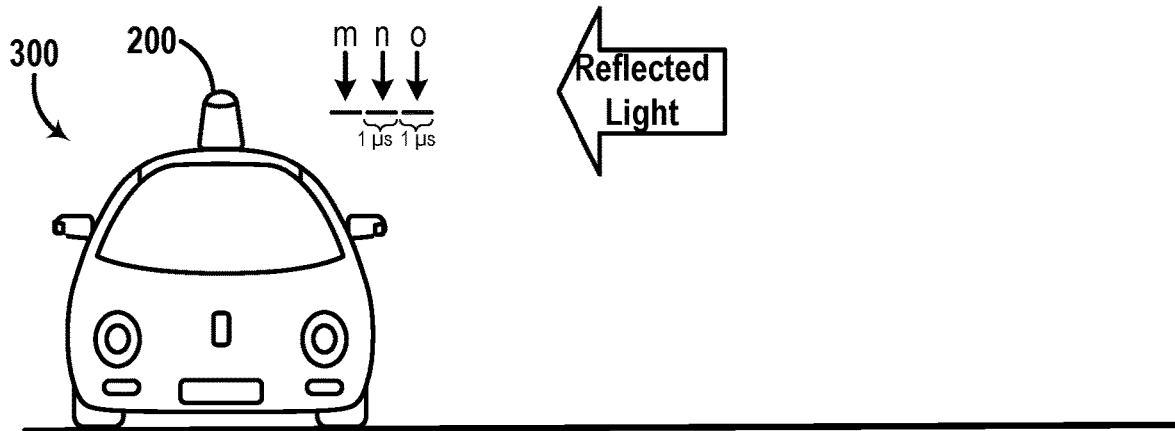
FIG. 9E illustrates yet another step in protection of a LIDAR device using variation of timing, according to an example embodiment.
Figure 9F:
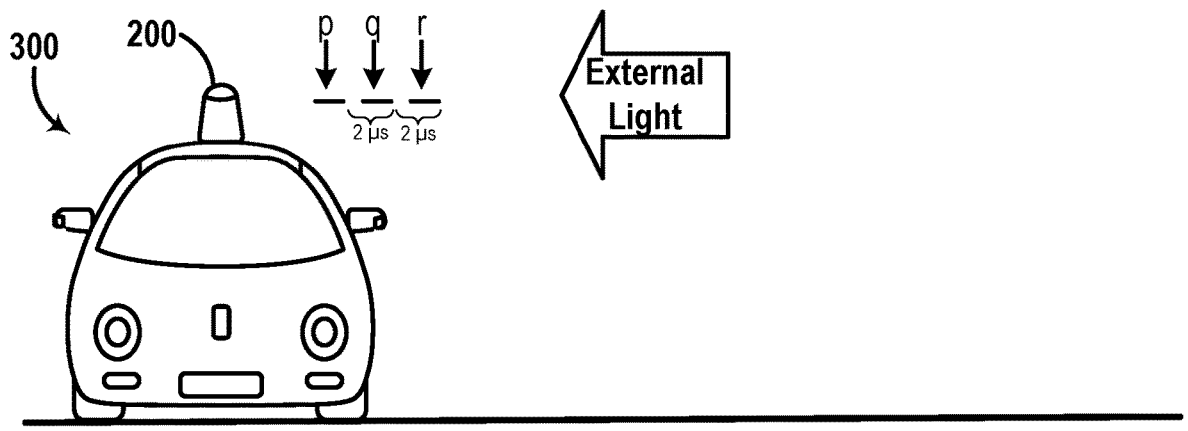
FIG. 9F illustrates yet another step in protection of a LIDAR device using variation of timing, according to an example embodiment.

Further, FIG. 9D illustrates that the timing interval has been adjusted to an adjusted timing interval of 1 µs. As such, as shown by FIG. 9D, the LIDAR device 200 emits representative light pulses j, k, and l with the adjusted timing interval of 1 µs. Given the arrangements described herein, the LIDAR device 200 may thus operate to only detect light pulses that are received according to the 1 µs adjusted timing interval. For this reason, the LIDAR device 200 may detect representative light pulses m, n, and o, which are shown in FIG. 9E as having a matching timing interval of 1 µs and being of reflected light. But for the same reason, the LIDAR device 200 may not detect representative light pulses p, q, and, r, which are shown in FIG. 9F as having a time interval of 2 µs and being of external light, even though the time interval of the light pulses p, q, and, r matches the previous time interval shown in FIG. 9A. In this manner, the adjustment may help protect the LIDAR device 200 against external light. Other illustrations are possible as well.

ii. Variation of Wavelengths

In accordance with the present disclosure, the control system may operate the LIDAR device to vary over time wavelength(s) with which light is being emitted and to only detect light wavelength(s) that match the wavelength(s) with which light is being emitted.

More specifically, in accordance with the present disclosure, the control system may operate the LIDAR device to emit light having an initial set of one or more wavelengths and to only detect light having one or more wavelengths that are within the initial set. In this way, the control system may effectively use wavelength as a basis for distinguishing reflected light that originated at the LIDAR device from external light that did not originate at the LIDAR device. And the control system may do so in various ways.

In one example, the control system may operate the LIDAR device to emit light having a set of one or more wavelengths. While or after doing so, the control system may operate the LIDAR device to deactivate any of the LIDAR device's detectors that are configured to only detect wavelengths that are not within the set. In this way, the LIDAR device may not generate any data packets for light that arrives at the detectors but does not have wavelengths within the set of wavelengths.

In another example, the control system may operate the LIDAR device to emit light having a set of one or more wavelengths. Then, the LIDAR device may generate data packets respectively based on detection of several light pulses. For each such data packet, the control system may generate metadata or the like for the data packet, with the metadata indicating the wavelength of a light pulse associated with that packet (e.g., based on wavelength configuration of the detector that detected the light pulse). With this arrangement, if the metadata indicates a wavelength that is within the set, the control system may determine that the associated data packet should be used for detection/identification of objects, and thus the control system may use the data packet in this manner. But if the metadata indicates a wavelength that is not within the set, the control system may determine that the data packet should not be used for detection/identification of objects, and thus the control system may discard or otherwise disregard this data packet.

In yet another example, the control system may operate the LIDAR device to emit light having a set of one or more wavelengths. While or after doing so, the control system may reconfigure the LIDAR device's adaptive filter to only pass through light having wavelengths that are within the set and to block any light having wavelengths that are not within the set. In this way, only light having one or more wavelengths within the set may reach the detector and thus may ultimately be used as basis for detection/identification of objects or the like. Other examples are also possible.

Furthermore, in accordance with the discussion above, the control system may determine an adjustment to the initial set of one or more wavelengths. In practice, the adjustment may involve replacement of at least one wavelength of the set with a different wavelength, a removal of a wavelength from the set, and/or an addition of a wavelength to the set, among other options. As such, the control system may operate the LIDAR device to emit light have the adjusted set of one or more wavelengths and to only detect light having one or more wavelengths that are within the adjusted set. In this way, the control system may help overcome a situation where one or more wavelengths with which external light is emitted are within the set of wavelengths being emitted and detected by the LIDAR device.

FIGS. 10A-10F illustrate variation of wavelength to help protect a LIDAR device against external light.

Figure 10A:
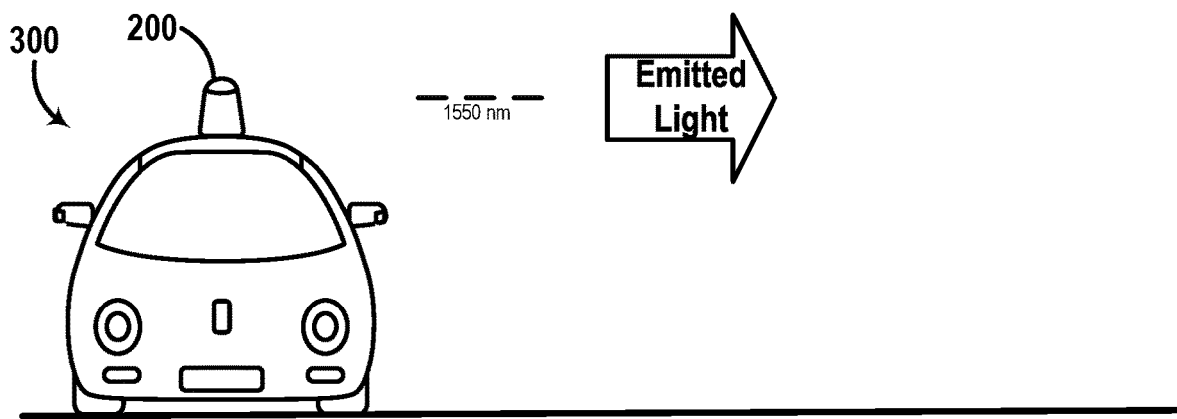
FIG. 10A illustrates a step in protection of a LIDAR device using variation of wavelength, according to an example embodiment.
Figure 10B:
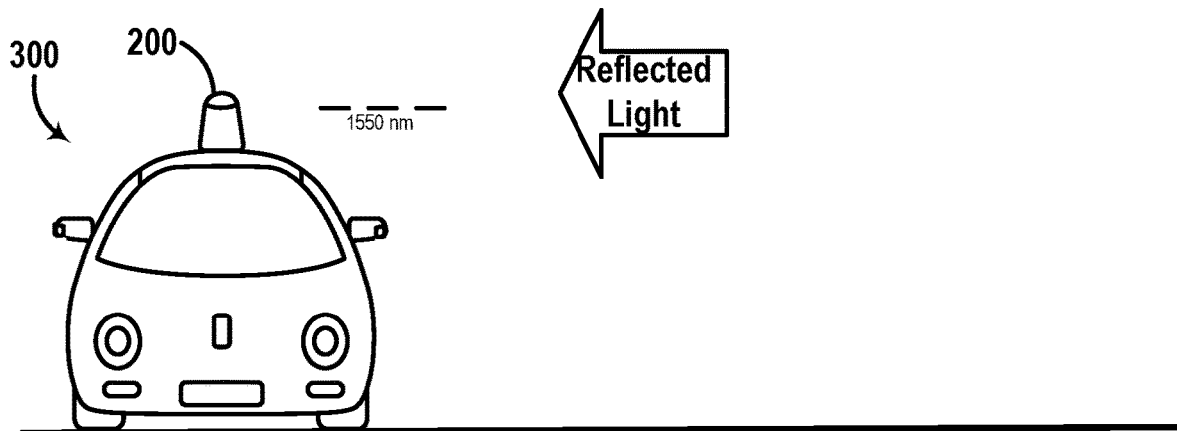
FIG. 10B illustrates another step in protection of a LIDAR device using variation of wavelength, according to an example embodiment.
Figure 10C:
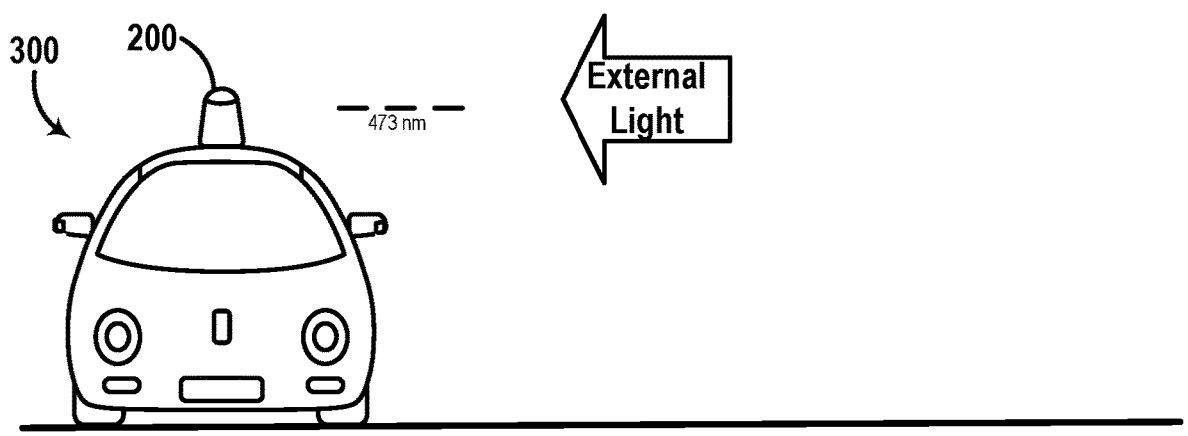
FIG. 10C illustrates yet another step in protection of a LIDAR device using variation of wavelength, according to an example embodiment.

In particular, as shown by FIG. 10A, the vehicle 300's LIDAR device 200 emits representative light having a wavelength of 1550 nm. Given the arrangements described herein, the LIDAR device 200 may thus operate to only detect light having a wavelength of 1550 nm. For this reason, the LIDAR device 200 may detect the representative light shown in FIG. 10B, which has a matching wavelength of 1550 nm and is of reflected light. But for the same reason, the LIDAR device 200 may not detect the representative light shown in FIG. 10C, which has a wavelength of 473 nm and is of external light.

Figure 10D:
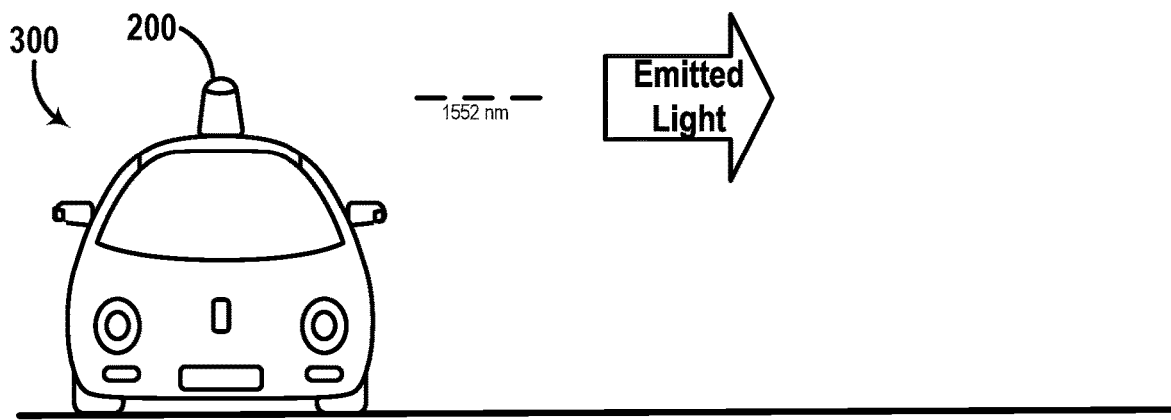
FIG. 10D illustrates yet another step in protection of a LIDAR device using variation of wavelength, according to an example embodiment.
Figure 10E:
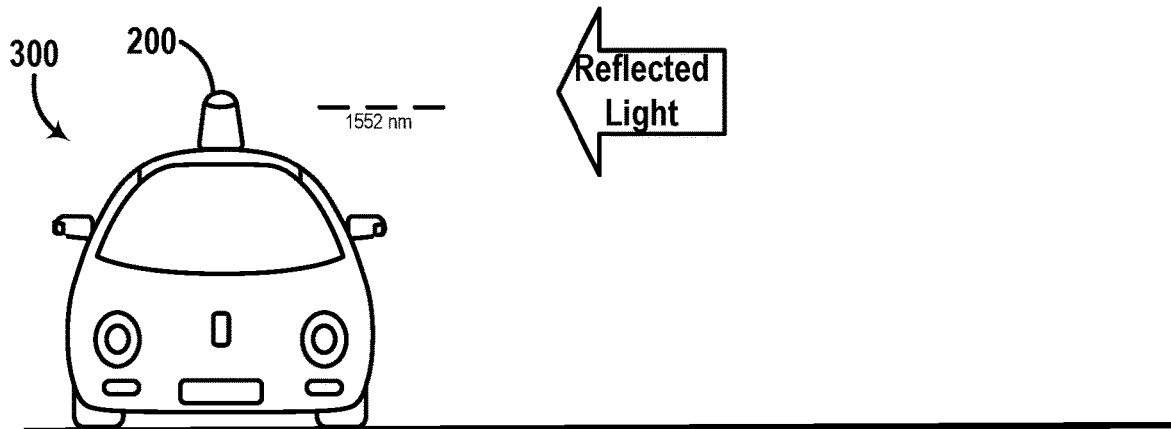
FIG. 10E illustrates yet another step in protection of a LIDAR device using variation of wavelength, according to an example embodiment.
Figure 10F:
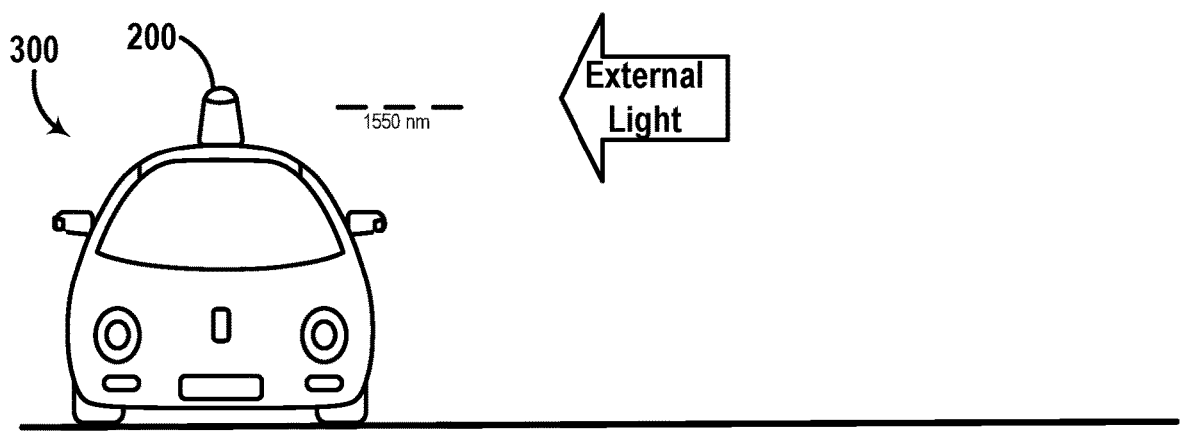
FIG. 10F illustrates yet another step in protection of a LIDAR device using variation of wavelength, according to an example embodiment.

Further, FIG. 10D illustrates that the wavelength has been adjusted to an adjusted wavelength of 1552 nm. As such, as shown by FIG. 10D, the LIDAR device 200 emits representative light having a wavelength of 1552 nm. Given the arrangements described herein, the LIDAR device 200 may thus operate to only detect light having a wavelength of 1552 nm. For this reason, the LIDAR device 200 may detect the representative light shown in FIG. 10E, which has a matching wavelength of 1552 nm and is of reflected light. But for the same reason, the LIDAR device 200 may not detect the representative light shown in FIG. 10F, which has a wavelength of 1550 nm and is of external light, even though this wavelength matches the previous wavelength shown in FIG. 10A. In this manner, the adjustment may help protect the LIDAR device 200 against external light. Other illustrations are possible as well.

iii. Variation of Intensities

In accordance with the present disclosure, the control system may operate the LIDAR device to vary over time an intensity pattern with which light is being emitted and to only detect light having the intensity pattern with which light is being emitted.

More specifically, in accordance with the present disclosure, the control system may operate the LIDAR device to emit light emit light pulses having intensities that spatially vary according to an initial intensity pattern. Also, the control system may operate the LIDAR device to only detect light pulses having intensities that spatially vary according to an intensity pattern that substantially corresponds to the initial intensity pattern. In this way, the control system may effectively use evaluation of intensity as basis for distinguishing reflected light that originated at the LIDAR device from external light that did not originate at the LIDAR device. And the control system may do so in various ways.

In one example, the control system may operate the LIDAR device to emit towards a region in the environment several light pulses each having a respective intensity in accordance with an alternating intensity pattern. For instance, a first light pulse may have an intensity of 0.2 W/m$^2$, a second light pulse that is spatially adjacent to the first light pulse may have an intensity of 0.4 W/m$^2$, a third light pulse that is spatially adjacent to the second light pulse may have an intensity of 0.2 W/m$^2$, and a fourth light pulse that is spatially adjacent to the third light pulse may have an intensity of 0.4 W/m$^2$, and so on. With this arrangement, the control system may operate the LIDAR device to only detect light pulses arriving from the region in the environment that have intensities that spatially vary according to an alternating intensity pattern. In practice, such light intensities could be determined using one or more photometers, among other possibilities.

In one example scenario, the LIDAR device may receive several light pulses and may determine respective intensities of these light pulses. In this example scenario, a first received light pulse may have an intensity of 0.1 W/m$^2$, a second received light pulse that is spatially adjacent to the first received light pulse may have an intensity of 0.3 W/m$^2$, a third received light pulse that is spatially adjacent to the second received light pulse may have an intensity of 0.1 W/m$^2$, and a fourth received light pulse that is spatially adjacent to the third received light pulse may have an intensity of 0.3 W/m$^2$, and so on. Given these intensities, the control system may determine that the received light pulses have intensities that spatially vary according to an alternating intensity pattern. Consequently, the control system may responsively use data generated based on these received pulses for detection/identification of objects in the region of the environment or the like.

In another scenario, the LIDAR device may receive several light pulses and may determine respective intensities of these light pulses. In this example, a first received light pulse may have an intensity of 0.4 W/m$^2$, a second received light pulse that is spatially adjacent to the first received light pulse may have an intensity of 0.4 W/m$^2$, a third received light pulse that is spatially adjacent to the second received light pulse may have an intensity of 0.3 W/m$^2$, and a fourth received light pulse that is spatially adjacent to the third received light pulse may have an intensity of 0.5 W/m$^2$. Given these intensities, the control system may determine that the received light pulses have intensities that spatially vary according to an intensity pattern that is not the alternating intensity pattern at issue. Consequently, the control system may responsively not use data generated based on these received pulses for detection/identification of objects in the region of the environment or the like.

In another example, the control system may operate the LIDAR device to emit towards a region in the environment several light pulses each having a respective intensity in accordance with a particular intensity pattern in which adjacent intensities have a particular absolute intensity difference and/or are different by a particular percentage. For instance, a first light pulse may have an intensity of 0.5 W/m$^2$, a second light pulse that is spatially adjacent to the first light pulse may have an intensity of 1.5 W/m$^2$, a third light pulse that is spatially adjacent to the second light pulse may have an intensity of 2.5 W/m$^2$, and a fourth light pulse that is spatially adjacent to the third light pulse may have an intensity of 3.5 W/m$^2$, and so on. In this way, the particular intensity pattern may be one in which adjacent light pulses have intensities that are different by an absolute difference of 1 W/m$^2$. With this arrangement, the control system may thus operate the LIDAR device to only detect light pulses arriving from the region in the environment that have intensities that spatially vary according to the particular intensity pattern.

In one example scenario, the LIDAR device may receive several light pulses and may determine respective intensities of these light pulses. In this example scenario, a first received light pulse may have an intensity of 0.1 W/m$^2$, a second received light pulse that is spatially adjacent to the first received light pulse may have an intensity of 1.1 W/m$^2$, a third received light pulse that is spatially adjacent to the second received light pulse may have an intensity of 2.1 W/m$^2$, and a fourth received light pulse that is spatially adjacent to the third received light pulse may have an intensity of 3.1 W/m$^2$, and so on. Given these intensities, the control system may determine that adjacent received light pulses have intensities that are different by an absolute difference of 1 W/m$^2$, thereby determining that that the received light pulses have intensities that spatially vary according to the particular intensity pattern. Consequently, the control system may responsively use data generated based on these received pulses for detection/identification of objects in the region of the environment or the like.

In another example scenario, the LIDAR device may receive several light pulses and may determine respective intensities of these light pulses. In this example scenario, each received light pulse may have an intensity of 2 W/m$^2$. Given these intensities, the control system may determine that there is no difference between intensities of adjacent received light pulses and thus determine that that the received light pulses do not have intensities that spatially vary according to the particular intensity pattern. Consequently, the control system may responsively not use data generated based on these received pulses for detection/identification of objects in the region of the environment or the like. Other examples and example scenarios are possible as well.

FIGS. 11A-11F illustrate variation of intensities to help protect a LIDAR device against external light.

Figure 11A:
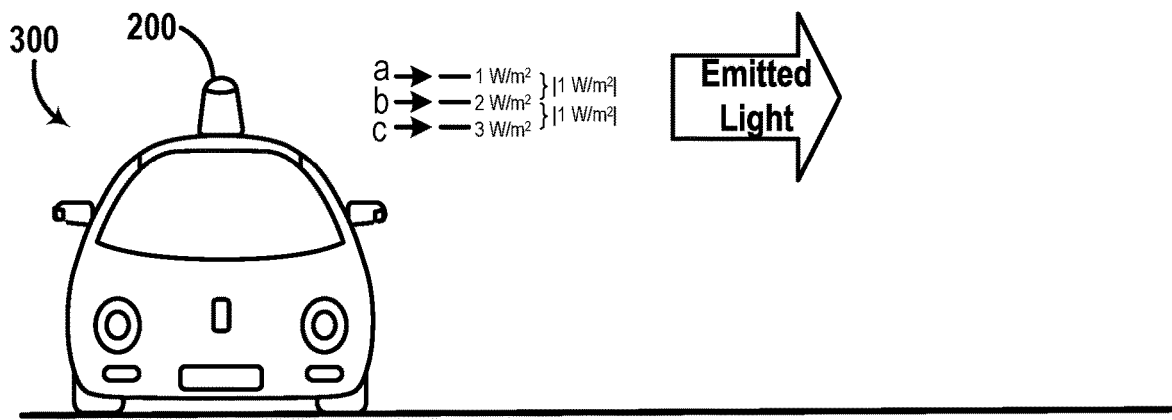
FIG. 11A illustrates a step in protection of a LIDAR device using variation of intensity, according to an example embodiment.

In particular, as shown by FIG. 11A, the vehicle 300's LIDAR device 200 emits a representative light pulse "a" having an intensity of 1 W/m², a representative light pulse "b" having an intensity of 2 W/m², and a representative light pulse "c" having an intensity of 3 W/m². In this way, the intensities of the emitted light pulses vary in accordance with a particular intensity pattern in which adjacent intensities have a particular absolute intensity difference of 1 W/m². Given the arrangements described herein, the LIDAR device 200 may thus operate to only detect light pulses having intensities that spatially vary in accordance with an intensity pattern that matches the particular intensity pattern.

Figure 11B:
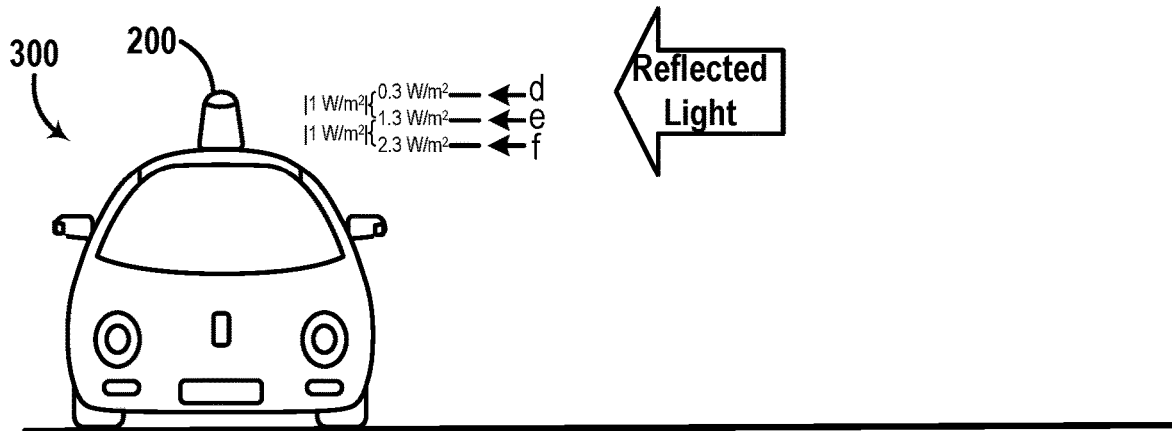
FIG. 11B illustrates another step in protection of a LIDAR device using variation of intensity, according to an example embodiment.
Figure 11C:
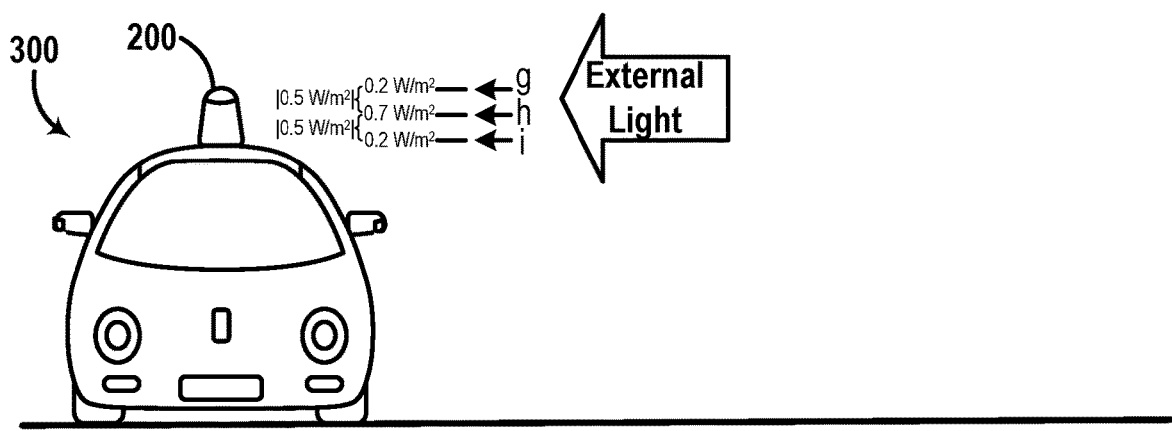
FIG. 11C illustrates yet another step in protection of a LIDAR device using variation of intensity, according to an example embodiment.

For this reason, the LIDAR device 200 may detect representative light pulses d, e, and f, which are shown in FIG. 11B as having a matching intensity pattern and being of reflected light. Specifically, as shown in FIG. 11B, the intensities of adjacent light pulses are different by an absolute intensity difference of 1 W/m². But for the same reason, the LIDAR device 200 may not detect representative light pulses g, h, and i, which are shown in FIG. 11C as having a different intensity pattern and being of external light. Specifically, as shown in FIG. 11C, the intensities of adjacent light pulses are different by an absolute intensity difference of 0.5 W/m².

Figure 11D:
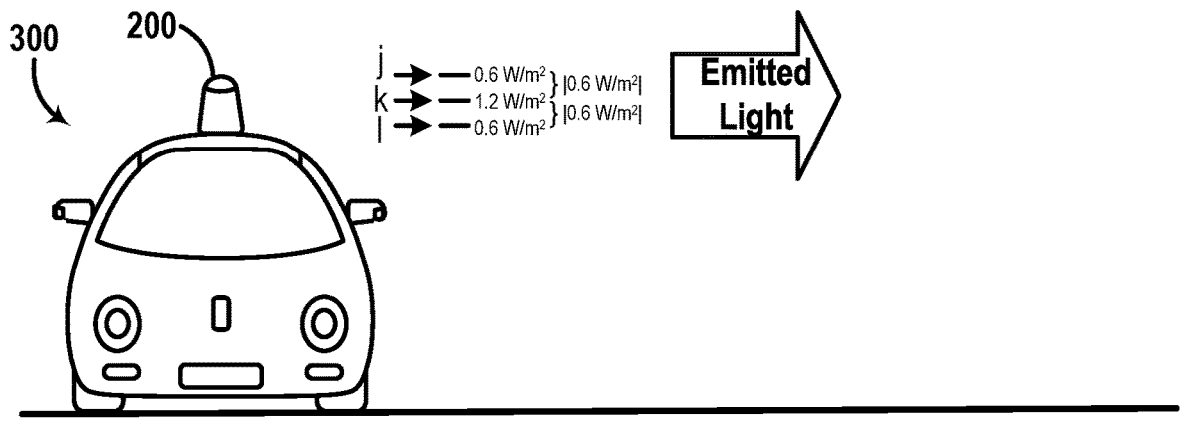
FIG. 11D illustrates yet another step in protection of a LIDAR device using variation of intensity, according to an example embodiment.

Further, FIG. 11D illustrates that the timing interval has been adjusted to an adjusted intensity pattern. Specifically, as shown by FIG. 11D, the LIDAR device 200 emits a representative light pulse "j" having an intensity of 0.6 W/m², a representative light pulse "k" having an intensity of 1.2 W/m², and a representative light pulse "1" having an intensity of 0.6 W/m². In this way, the intensities of the emitted light pulses vary in accordance with an adjusted intensity pattern in which adjacent intensities have a particular absolute intensity difference of 0.6 W/m². Given the arrangements described herein, the LIDAR device 200 may thus operate to only detect light pulses having intensities that spatially vary in accordance with an intensity pattern that matches the adjusted intensity pattern.

Figure 11E:
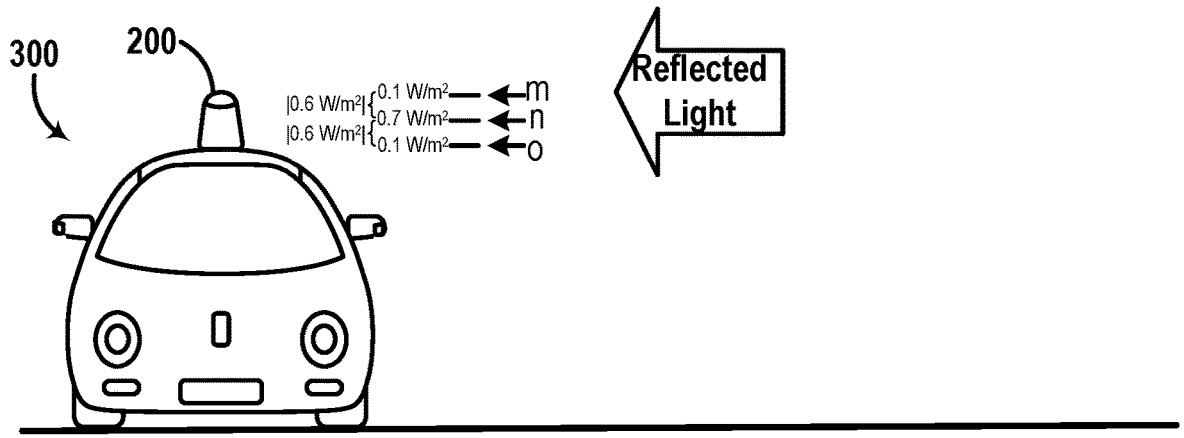
FIG. 11E illustrates yet another step in protection of a LIDAR device using variation of intensity, according to an example embodiment.
Figure 11F:
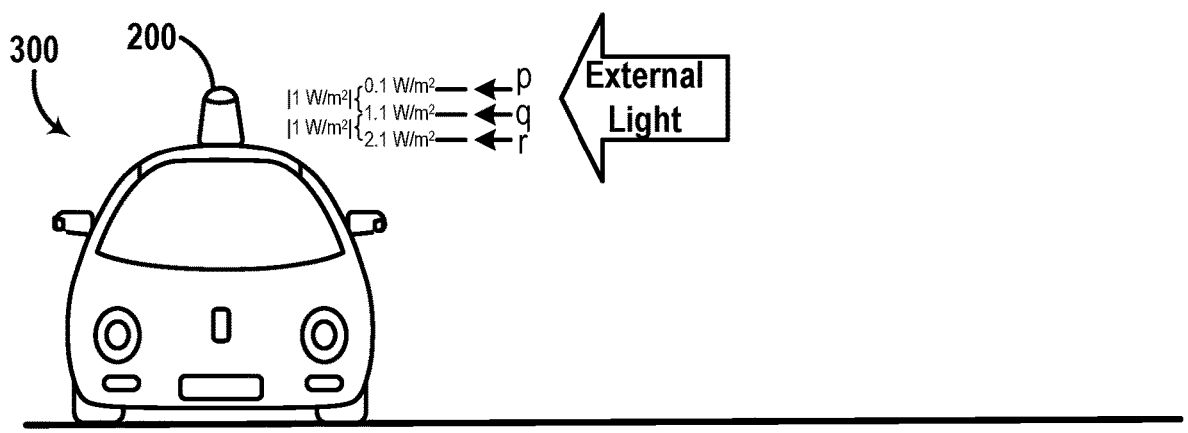
FIG. 11F illustrates yet another step in protection of a LIDAR device using variation of intensity, according to an example embodiment.

For this reason, the LIDAR device 200 may detect representative light pulses m, n, and o, which are shown in FIG. 11E as having a matching intensity pattern and being of reflected light. Specifically, as shown in FIG. 11D, the intensities of adjacent light pulses are different by an absolute intensity difference of 0.6 W/m². But for the same reason, the LIDAR device 200 may not detect representative light pulses p, q, and r, which are shown in FIG. 11F as having a different intensity pattern and being of external light, even though the intensity pattern of the light pulses p, q, and, r matches the previous intensity pattern shown in FIG. 11A. Specifically, as shown in FIG. 11F, the intensities of adjacent light pulses are different by an absolute intensity difference of 1 W/m². In this manner, the adjustment may help protect the LIDAR device 200 against external light. Other illustrations are possible as well.

iv. Variation of Modulation

In accordance with the present disclosure, the control system may operate the LIDAR device to vary over time a modulation according to which light is being emitted and to only detect light that corresponds to the modulation according to which light is being emitted. In practice, such modulation may be phase modulation of light, amplitude modulation of light, and/or frequency modulation of light, among other possibilities. Further, emitted light could be modulated using an optical modulator, among other options. Yet further, modulation of detected light could be determined using an optical demodulator, among other options.

More specifically, in accordance with the present disclosure, the control system may operate the LIDAR device to emit light according to an initial modulation (e.g., modulated in a particular pattern) and to only detect light that corresponds to the initial modulation. In this way, the control system may effectively use evaluation of light modulation as basis for distinguishing reflected light that originated at the LIDAR device from external light that did not originate at the LIDAR device. And the control system may do so in various ways.

By way of example, the control system may operate the LIDAR device to emit light according to a particular phase modulation including a modulation pattern having a particular phase variation encoded thereon. While or after doing so, the LIDAR device may receive light and an optical demodulator may apply demodulation such that the control system may then determine whether the received light has the modulation pattern having the particular phase variation, thereby determining whether the received light corresponds to the particular phase modulation. If the control system determines that the received light corresponds to the particular phase modulation, then the control system may responsively use data generated based on that light for detection/identification of objection in the environment or the like. But if the control system determines that the received light does not corresponds to the particular phase modulation, then the control system may responsively not use data generated based on that light for detection/identification of objection in the environment or the like.

In another example, the control system may operate the LIDAR device to emit light according to a particular amplitude modulation including an amplitude modulation pattern. In this regard, in some cases, a lack of emission of light for some time period corresponds to zero signal strength and thus could be considered as part of the amplitude modulation. Nonetheless, while or after emission of the light, the LIDAR device may receive light and an optical demodulator may apply demodulation such that the control system may then determine whether the received light has the amplitude modulation pattern, thereby determining whether the received light corresponds to the particular amplitude modulation. If the control system determines that the received light corresponds to the particular amplitude modulation, then the control system may responsively use data generated based on that light for detection/identification of objection in the environment or the like. But if the control system determines that the received light does not corresponds to the particular amplitude modulation, then the control system may responsively not use data generated based on that light for detection/identification of objection in the environment or the like. Other examples are possible as well.

Furthermore, in accordance with the discussion above, the control system may determine an adjustment to the initial modulation. In practice, the adjustment may involve the light being modulated according to a different pattern, among other options. As such, the control system may operate the LIDAR device to emit light according to the adjusted modulation and to only detect light that corresponds to the adjusted modulation according to which light is emitted. In this way, the control system may help overcome a situation where a modulation according to which external light is emitted matches modulation according to which light is emitted and detected by the LIDAR device.

FIGS. 12A-12F illustrate variation of modulation to help protect a LIDAR device against external light.

Figure 12A:
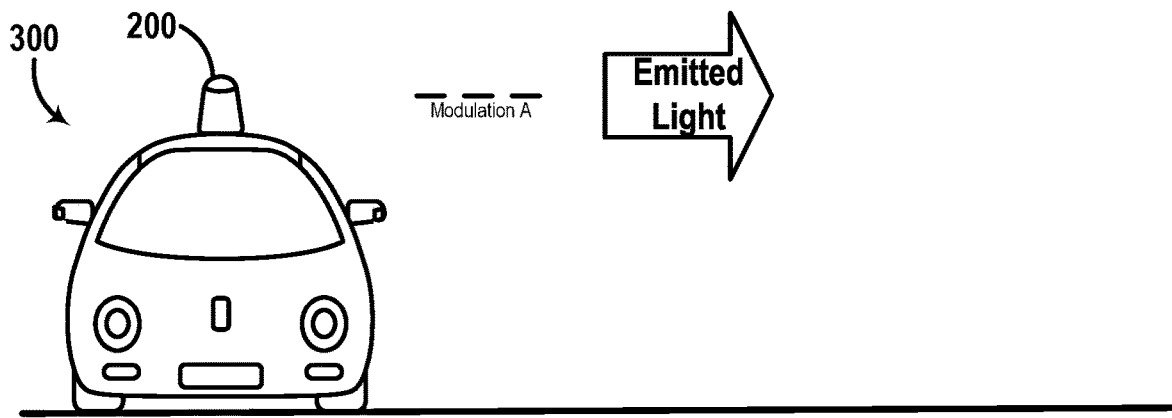
FIG. 12A illustrates a step in protection of a LIDAR device using variation of modulation, according to an example embodiment.
Figure 12B:
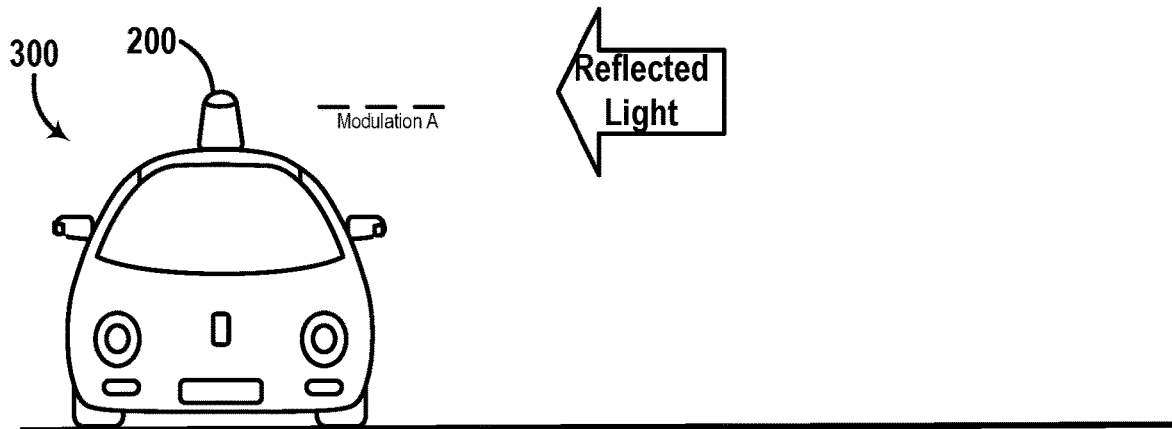
FIG. 12B illustrates another step in protection of a LIDAR device using variation of modulation, according to an example embodiment.
Figure 12C:
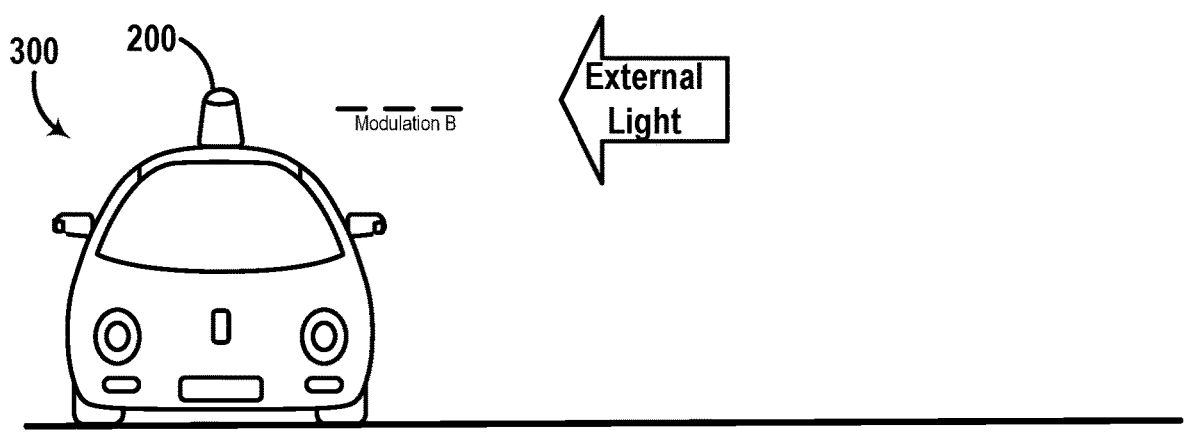
FIG. 12C illustrates yet another step in protection of a LIDAR device using variation of modulation, according to an example embodiment.

In particular, as shown by FIG. 12A, the vehicle 300's LIDAR device 200 emits representative light according to a representative modulation A. Given the arrangements described herein, the LIDAR device 200 may thus operate to only detect light that corresponds to the modulation A. For this reason, the LIDAR device 200 may detect the representative light shown in FIG. 12B, which has a matching modulation A and is of reflected light. But for the same reason, the LIDAR device 200 may not detect the representative light shown in FIG. 12C, which has modulation B and is of external light.

Figure 12D:
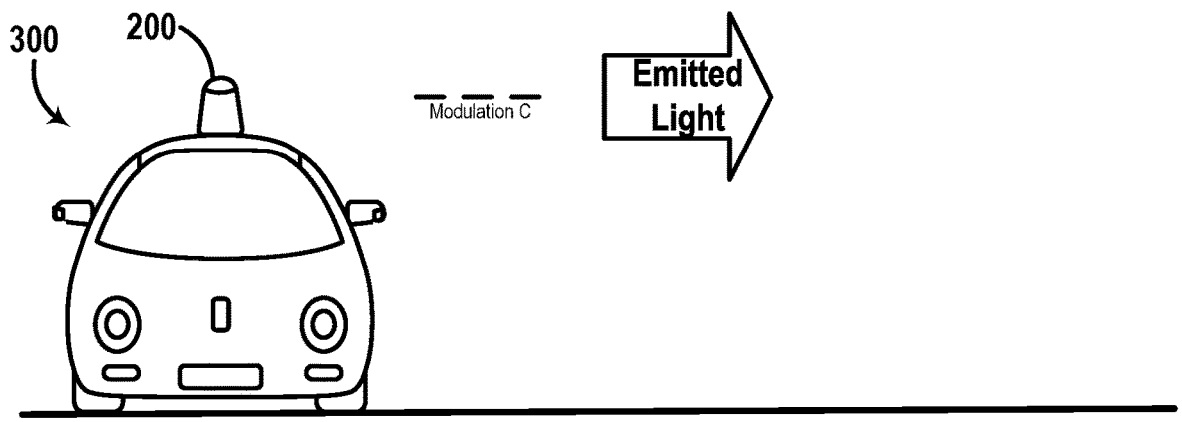
FIG. 12D illustrates yet another step in protection of a LIDAR device using variation of modulation, according to an example embodiment.
Figure 12E:
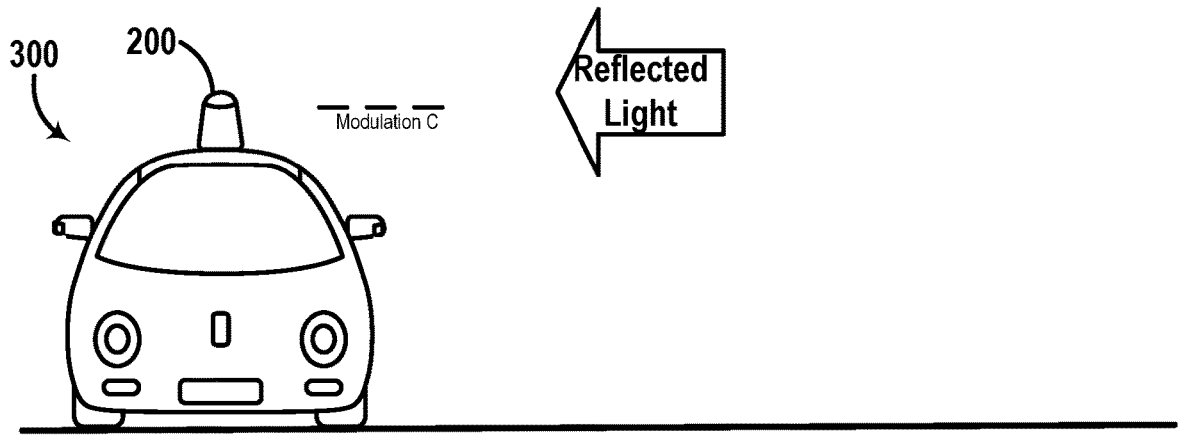
FIG. 12E illustrates yet another step in protection of a LIDAR device using variation of modulation, according to an example embodiment.
Figure 12F:
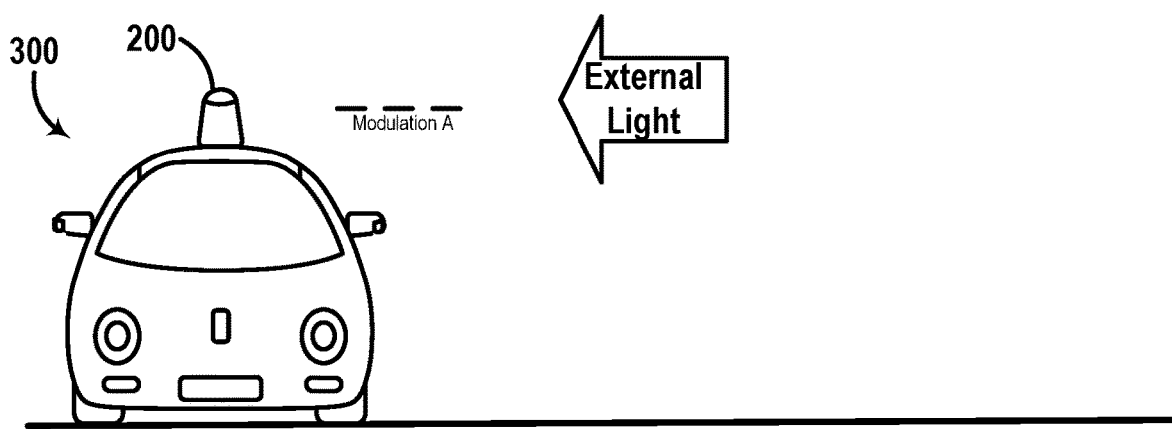
FIG. 12F illustrates yet another step in protection of a LIDAR device using variation of modulation, according to an example embodiment.

Further, FIG. 12D illustrates that the modulation has been adjusted to an adjusted modulation C. As such, as shown by FIG. 12D, the LIDAR device 200 emits representative light according to the modulation C. Given the arrangements described herein, the LIDAR device 200 may thus operate to only detect light that corresponds to the modulation C. For this reason, the LIDAR device 200 may detect the representative light shown in FIG. 12E, which has a matching modulation C and is of reflected light. But for the same reason, the LIDAR device 200 may not detect the representative light shown in FIG. 12F, which has modulation A and is of external light, even though this modulation A matches the previous modulation shown in FIG. 12A. In this manner, the adjustment may help protect the LIDAR device 200 against external light. Other illustrations are possible as well.

VI. A REACTIVE MITIGATION PROCEDURE TO PROTECT A LIDAR DEVICE

In accordance with the present disclosure, a control system may be configured to engage in a reactive mitigation procedure. In particular, the reactive mitigation procedure may involve a control system carrying out one or more operations to protect the LIDAR device against external light and doing so specifically in response to detecting that external light is being emitted towards the LIDAR device. In this way, the control system may ensure that reactive mitigation features are in place to protect operation of the LIDAR device against external light.

Figure 13:
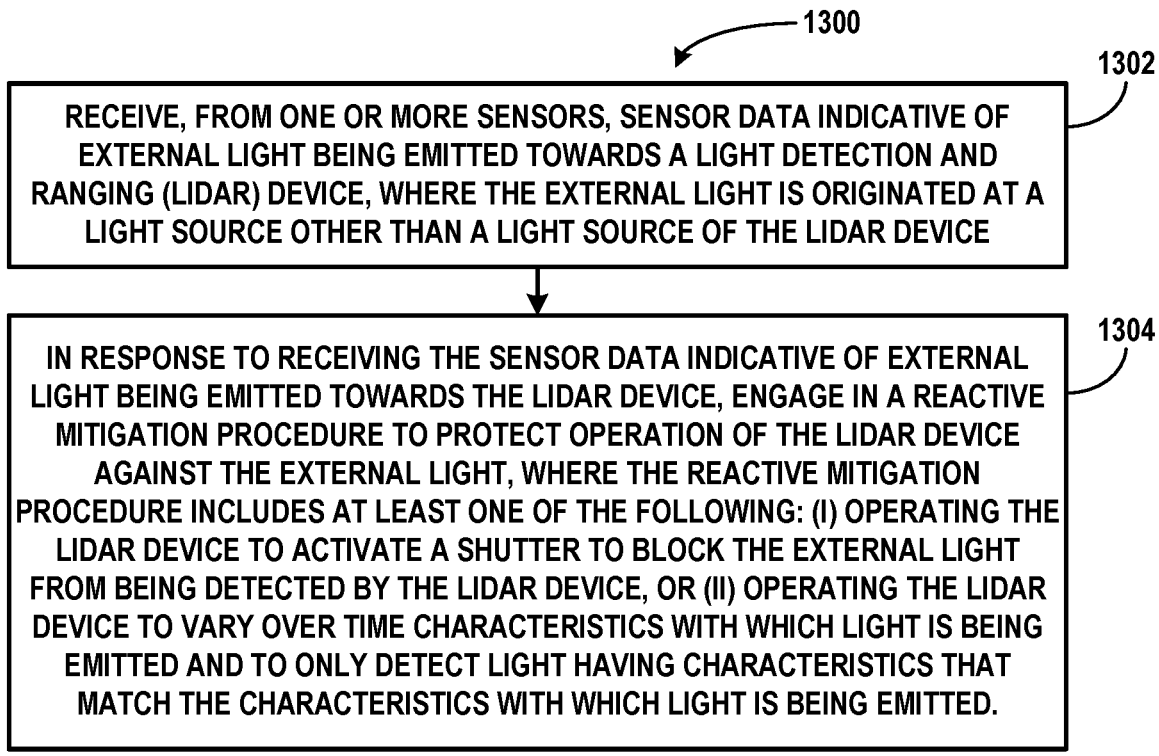
FIG. 13 is a flowchart illustrating a method for operating a LIDAR device to carry out a reactive mitigation procedure in response to detection of external light, according to an example embodiment.

FIG. 13 is a flowchart illustrating a method 1300, according to an example implementation. In particular, method 1300 may be implemented to carry out a reactive mitigation procedure in response to detection of external light.

At block 1302, method 1300 involves receiving, from one or more sensors, sensor data indicative of external light being emitted towards a LIDAR device, where the external light is originated at a light source other than a light source of the LIDAR device. In accordance with an example implementation, a sensor that is configured to generate sensor data indicative of external light being emitted may take on one or more of various forms.

In one example, an external sensor may be coupled to the LIDAR device (e.g., to the housing) and may be configured to generate sensor data indicative of external light. For instance, the external sensor may be a light sensor or the like that is configured to receive light having optical characteristics other than those of the light that the LIDAR device currently emits. If the external sensor detects light, the external sensor at issue may responsively transmit a signal to the control system. And in response to receiving the signal, the control system may determine that external light is being emitted towards the LIDAR device.

In another example, the sensor configured to generate sensor data indicative of external light may be the LIDAR device itself. For instance, the LIDAR device may include a photodetector (e.g., in the detector array) configured to receive light having optical characteristics other than those of the light that the LIDAR device emits. If the photodetector detects light, the photodetector at issue may responsively generate a signal based on which data is then generated. And based at least on that data being generated due to the photodetector at issue, the control system may determine that external light is being emitted towards the LIDAR device.

In yet another example, the sensor configured to generate sensor data indicative of external light may be a sensor of a vehicle other than the LIDAR device. For instance, any of the sensors described below in associated with vehicle 1700 of FIG. 17 could be used for this purpose. But various other sensors could be incorporated into the vehicle and could additionally or alternatively be used for that purpose as well. In a specific example, the control system may receive image data from a camera of the vehicle and the control system may determine that the image data includes an image an external light source in the environment (e.g., using currently known or future developed object recognition techniques). In this example, the control system may thus determine based on the image data that external light is being emitted or at least could be emitted towards the LIDAR device. Other examples are possible as well.

At block 1304, method 1300 involves, in response to receiving the sensor data indicative of external light being emitted towards the LIDAR device, engaging in a reactive mitigation procedure to protect operation of the LIDAR device against the external light, where the reactive mitigation procedure comprises at least one of the following: (i) operating the LIDAR device to activate a shutter to block the external light from being detected by the LIDAR device, or (ii) operating the LIDAR device to vary over time characteristics with which light is being emitted and to only detect light having characteristics that match the characteristics with which light is being emitted.

i. Shutter Activation

In accordance with the present disclosure, the control system may respond to detection of external light by operating the LIDAR device to activate a shutter to block the external light from being detected by the LIDAR device. In practice, the control system may activate the shutter temporarily. In this way, the control system may help block detection of the external light by the LIDAR device while ensuring that the LIDAR device still provides information about the environment over time. Generally, the shutter at issue may take on one of various forms.

In one case, the shutter may be a mechanical shutter. For example, a mechanical shutter may take the form of a focal plane shutter, a simple leaf shutter, a diaphragm shutter, and/or a central shutter, among other options. In this case, the control system may activate the mechanical shutter by transmitting a signal or the like to actuate ("close") the shutter to block external light from being detected by the LIDAR device.

In another case, the shutter may be an optical shutter. In particular, when activated, the optical shutter may filter out light having one or more target wavelength and may pass through light having wavelengths other than the one or more target wavelengths. For example, the optical shutter may be the above described adaptive filter. As such, the control system could operate the LIDAR device to activate the adaptive filter. Moreover, the control system could determine a wavelength of the external light (e.g. based on the received sensor data) and could then responsively reconfigure the adaptive filter to select the determined wavelength as at least one of the target wavelengths that the adaptive filter filters out. In this manner, the control system may ensure that reflected light is being detected by the LIDAR device while external light is not being detected by the LIDAR device. Other cases and examples are possible as well.

In a further aspect, the LIDAR device may include a look-ahead sensor arranged to generate sensor data indicative of external light being emitted towards the LIDAR device from a particular portion of the environment. As an initial matter, the look-ahead sensor could be the external sensor described above, among other options. Also, the look-ahead sensor could be positioned so as to effectively check a portion of the environment for external light before the LIDAR device rotates to a position in which the LIDAR device scans that portion of the environment. Once the control system determined that the LIDAR device has rotated to a position in which the LIDAR device is scanning or is about to scan that portion of the environment, the control system may responsively activate the shutter so as to block the external light from being detected.

Given this arrangement, if the look-ahead sensor determines that external light is being emitted towards to the LIDAR device, the control system may use one or more of various approaches to determine based on data from the look-ahead sensor the particular portion of the environment from which external light is being emitted, and thus when to activate the shutter.

In an example approach, the control system may receive, from the look-ahead sensor, sensor data indicative of external light. In this approach, the control system may determine a particular angular position the look-ahead sensor (e.g., using a rotary encoder) at the time when the look-ahead sensor detects the external light. Then, based on an angular offset between a location of the look-ahead sensor on the LIDAR device and a location of the LIDAR device's aperture through which light is received, the control system may determine that the aperture will be at the particular angular position after the LIDAR device rotates by an extent that substantially matches the angular offset. As such, the control system may activate the shutter in response to a determination that the aperture is at the particular angular position. In practice, the control system may make such a determination by using the rotary encoder to determine that the LIDAR device has rotated by an extent that substantially matches the angular offset at issue, or may do so in other ways.

Moreover, in some cases, the control system may also use the refresh rate of the LIDAR device in combination with the angular offset so as to determine or estimate a time when the aperture is expected to be at the particular angular position. In such cases, the control system may activate the shutter at that time when the aperture is expected to be at the particular angular position. Other cases and approaches are also possible.

Furthermore, as noted, the control system may only temporarily activate the shutter. In the context of the look-ahead sensor arrangement, the control system may activate the shutter only while the LIDAR device is scanning or is about to scan the particular portion of the environment from which external light being emitted towards the LIDAR device. For example, the control system may determine (e.g., using the rotary encoder) that the LIDAR device is no longer scanning the particular portion of the environment. Responsively, the control system may operate the LIDAR device to deactivate the shutter so as to no longer block light. Generally, the control sensor may do so only if the look-ahead sensor did not generate sensor data indicating that external light is being emitted from a subsequent portion of the environment. In a situation when the look-ahead sensor did generate such data, the control system would operate the LIDAR device to maintain activation of the shutter to block external light in accordance with the discussion above, and so on.

Figure 14A:
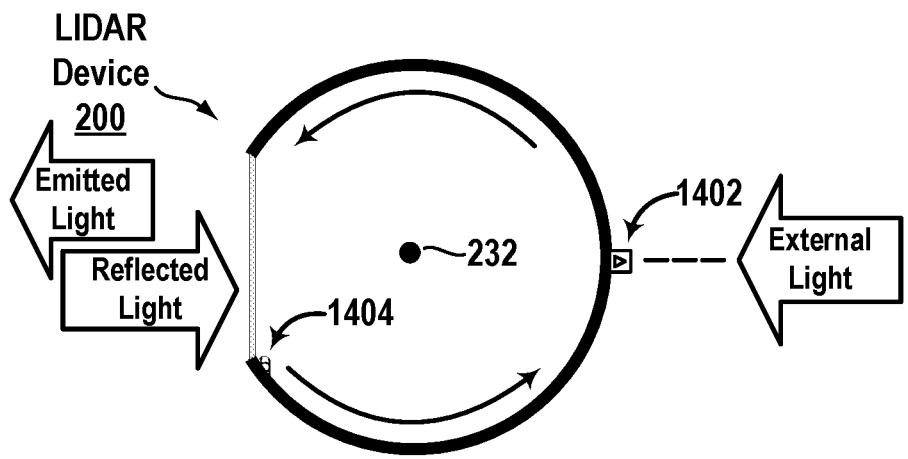
FIG. 14A illustrates a step in protection of a LIDAR device using a look-ahead sensor, according to an example embodiment.
Figure 14B:
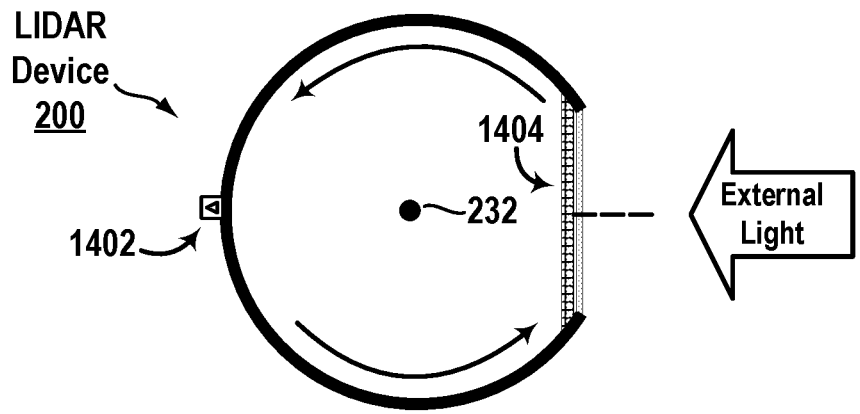
FIG. 14B illustrates another step in protection of a LIDAR device using a look-ahead sensor, according to an example embodiment.
Figure 14C:
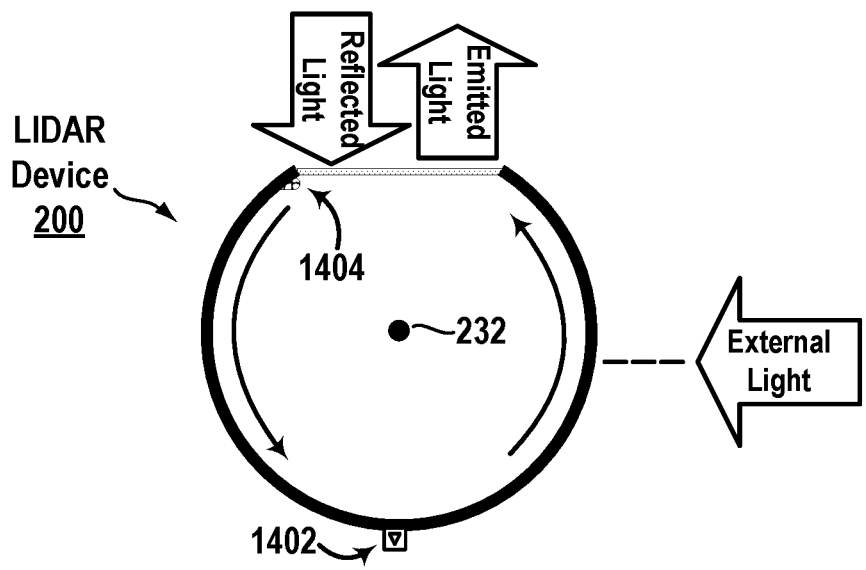
FIG. 14C illustrates yet another step in protection of a LIDAR device using a look-ahead sensor, according to an example embodiment.

FIGS. 14A to 14C illustrate activation of a shutter in the context of the look-ahead sensor arrangement. In particular, FIG. 14A illustrates that, while the LIDAR device 200 emits light and detects reflected light, a representative look-ahead sensor 1402 detects external light being emitted towards the LIDAR device from a particular portion of the environment. FIG. 14B then illustrates that a representative mechanical shutter 1404 has been activated once the LIDAR device 200 has rotated to a position in which the LIDAR device 200 is arranged to scan the particular portion of the environment. As such, the mechanical 1404 blocks the external light, as shown by FIG. 14B. Finally, after the LIDAR device has further rotated and is no longer scanning the particular portion of the environment, the mechanical shutter 1404 is deactivated to no longer block light, as shown by FIG. 14C. Other illustrations are possible as well.

ii. Variation of Optical Characteristics

In accordance with the present disclosure, the control system may additionally or alternatively respond to detection of external light by operating the LIDAR device to vary over time characteristics with which light is being emitted and to only detect light having characteristics that are the same as the characteristics with which light is being emitted. In this regard, any of features described above in the context of the proactive mitigation procedure may be carried out in the context of the reactive mitigation procedure. As such, the control system may respond to detection of external light by operating the LIDAR device to vary timing, wavelengths, intensity, and/or modulation in accordance with the discussion above.

In a further aspect, responding to detection of external light by varying optical characteristics may involve use of a backup wavelength to help protect the LIDAR device against external light. In particular, the control system may operate the LIDAR device to emit a first wavelength and to at least detect light having the first wavelength in accordance with the discussion above. Then, the control system may operate the LIDAR device to continue to emit light having the first wavelength and to additionally emit light having a second wavelength that is different from the first wavelength. In this situation, the control system may also operate the LIDAR device to no longer detect light having the first wavelength and to instead detect light having the second wavelength, even though the LIDAR device continues to emit light having the first wavelength.

In practice, use of the backup wavelength may help increase the difficulty of ascertaining which wavelength is in fact being used for detection by the LIDAR device. In particular, as noted, optical characteristics of the external light could be manually or automatically altered to match the set of optical characteristics of light being emitted and detected by the LIDAR device. For this reason, the wavelength of the external light could be manually or automatically altered to match the initially emitted first wavelength and the wavelength of the external light may continue matching the first wavelength due to continued emission of light having the first wavelength. But such matching may no longer present an issue because the control system has begun operating the LIDAR device to instead detect light having the backup second wavelength. Moreover, in some cases, the control system may carry out the disclosed use of the backup second wavelengths specifically in response to determining that the external light has the matching first wavelength, rather using the backup wavelength only in response to detection of external light. Other cases are possible as well.

Figure 15A:
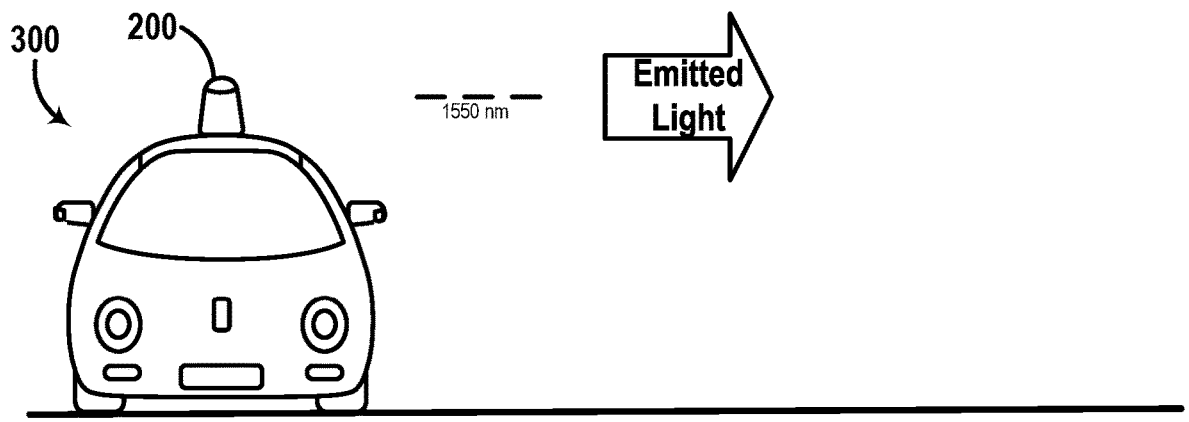
FIG. 15A illustrates a step in protection of a LIDAR device using emission and detection of a backup wavelength, according to an example embodiment.
Figure 15B:
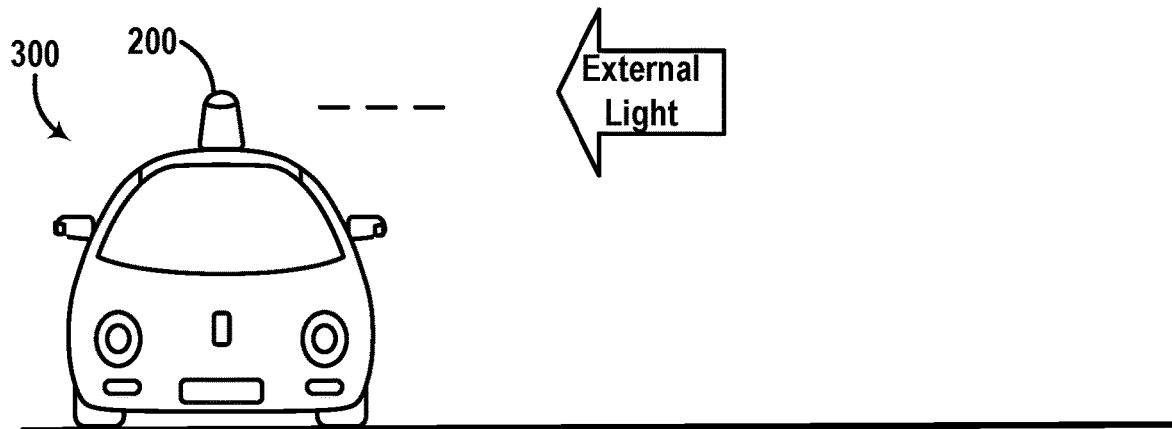
FIG. 15B illustrates another step in protection of a LIDAR device using emission and detection of a backup wavelength, according to an example embodiment.
Figure 15C:
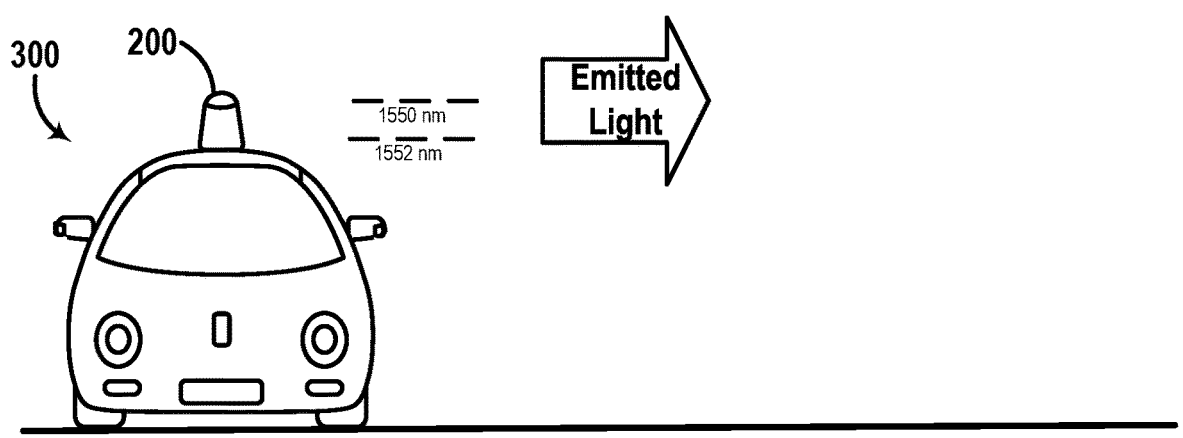
FIG. 15C illustrates yet another step in protection of a LIDAR device using emission and detection of a backup wavelength, according to an example embodiment.

FIGS. 15A-15B illustrate use of a backup wavelength to help protect a LIDAR device against external light. In particular, the LIDAR device 200 may initially emit light having a wavelength of 1550 nm, as shown by FIG. 15A, and may detect light having a wavelength of 1550 nm. As shown by FIG. 15B, emission of external light towards the LIDAR device is detected. Responsively, the LIDAR device then emits light having the wavelength of 1550 nm as well as light having a backup wavelength of 1552 nm. In accordance with the discussion above, however, the LIDAR device 200 may be operated to no longer detect light having the wavelength of 1550 nm and to instead detect light having the wavelength of 1552 nm. In this way, there may be an increase in difficulty of ascertaining which wavelength is in fact being used for detection by the LIDAR device 200. Other illustrations are possible as well.

VII. ADDITIONAL FEATURES

In accordance with the present disclosure, additional features may help protect a LIDAR device and/or a vehicle on which the LIDAR device is positioned. Although certain additional features are described, other features are possible as well.

i. Selection of Mitigation Operations

In an example implementation, the control system may select which combination of the above-described mitigation operations to carry out. In the context of the proactive mitigation procedure, the control system may select one or more operations from the following: variation of timing, variation of wavelength, variation of intensities, and/or variation of modulation, among other options. And in the context of the reactive mitigation procedure, the control system may select one or more operations from the following: use of a mechanical shutter, use of an optical shutter, use of a backup wavelength, use of different wavelength filter in the receive path, variation of timing, variation of wavelength, variation of intensities, and/or variation of modulation, among other options.

Moreover, the control system may select the one or more mitigation operations based on various factors. In practice, the control system may use any combination of those factors as basis for the selection, perhaps giving certain factors more weight compared to others as part of the selection. Also, although example factors are introduced below, various other factors are possible as well without departing from the scope of the present disclosure.

In particular, the control system may select the one or more mitigation operations based on at least one of the following: characteristics of light being emitted by the LIDAR device, characteristics of reflected light, characteristics of external light, energy usage by the LIDAR device, distance(s) of object(s) detected using the LIDAR device, object(s) identified using the LIDAR device, location of the vehicle, destination of the vehicle, state of the vehicle, or sensor data generated by other sensors of the vehicle, among other possibilities.

In a further aspect, when the control system selects two or more mitigation operations, the control system may also determine an approach for using these selected operations in combination. In practice, the control system may determine that approach based on one or more of the above-described factors and/or may determine the approach in other ways.

In one example, the control system may determine a sequence in which to use the selected mitigation operations, such as by determining that a first mitigation operation should be followed by a second mitigation operation. In this regard, the control system may determine that the second mitigation operation should begin immediately following the end of the first mitigation operation. Alternatively, the control system may determine that the control system should wait for a particular time period after performing the first mitigation operation and then perform the second mitigation operation upon expiration of the particular time period.

In another example, the control system may determine that the control system should concurrently perform two or more selected mitigation operations. In this regard, the control system may determine that the control system should start performing the selected mitigation operations at the same point in time. Alternatively, the control system may determine that the control system should start performing a first mitigation operation and, in the midst of performing that first mitigation operation, begin performing a second mitigation operation. Other examples are possible as well.

ii. Localizing on the External Light Source

In an example implementation, the control system may operate one or more sensors of the vehicle so as to determine a location associated with the external light source that emits the external light. By way of example, the determination of the location may be based on data from a camera of the vehicle, among other possibilities. Nonetheless, such determination of the location may occur for a single instance, from time-to-time, and/or continuously. With this arrangement, the control system may effectively be able to keep track of the portion of the environment from which external light is being emitted or may be emitted towards the LIDAR device. Additionally or alternatively, the control system could report (e.g., via a wireless communication link) the determined location to various entities, such as to nearby vehicles, among other options.

iii. Protecting other Systems of the Vehicle

In an example implementation, the control system may use detection and characterization of external light being emitted towards the LIDAR device as a trigger for initiating operations to protect other system(s) of the vehicle. For example, in response to detecting the external light, the control system may initiate operations to protect a different LIDAR device of the vehicle, such as by operating the different LIDAR device in accordance with any one of the mitigation operations discussed herein. In this way, the control system may effectively initiate measures for protecting one or more other systems of the vehicle.

iv. Triggering Use of Other Systems of the Vehicle

In an example implementation, the control system may use detection of external light being emitted towards the LIDAR device as a trigger for additionally or alternatively using one or more other systems of the vehicle to obtain information about the environment. For example, in response to detecting the external light, the control system may additionally or alternatively use a different LIDAR device of the vehicle, a camera of the vehicle, and/or a radar of the vehicle, among other possibilities. In this way, the control system may effectively take steps to ensure that, despite presence of the external light, the control system is able to receive information about the environment based on which the control system can then operate the vehicle.

v. Vertical Blocking of External Light

In an example implementation, in addition to or instead of use of a shutter to block external light along a horizontal FOV, the control system may be configured to actuate a shutter to block external light along a vertical FOV.

In particular, the LIDAR device and/or the vehicle may include a sensor configured to generate sensor data indicative of a position along a vertical FOV from which external light is arriving at the LIDAR device, and the control system may determine that vertical position based on this sensor data (e.g., a position above or below the LIDAR device). For example, this sensor may be a linear array of photodetectors having angular spacing along the vertical FOV. Other examples are also possible.

Additionally, the shutter at issue may be a Micro-Electro-Mechanical-System (MEMS), such as a MEMS array of micro mirrors. With this arrangement, once the vertical position is determined, the control system may operate the MEMS array to block and/or redirect external light that is arriving from that vertical position. Specifically, the control system may operate the MEMS array to change the angular positioning of one or more of the micro mirrors so as to deviate away the external light arriving from the vertical position. In this way, the disclosed implementation may allow for blocking of external light along a vertical FOV while allowing for continued scanning of the environment by the LIDAR device along the horizontal FOV. Other aspects and implementations are possible as well.

VIII. CONTROLLING A VEHICLE BASED ON SCANS BY THE LIDAR DEVICE

As noted, a control system may operate a vehicle based on scans received from the LIDAR device disclosed herein. In particular, the control system may receive from the LIDAR device scans of an environment around the vehicle. And the control system may operate the vehicle based at least on the scans of the environment received from the LIDAR device.

More specifically, the control system may operate the LIDAR device 100 to emit light into the environment. Also, the controller may receive from the LIDAR device 100 data representative of detections of reflected light. And by comparing detected light beams with emitted light beams, the controller may determine at least one aspect of one or more objects in the environment.

For example, by comparing a time when a plurality of light beams were emitted by the transmitter of the LIDAR device 100 and a time when the receiver of the LIDAR device 100 detected reflected light, a distance between the LIDAR device 100 and an object in the environment may be determined. In other examples, aspects such as shape, color, material, etc. may also be determined based on various comparisons between emitted light and detected light.

With this arrangement, the control system could determine a three-dimensional (3D) representation of the environment based on data from the LIDAR device 100. For example, the 3D representation may be generated by the control system as a 3D point cloud based on the data from the LIDAR device 100. Each point of the 3D cloud, for example, may be associated with a reflected light pulse. As such, the control system may (e.g., continuously or from time-to-time) generate 3D representations of the environment or portions thereof. And the control system could then control operation of the vehicle based on evaluation of such 3D representations of the environment.

By way of example, the vehicle may be operated in an autonomous mode. In this example, the controller may utilize 3D representations to navigate the vehicle (e.g., adjust speed, direction, etc.) safely by avoiding obstacles among other possibilities. The obstacles or objects, for example, may be detected and/or identified using an image processing algorithm or other computing method to analyze the 3D representations and detect and/or identify the various obstacles or objects. As another example, the vehicle may be operated in a partially autonomous or manual mode. In this example, the vehicle may notify a driver or operator of the vehicle of the presence or distance to various objects or changing road conditions (e.g., street lights, street signs, etc.), such as by causing a display or a speaker in the vehicle to present information regarding one or more objects in the environment. Other examples are possible as well.

Figure 16:
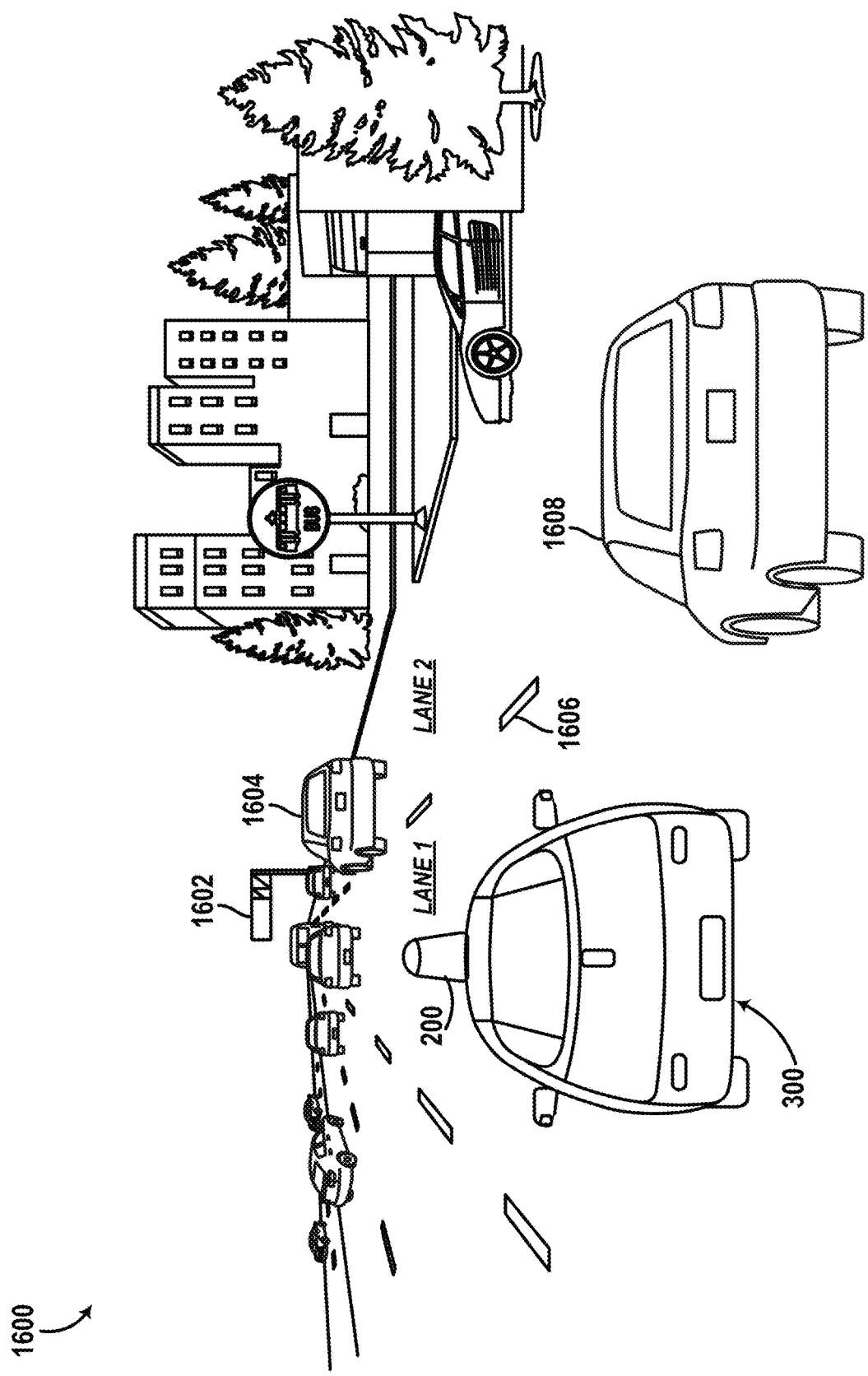
FIG. 16 illustrates operation of a vehicle based on scans of an environment received from a LIDAR device, according to an example embodiment.

FIG. 16 next illustrates example operation of the vehicle 300 based on scans of an environment 1600 received from the LIDAR device 200. In accordance with the present disclosure, the vehicle's control system may use data received from the receiver 210 of the LIDAR device 200 to detect and identify far away object, such as a road sign 1602 and a vehicle 1604 for example. In this regard, the control system may determine based on the data that the road sign 1602 is representative of an exit that the vehicle 300 should ideally take in order to arrive at a desired destination. In response to making that determination, the control system may then operate the vehicle 300 to switch from driving on lane 1 to driving on lane 2.

In practice, the controller may distinguish between these lanes by recognizing lane markers within 3D representations of the environment 1600. For instance, the vehicle's control system may use data received from the receiver 210 of the LIDAR device 200 to detect and identify the nearby lane marker 1606 that separates lane 1 from lane 2. Moreover, before operating the vehicle to switch lanes, the control system may scan the environment to detect and identify objects, so that control system can operate the vehicle 300 in a way that avoids those detected/identified objects while also operating the vehicle 300 to switch lanes.

For instance, the control system may use data received from the receiver 210 of the LIDAR device 200 to detect and identify the nearby vehicle 1608 as well as to detect and identify the further vehicle 1604. Based on those detections/identifications, the control system may operate the vehicle 300 in a way that avoids the vehicles 1604 and 1608 while also operating the vehicle 300 to switch from driving on lane 1 to driving on lane 2. Other illustrations are possible as well.

IX. EXAMPLE ARRANGEMENT OF A VEHICLE

Figure 17:
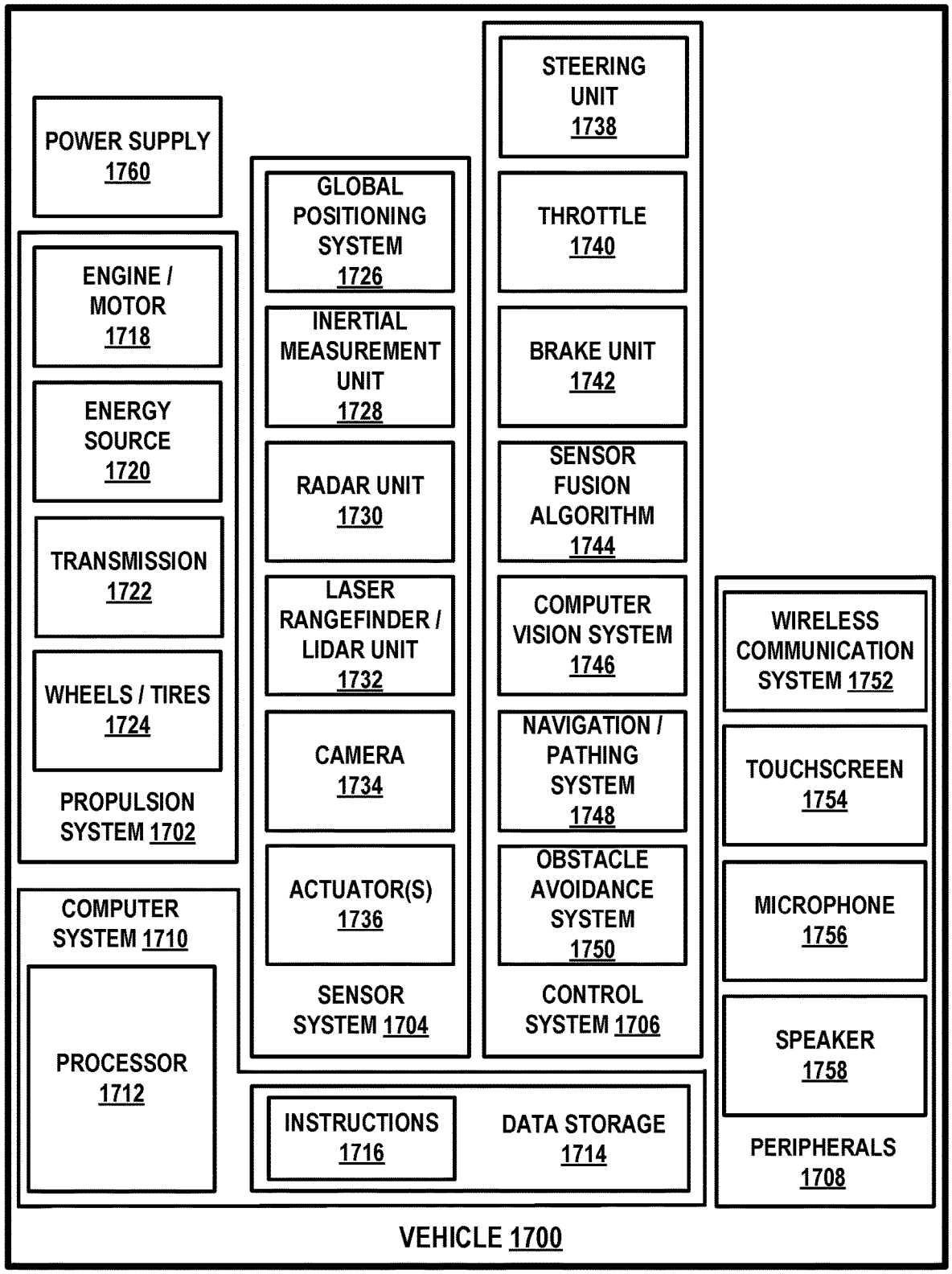
FIG. 17 is a simplified block diagram of a vehicle, according to an example embodiment.

Finally, FIG. 17 is a simplified block diagram of a vehicle 1700, according to an example embodiment. The vehicle 1700 may be similar to the vehicle 300, and may include a LIDAR device similar to the LIDAR device 100. Further, the vehicle 1700 may be configured to perform functions and methods herein. As shown, the vehicle 1700 includes a propulsion system 1702, a sensor system 1704, a control system 1706 (could also be referred to as a controller 1706), peripherals 1708, and a computer system 1710. In other embodiments, the vehicle 1700 may include more, fewer, or different systems, and each system may include more, fewer, or different components.

Additionally, the systems and components shown may be combined or divided in any number of ways. For instance, the control system 1706 and the computer system 1710 may be combined into a single system that operates the vehicle 1700 in accordance with various operations.

The propulsion system 1702 may be configured to provide powered motion for the vehicle 1700. As shown, the propulsion system 1702 includes an engine/motor 1718, an energy source 1720, a transmission 1722, and wheels/tires 1724.

The engine/motor 1718 may be or include any combination of an internal combustion engine, an electric motor, a steam engine, and a Sterling engine. Other motors and engines are possible as well. In some embodiments, the propulsion system 1702 may include multiple types of engines and/or motors. For instance, a gas-electric hybrid car may include a gasoline engine and an electric motor. Other examples are possible.

The energy source 1720 may be a source of energy that powers the engine/motor 1718 in full or in part. That is, the engine/motor 1718 may be configured to convert the energy source 1720 into mechanical energy. Examples of energy sources 1720 include gasoline, diesel, propane, other compressed gas-based fuels, ethanol, solar panels, batteries, and other sources of electrical power. The energy source(s) 1720 may additionally or alternatively include any combination of fuel tanks, batteries, capacitors, and/or flywheels. In some embodiments, the energy source 1720 may provide energy for other systems of the vehicle 1700 as well.

The transmission 1722 may be configured to transmit mechanical power from the engine/motor 1718 to the wheels/tires 1724. To this end, the transmission 1722 may include a gearbox, clutch, differential, drive shafts, and/or other elements. In embodiments where the transmission 1722 includes drive shafts, the drive shafts may include one or more axles that are configured to be coupled to the wheels/tires 1724.

The wheels/tires 1724 of vehicle 1700 may be configured in various formats, including a unicycle, bicycle/motorcycle, tricycle, or car/truck four-wheel format. Other wheel/tire formats are possible as well, such as those including six or more wheels. In any case, the wheels/tires 1724 may be configured to rotate differentially with respect to other wheels/tires 1724. In some embodiments, the wheels/tires 1724 may include at least one wheel that is fixedly attached to the transmission 1722 and at least one tire coupled to a rim of the wheel that could make contact with the driving surface. The wheels/tires 1724 may include any combination of metal and rubber, or combination of other materials. The propulsion system 1702 may additionally or alternatively include components other than those shown.

The sensor system 1704 may include a number of sensors configured to sense information about an environment in which the vehicle 1700 is located, as well as one or more actuators 1736 configured to modify a position and/or orientation of the sensors. As shown, the sensors of the sensor system 1704 include a Global Positioning System (GPS) 1726, an inertial measurement unit (IMU) 1728, a RADAR unit 1730, a laser rangefinder and/or LIDAR unit 1732, and a camera 1734. The sensor system 1704 may include additional sensors as well, including, for example, sensors that monitor internal systems of the vehicle 1700 (e.g., an $O_2$ monitor, a fuel gauge, an engine oil temperature, etc.). Other sensors are possible as well.

The GPS 1726 may be any sensor (e.g., location sensor) configured to estimate a geographic location of the vehicle 1700. To this end, the GPS 1726 may include a transceiver configured to estimate a position of the vehicle 1700 with respect to the Earth. The GPS 1726 may take other forms as well.

The IMU 1728 may be any combination of sensors configured to sense position and orientation changes of the vehicle 1700 based on inertial acceleration. In some embodiments, the combination of sensors may include, for example, accelerometers and gyroscopes. Other combinations of sensors are possible as well.

The RADAR unit 1730 may be any sensor configured to sense objects in the environment in which the vehicle 1700 is located using radio signals. In some embodiments, in addition to sensing the objects, the RADAR unit 1730 may additionally be configured to sense the speed and/or heading of the objects.

Similarly, the laser range finder or LIDAR unit 1732 may be any sensor configured to sense objects in the environment in which the vehicle 1700 is located using lasers. For example, LIDAR unit 1732 may include one or more LIDAR devices, at least some of which may take the form the LIDAR device 100 disclosed herein.

The camera 1734 may be any camera (e.g., a still camera, a video camera, etc.) configured to capture images of the environment in which the vehicle 1700 is located. To this end, the camera may take any of the forms described above. The sensor system 1704 may additionally or alternatively include components other than those shown.

The control system 1706 may be configured to control operation of the vehicle 1700 and its components. To this end, the control system 1706 may include a steering unit 1738, a throttle 1740, a brake unit 1742, a sensor fusion algorithm 1744, a computer vision system 1746, a navigation or pathing system 1748, and an obstacle avoidance system 1750.

The steering unit 1738 may be any combination of mechanisms configured to adjust the heading of vehicle 1700. The throttle 1740 may be any combination of mechanisms configured to control the operating speed of the engine/motor 1718 and, in turn, the speed of the vehicle 1700. The brake unit 1742 may be any combination of mechanisms configured to decelerate the vehicle 1700. For example, the brake unit 1742 may use friction to slow the wheels/tires 1724. As another example, the brake unit 1742 may convert the kinetic energy of the wheels/tires 1724 to electric current. The brake unit 1742 may take other forms as well.

The sensor fusion algorithm 1744 may be an algorithm (or a computer program product storing an algorithm) configured to accept data from the sensor system 1704 as an input. The data may include, for example, data representing information sensed at the sensors of the sensor system 1704. The sensor fusion algorithm 1744 may include, for example, a Kalman filter, a Bayesian network, an algorithm for some of the functions of the methods herein, or any another algorithm. The sensor fusion algorithm 1744 may further be configured to provide various assessments based on the data from the sensor system 1704, including, for example, evaluations of individual objects and/or features in the environment in which the vehicle 1700 is located, evaluations of particular situations, and/or evaluations of possible impacts based on particular situations. Other assessments are possible as well.

The computer vision system 1746 may be any system configured to process and analyze images captured by the camera 1734 in order to identify objects and/or features in the environment in which the vehicle 1700 is located, including, for example, traffic signals and obstacles. To this end, the computer vision system 1746 may use an object recognition algorithm, a Structure from Motion (SFM) algorithm, video tracking, or other computer vision techniques. In some embodiments, the computer vision system 1746 may additionally be configured to map the environment, track objects, estimate the speed of objects, etc.

The navigation and pathing system 1748 may be any system configured to determine a driving path for the vehicle 1700. The navigation and pathing system 1748 may additionally be configured to update the driving path dynamically while the vehicle 1700 is in operation. In some embodiments, the navigation and pathing system 1748 may be configured to incorporate data from the sensor fusion algorithm 1744, the GPS 1726, the LIDAR unit 1732, and one or more predetermined maps so as to determine the driving path for vehicle 1700.

The obstacle avoidance system 1750 may be any system configured to identify, evaluate, and avoid or otherwise negotiate obstacles in the environment in which the vehicle 1700 is located. The control system 1706 may additionally or alternatively include components other than those shown.

Peripherals 1708 may be configured to allow the vehicle 1700 to interact with external sensors, other vehicles, external computing devices, and/or a user. To this end, the peripherals 1708 may include, for example, a wireless communication system 1752, a touchscreen 1754, a microphone 1756, and/or a speaker 1758.

The wireless communication system 1752 may be any system configured to wirelessly couple to one or more other vehicles, sensors, or other entities, either directly or via a communication network. To this end, the wireless communication system 1752 may include an antenna and a chipset for communicating with the other vehicles, sensors, servers, or other entities either directly or via a communication network. The chipset or wireless communication system 1752 in general may be arranged to communicate according to one or more types of wireless communication (e.g., protocols) such as BLUETOOTH™ protocols, communication protocols described in IEEE 802.11 (including any IEEE 802.11 revisions), cellular technology (such as GSM, CDMA, UMTS, EV-DO, WiMAX, or LTE), ZIGBEE™ protocols, dedicated short range communications (DSRC), and radio frequency identification (RFID) communications, among other possibilities. The wireless communication system 1752 may take other forms as well.

The touchscreen 1754 may be used by a user to input commands to the vehicle 1700. To this end, the touchscreen 1754 may be configured to sense at least one of a position and a movement of a user's finger via capacitive sensing, resistance sensing, or a surface acoustic wave process, among other possibilities. The touchscreen 1754 may be capable of sensing finger movement in a direction parallel or planar to the touchscreen surface, in a direction normal to the touchscreen surface, or both, and may also be capable of sensing a level of pressure applied to the touchscreen surface. The touchscreen 1754 may be formed of one or more translucent or transparent insulating layers and one or more translucent or transparent conducting layers. The touchscreen 1754 may take other forms as well.

The microphone 1756 may be configured to receive audio (e.g., a voice command or other audio input) from a user of the vehicle 1700. Similarly, the speakers 1758 may be configured to output audio to the user of the vehicle 1700. The peripherals 1708 may additionally or alternatively include components other than those shown.

The computer system 1710 may be configured to transmit data to, receive data from, interact with, and/or control one or more of the propulsion system 1702, the sensor system 1704, the control system 1706, and the peripherals 1708. To this end, the computer system 1710 may be communicatively linked to one or more of the propulsion system 1702, the sensor system 1704, the control system 1706, and the peripherals 1708 by a system bus, network, and/or other connection mechanism (not shown).

In one example, the computer system 1710 may be configured to control operation of the transmission 1722 to improve fuel efficiency. As another example, the computer system 1710 may be configured to cause the camera 1734 to capture images of the environment. As yet another example, the computer system 1710 may be configured to store and execute instructions corresponding to the sensor fusion algorithm 1744. As still another example, the computer system 1710 may be configured to store and execute instructions for determining a 3D representation of the environment around the vehicle 1700 using the LIDAR unit 1732. Other examples are possible as well. Thus, the computer system 1710 could function as the controller for the LIDAR unit 1732.

As shown, the computer system 1710 includes the processor 1712 and data storage 1714. The processor 1712 may comprise one or more general-purpose processors and/or one or more special-purpose processors. To the extent the processor 1712 includes more than one processor, such processors could work separately or in combination. Data storage 1714, in turn, may comprise one or more volatile and/or one or more non-volatile storage components, such as optical, magnetic, and/or organic storage, and data storage 1714 may be integrated in whole or in part with the processor 1712.

In some embodiments, data storage 1714 may contain instructions 1716 (e.g., program logic) executable by the processor 1712 to execute various vehicle functions (e.g., method 500, etc.). Data storage 1714 may contain additional instructions as well, including instructions to transmit data to, receive data from, interact with, and/or control one or more of the propulsion system 1702, the sensor system 1704, the control system 1706, and/or the peripherals 1708. The computer system 1710 may additionally or alternatively include components other than those shown.

As shown, the vehicle 1700 further includes a power supply 1760, which may be configured to provide power to some or all of the components of the vehicle 1700. To this end, the power supply 1760 may include, for example, a rechargeable lithium-ion or lead-acid battery. In some embodiments, one or more banks of batteries could be configured to provide electrical power. Other power supply materials and configurations are possible as well. In some embodiments, the power supply 1760 and energy source 1720 may be implemented together as one component, as in some all-electric cars.

In some embodiments, the vehicle 1700 may include one or more elements in addition to or instead of those shown. For example, the vehicle 1700 may include one or more additional interfaces and/or power supplies. Other additional components are possible as well. In such embodiments, data storage 1714 may further include instructions executable by the processor 1712 to control and/or communicate with the additional components.

Still further, while each of the components and systems are shown to be integrated in the vehicle 1700, in some embodiments, one or more components or systems may be removably mounted on or otherwise connected (mechanically or electrically) to the vehicle 1700 using wired or wireless connections. The vehicle 1700 may take other forms as well.

X. CONCLUSION

The particular arrangements shown in the Figures should not be viewed as limiting. It should be understood that other implementations may include more or less of each element shown in a given Figure. Further, some of the illustrated elements may be combined or omitted. Yet further, an exemplary implementation may include elements that are not illustrated in the Figures.

Additionally, while various aspects and implementations have been disclosed herein, other aspects and implementations will be apparent to those skilled in the art. The various aspects and implementations disclosed herein are for purposes of illustration and are not intended to be limiting, with the true scope and spirit being indicated by the following claims. Other implementations may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

We claim:

1. A system comprising:
a light detection and ranging (LIDAR) device coupled to a vehicle;
a sensor coupled to the vehicle, wherein the sensor is configured to generate sensor data indicative of external light, wherein the external light originates from an external light source other than the LIDAR device; and
a controller configured to perform operations comprising:
receiving the sensor data indicative of external light; and
varying one or more characteristics of light emitted by the LIDAR device based on the sensor data indicative of external light, wherein varying the one or more characteristics of light emitted by the LIDAR device provides a basis for distinguishing reflected light that originated at the LIDAR device from external light that did not originate at the LIDAR device.

2. The system of claim 1, wherein varying one or more characteristics of light emitted by the LIDAR device comprises varying a timing of light emitted by the LIDAR device.

3. The system of claim 1, wherein varying one or more characteristics of light emitted by the LIDAR device comprises varying a wavelength of light emitted by the LIDAR device.

4. The system of claim 1, wherein varying one or more characteristics of light emitted by the LIDAR device comprises varying an intensity of light emitted by the LIDAR device.

5. The system of claim 1, wherein varying one or more characteristics of light emitted by the LIDAR device comprises varying a modulation of light emitted by the LIDAR device.

6. The system of claim 1, wherein the sensor is coupled to the LIDAR device.

7. The system of claim 1, wherein the sensor comprises a photodetector in the LIDAR device.

8. The system of claim 1, wherein the sensor is a camera, and wherein the sensor data indicative of external light comprises image data from the camera.

9. The system of claim 8, wherein the operations further comprise:
recognizing the external light source in the image data.

10. The system of claim 1, wherein the operations further comprise:
activating a shutter to block the external light from being detected by the LIDAR device.

11. The system of claim 1, wherein the operations further comprise:
determining a location associated with the external light source.

12. A method comprising:
receiving, from a sensor coupled to a vehicle, sensor data indicative of external light, wherein a light detection and ranging (LIDAR) device is coupled to the vehicle, and wherein the external light originates from an external light source other than the LIDAR device; and
varying one or more characteristics of light emitted by the LIDAR device based on the sensor data indicative of external light, wherein varying the one or more characteristics of light emitted by the LIDAR device provides a basis for distinguishing reflected light that originated at the LIDAR device from external light that did not originate at the LIDAR device.

13. The method of claim 12, wherein varying one or more characteristics of light emitted by the LIDAR device comprises varying a timing of light emitted by the LIDAR device.

14. The method of claim 12, wherein varying one or more characteristics of light emitted by the LIDAR device comprises varying a wavelength of light emitted by the LIDAR device.

15. The method of claim 12, wherein varying one or more characteristics of light emitted by the LIDAR device comprises varying an intensity of light emitted by the LIDAR device.

16. The method of claim 12, wherein varying one or more characteristics of light emitted by the LIDAR device comprises varying a modulation of light emitted by the LIDAR device.

17. The method of claim 12, wherein the sensor is a camera, and wherein the sensor data indicative of external light comprises image data from the camera.

18. The method of claim 17, further comprising:
recognizing the external light source in the image data.

19. The method of claim 12, further comprising:
activating a shutter to block the external light from being detected by the LIDAR device.

20. The method of claim 12, further comprising:
determining a location associated with the external light source.

* * * * *